(12) United States Patent
Takase et al.

(10) Patent No.: US 7,904,562 B2
(45) Date of Patent: Mar. 8, 2011

(54) SERVER AND CONNECTING DESTINATION SERVER SWITCH CONTROL METHOD

(75) Inventors: Masaaki Takase, Kawasaki (JP); Takeshi Sano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 12/276,613

(22) Filed: Nov. 24, 2008

(65) Prior Publication Data
US 2009/0248871 A1 Oct. 1, 2009

(30) Foreign Application Priority Data

Mar. 26, 2008 (JP) ................. 2008-079408

(51) Int. Cl.
*G06F 15/16* (2006.01)
*G06F 12/00* (2006.01)
(52) U.S. Cl. ........................ 709/226; 711/122
(58) Field of Classification Search .................. 711/120, 711/122, 118; 709/212–218, 226–229
See application file for complete search history.

(56) References Cited

U.S. PATENT DOCUMENTS

| | | | |
|---|---|---|---|
| 6,438,652 B1 * | 8/2002 | Jordan et al. ................. | 711/120 |
| 7,676,828 B1 * | 3/2010 | DeCaprio ....................... | 726/4 |
| 2002/0138618 A1 * | 9/2002 | Szabo ............................ | 709/225 |
| 2003/0112752 A1 | 6/2003 | Irifune et al. | |
| 2005/0102427 A1 * | 5/2005 | Yokota et al. ................. | 709/245 |
| 2006/0161635 A1 * | 7/2006 | Lamkin et al. ................ | 709/217 |
| 2006/0248195 A1 * | 11/2006 | Toumura et al. .............. | 709/226 |
| 2006/0253605 A1 * | 11/2006 | Sundarrajan et al. ......... | 709/238 |
| 2007/0223453 A1 | 9/2007 | Takase et al. | |
| 2008/0229025 A1 * | 9/2008 | Plamondon .................... | 711/126 |

FOREIGN PATENT DOCUMENTS

| | | |
|---|---|---|
| JP | 2001-167071 | 6/2001 |
| JP | 2003-186776 | 7/2003 |
| JP | 2004-013638 | 1/2004 |
| JP | 2004-088315 | 3/2004 |
| JP | 2006-113698 | 4/2006 |
| JP | 2007-257357 | 10/2007 |

* cited by examiner

*Primary Examiner* — Zarni Maung
(74) *Attorney, Agent, or Firm* — Katten Muchin Rosenman LLP

(57) ABSTRACT

A connecting destination server switch control method for switching a server and the connecting destination of the server is provided, the method realizing a larger-scaled network system by distributing a load to each cache server, thus reducing the total load and dynamically modifying a logical network according to the load of each cache server even when there is a plurality of content servers that are content distributors. In a situation where cache servers whose management sources differ are connected in many steps, the total load caused by content acquisition can be reduced by modifying the content acquisition source server of a cache server for each piece of content.

8 Claims, 57 Drawing Sheets

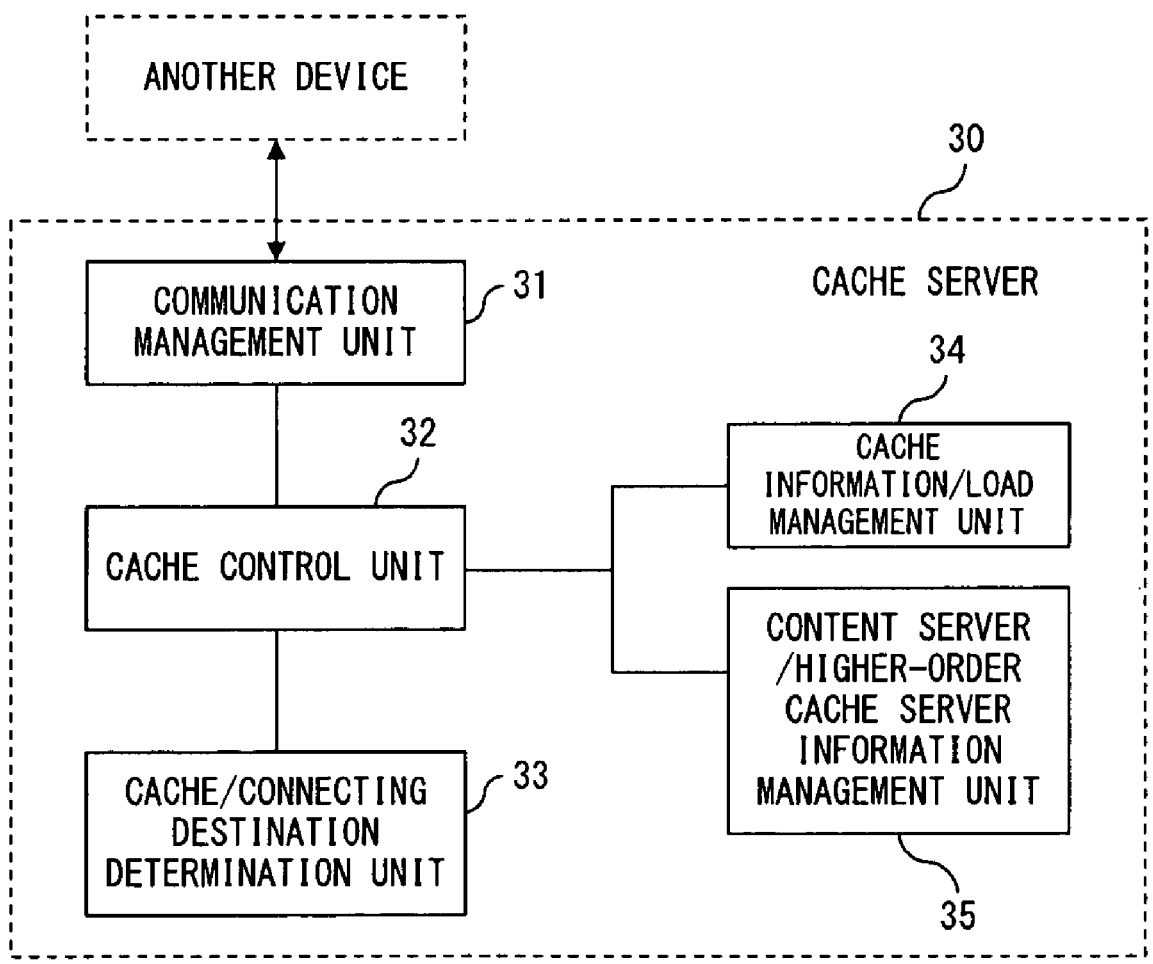
F I G. 5

```
MESSAGE TYPE: CONNECTING DESTINATION SWITCH REQUEST
CONNECTING DESTINATION CACHE SERVER ADDRESS: x.x.x.x
CONNECTING DESTINATION SERVER ADDRESS:y.y.y.y
OBTAINED CONTENTS URL : http://x.x.x.x/aaa/bbb
REQUIREMENTS OF CONTENTS ACQUISITION:
 Lifetime = 60s
PROTOCOL:HTTP
TRANSFER ROUTE:
 serverA
 serverB
    :
    :
```

FIG. 8

```
MESSAGE TYPE: CONNECTING DESTINATION SWITCH RESPONSE
RESPONSE STATUS: OK/NG
SWITCH DESTINATION ADDRESS: z.z.z.z
TRANSFER ROUTE:
 serverA
 serverB
     :
```

FIG. 9

```
MESSAGE TYPE: SWITCH DESTINATION NOTICE
SWITCH DESTINATION SERVER ADDRESS:z.z.z.z
```

FIG. 10

```
MESSAGE TYPE: SWITCH DESTINATION NOTICE RESPONSE
RESPONSE STATUS: OK/NG
```

F I G. 1 1

```
SWITCH DESTINATION ADDRESS
CONNECTING DESTINATION CACHE SERVER ADDRESS: x.x.x.x
CONNECTING DESTINATION SERVER ADDRESS:y.y.y.y
OBTAINED CONTENTS URL: http://x.x.x.x/aaa/bbb
PROTOCOL:HTTP
```

FIG. 12

```
MESSAGE TYPE: CONNECT RESPONSE
RESPONSE STATUS: OK/NG
```

FIG. 13

```
MESSAGE TYPE: CONNECTING DESTINATION RETRIEVE REQUEST
CONNECTING DESTINATION CACHE SERVER ADDRESS: x.x.x.x
CONNECTING DESTINATION SERVER ADDRESS: y.y.y.y
OBTAINED CONTENTS URL: http://x.x.x.x/aaa/bbb
REQUIREMENTS OF CONTENTS ACQUISITION:
 Lifetime = 60s
PROTOCOL: HTTP
TRANSFER ROUTE:
 serverA
 serverB
    :
    :
```

FIG. 15

```
MESSAGE TYPE: CONNECTING DESTINATION RETRIEVE RESPONSE
RESPONSE STATUS: OK/NG
SWITCH DESTINATION ADDRESS:z.z.z.z
TRANSFER ROUTE:
 serverA
 serverB
      :
      :
```

FIG. 16

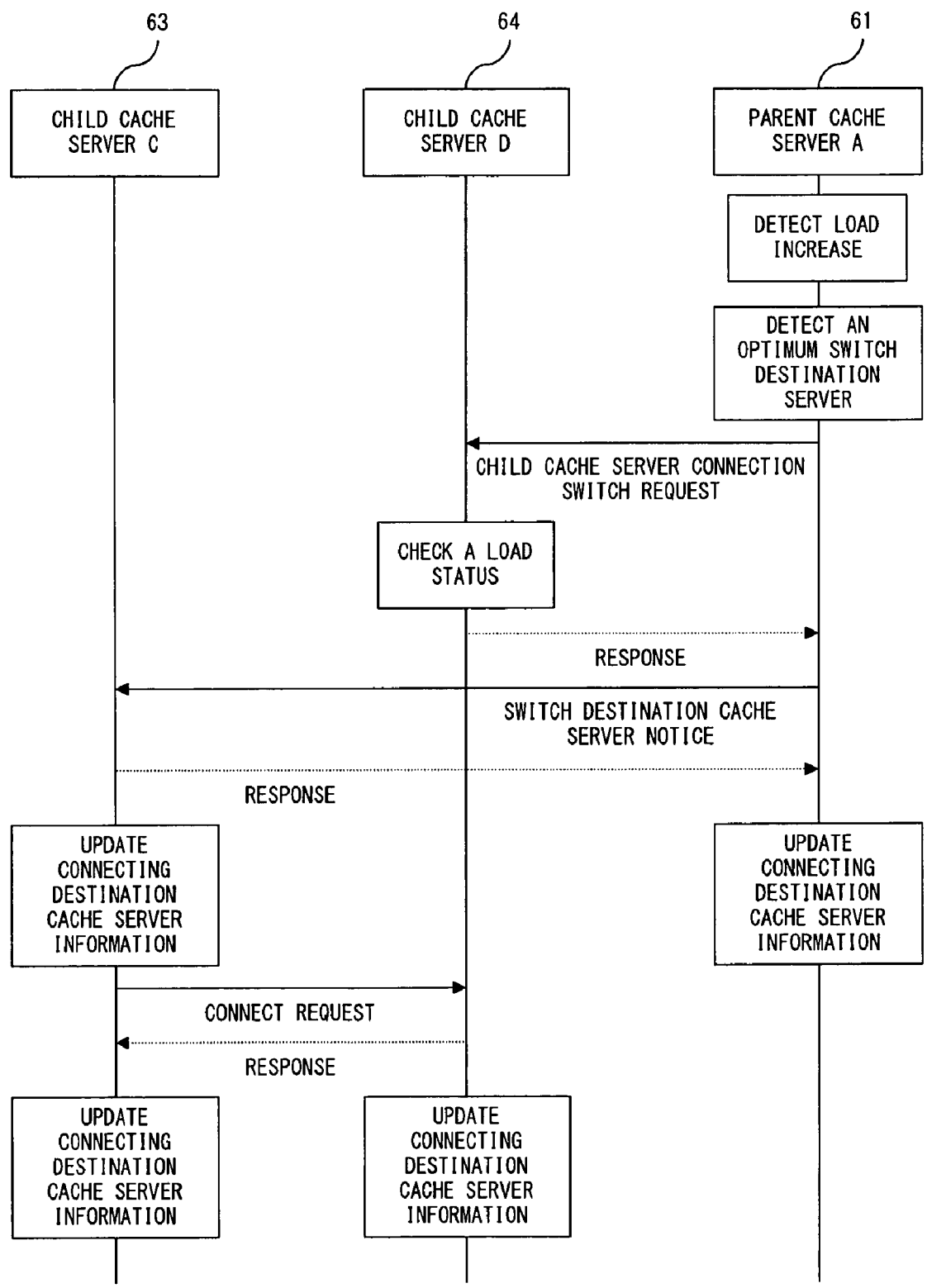
F I G. 17

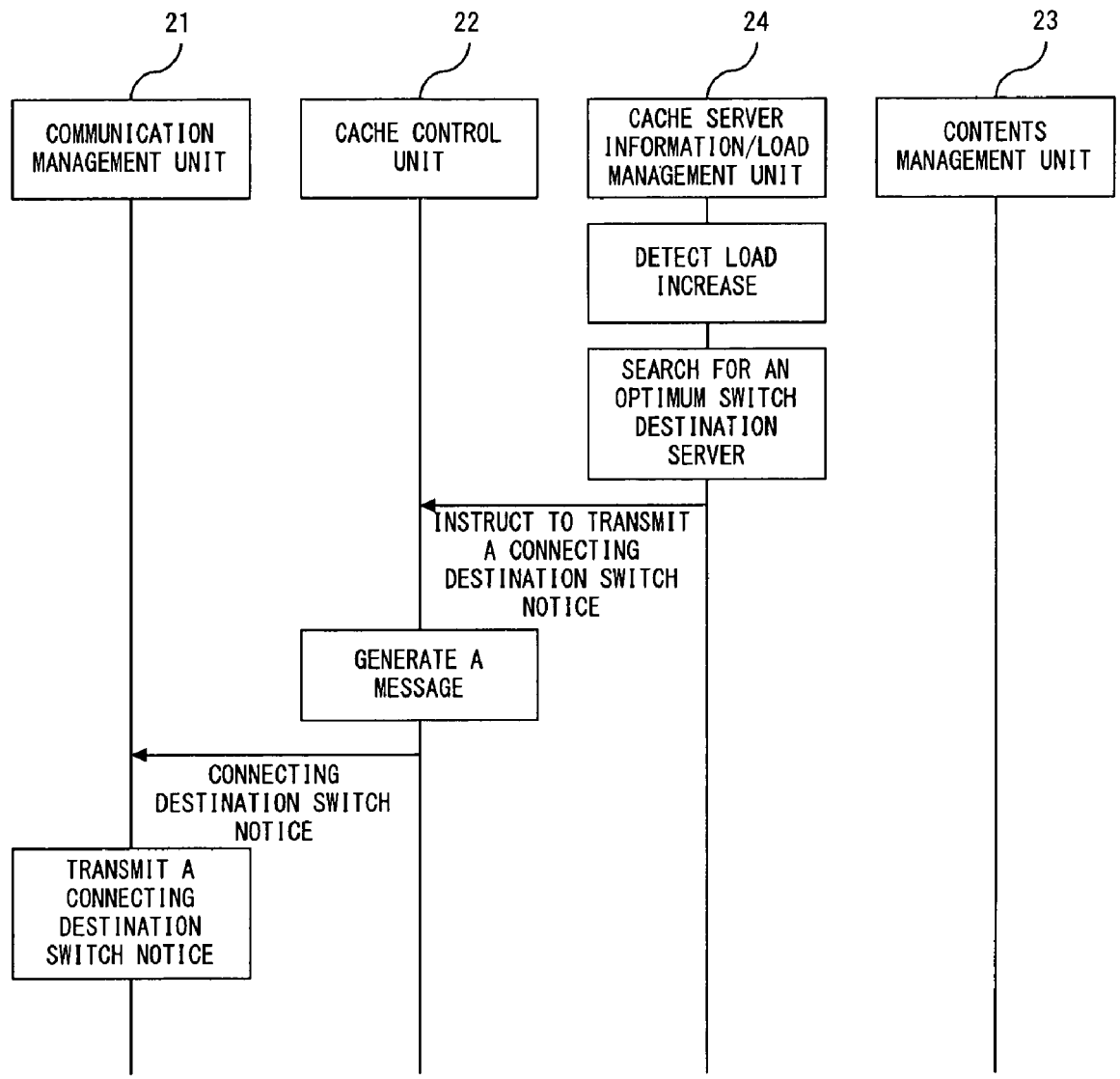
F I G. 3 7

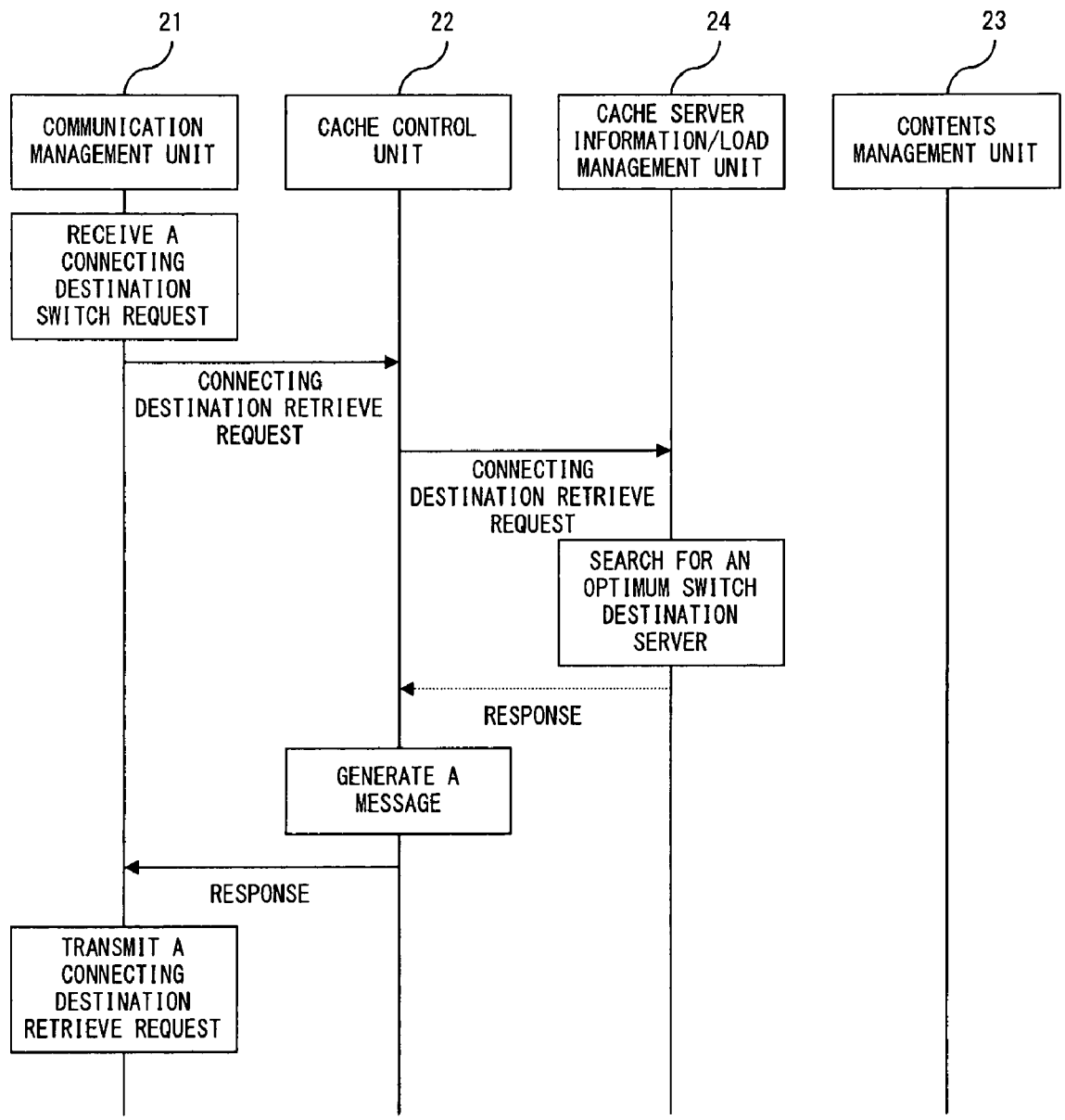
F I G. 3 8

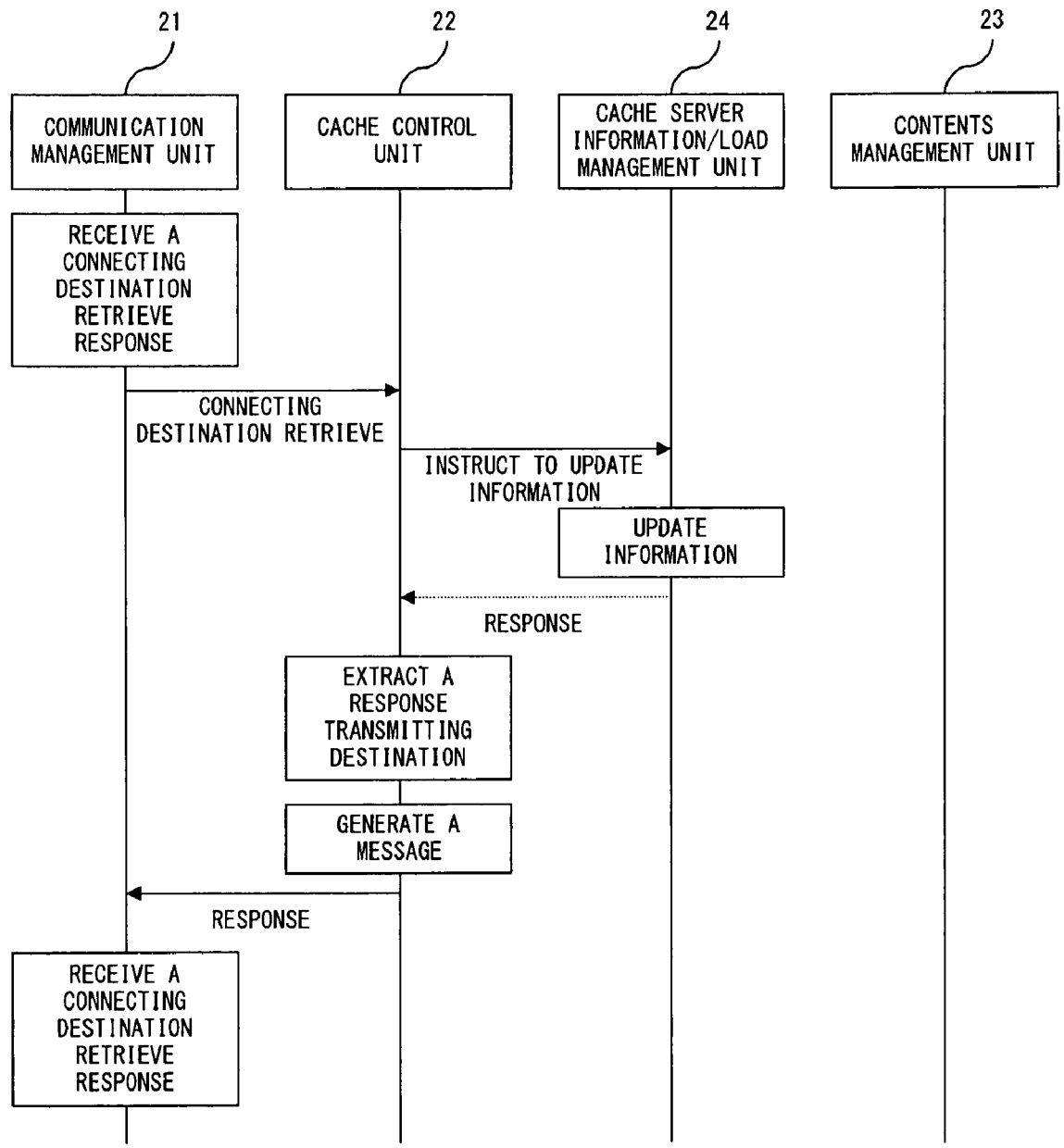
F I G. 4 1

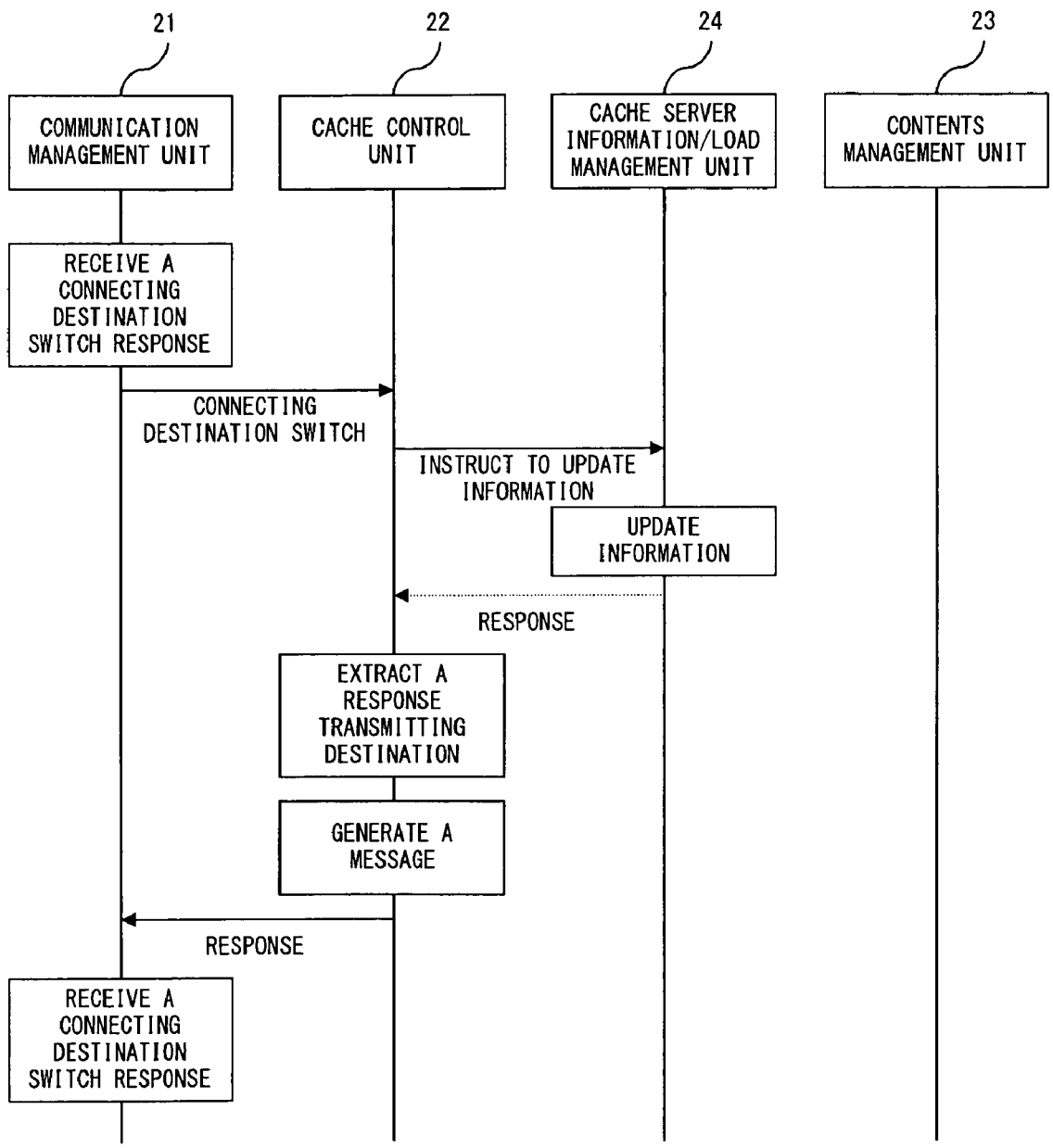
F I G. 4 2

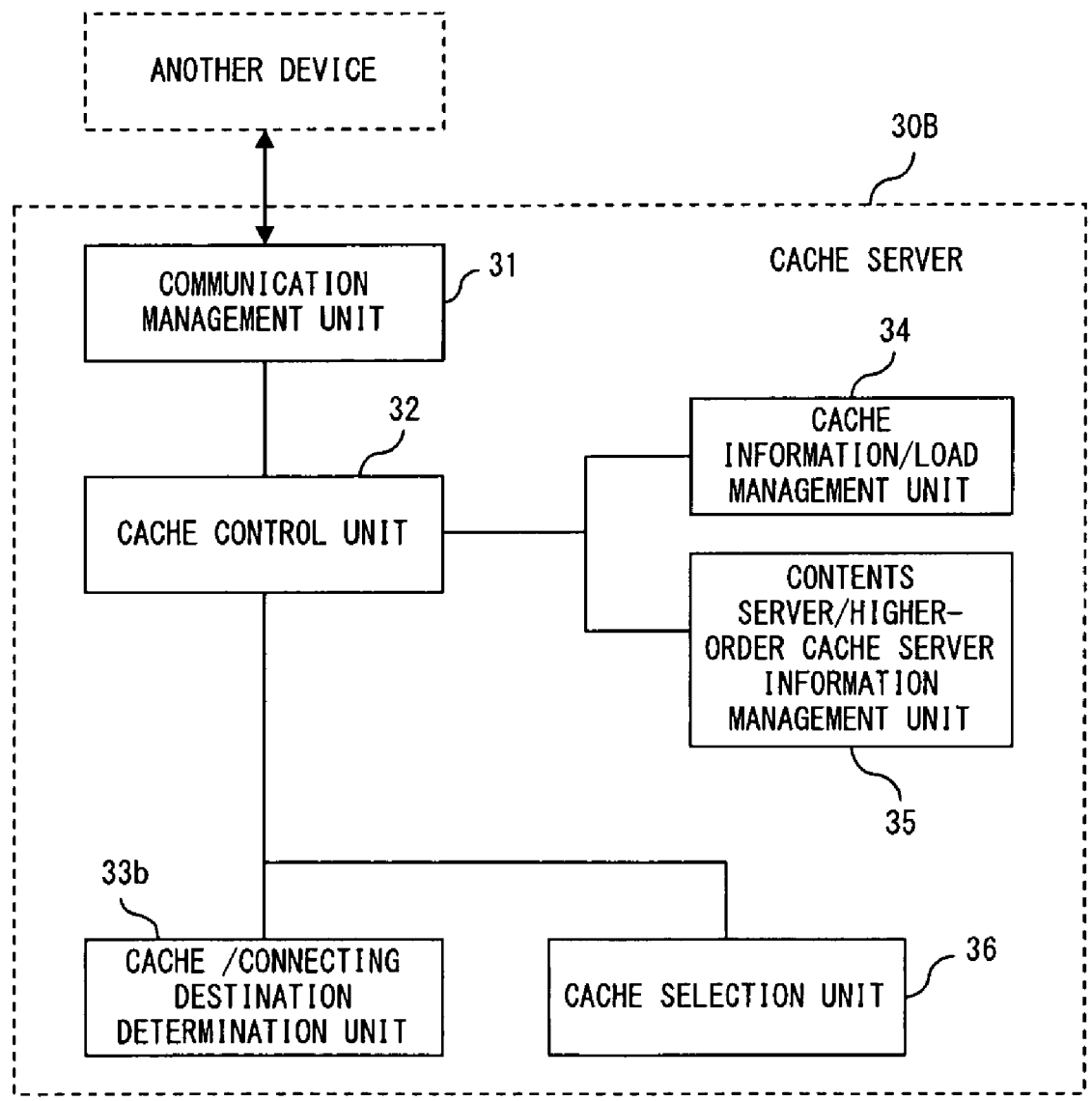
F I G. 4 4

```
MESSAGE TYPE: CONNECTING DESTINATION SWITCH REQUEST
CONNECTING SOURCE CACHE SERVER ADDRESS:x.x.x.x
CONNECTING DESTINATION SERVER ADDRESS: y.y.y.y
INFORMATION ABOUT CONTENTS TO BE DESIRED TO SWITCH
URI: http://x.x.x.x/aaa/bbb
REQUIREMENTS OF CONTENTS ACQUISITION: Lifetime = 60s
PROTOCOL: HTTP
INFORMATION ABOUT CONTENTS TO BE SWITCHED FROM ANOTHER SERVER
URI: http://x.x.x.x/aaa/ccc
REQUIREMENTS OF CONTENTS ACQUISITION: Lifetime = 60s
PROTOCOL: HTTP
TRANSFER ROUTE:
 serverA
 serverB
```

FIG. 45

```
MESSAGE TYPE: CONNECTING DESTINATION RETRIEVE REQUEST
CONNECTING SOURCE CACHE SERVER ADDRESS: x.x.x.x
CONNECTING DESTINATION SERVER ADDRESS:y.y.y.y
INFORMATION ABOUT CONTENTS TO BE DESIRED TO SWITCH
URI: http://x.x.x.x/aaa/bbb
REQUIREMENTS OF CONTENTS ACQUISITION: Lifetime = 60s
PROTOCOL: HTTP
INFORMATION ABOUT CONTENTS TO BE SWITCHED FROM ANOTHER SERVER
URI: http://x.x.x.x/aaa/ccc
REQUIREMENTS OF CONTENTS ACQUISITION: Lifetime = 60s
PROTOCOL: HTTP
TRANSFER ROUTE:
 serverA
 serverB
```

FIG. 46

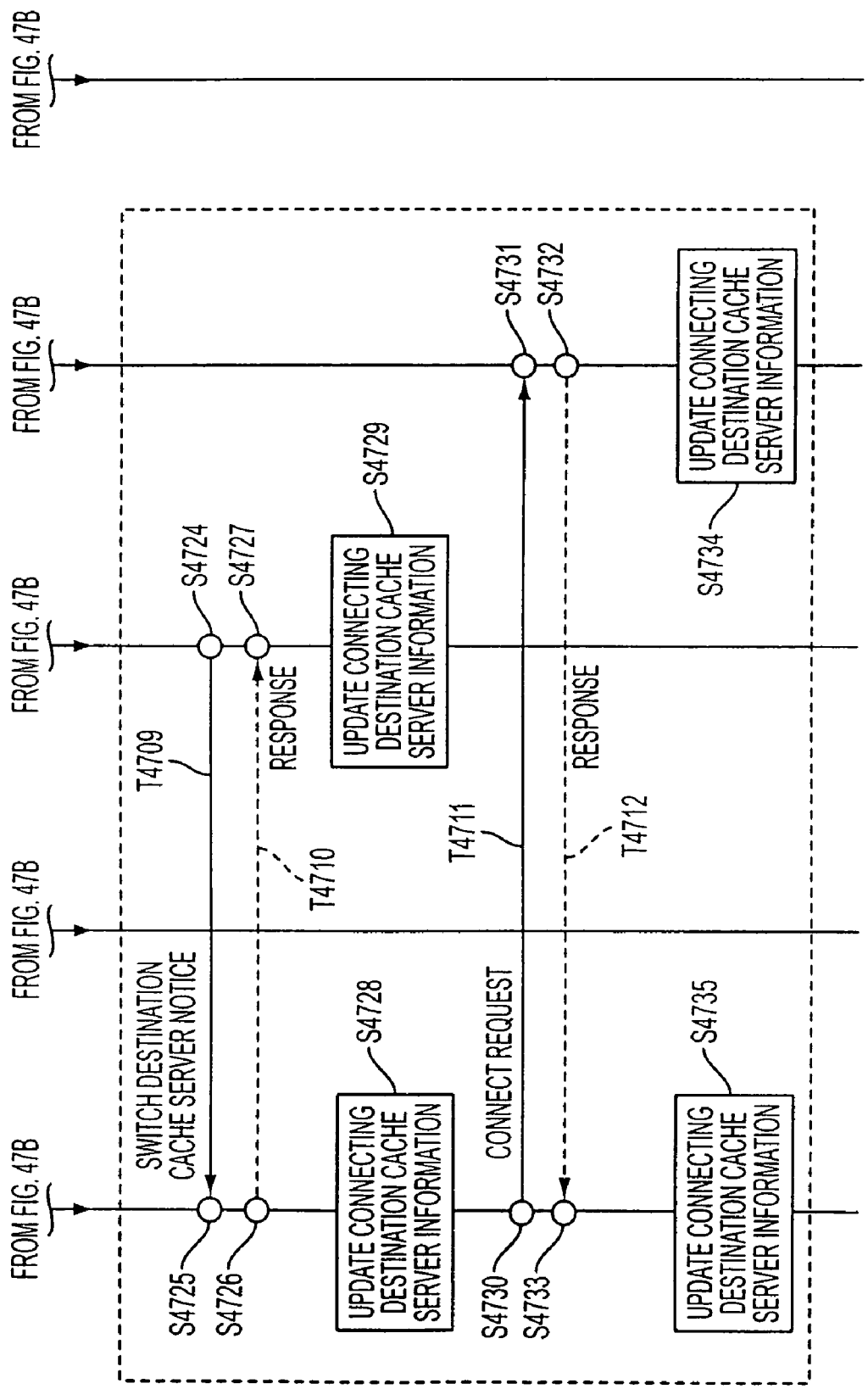

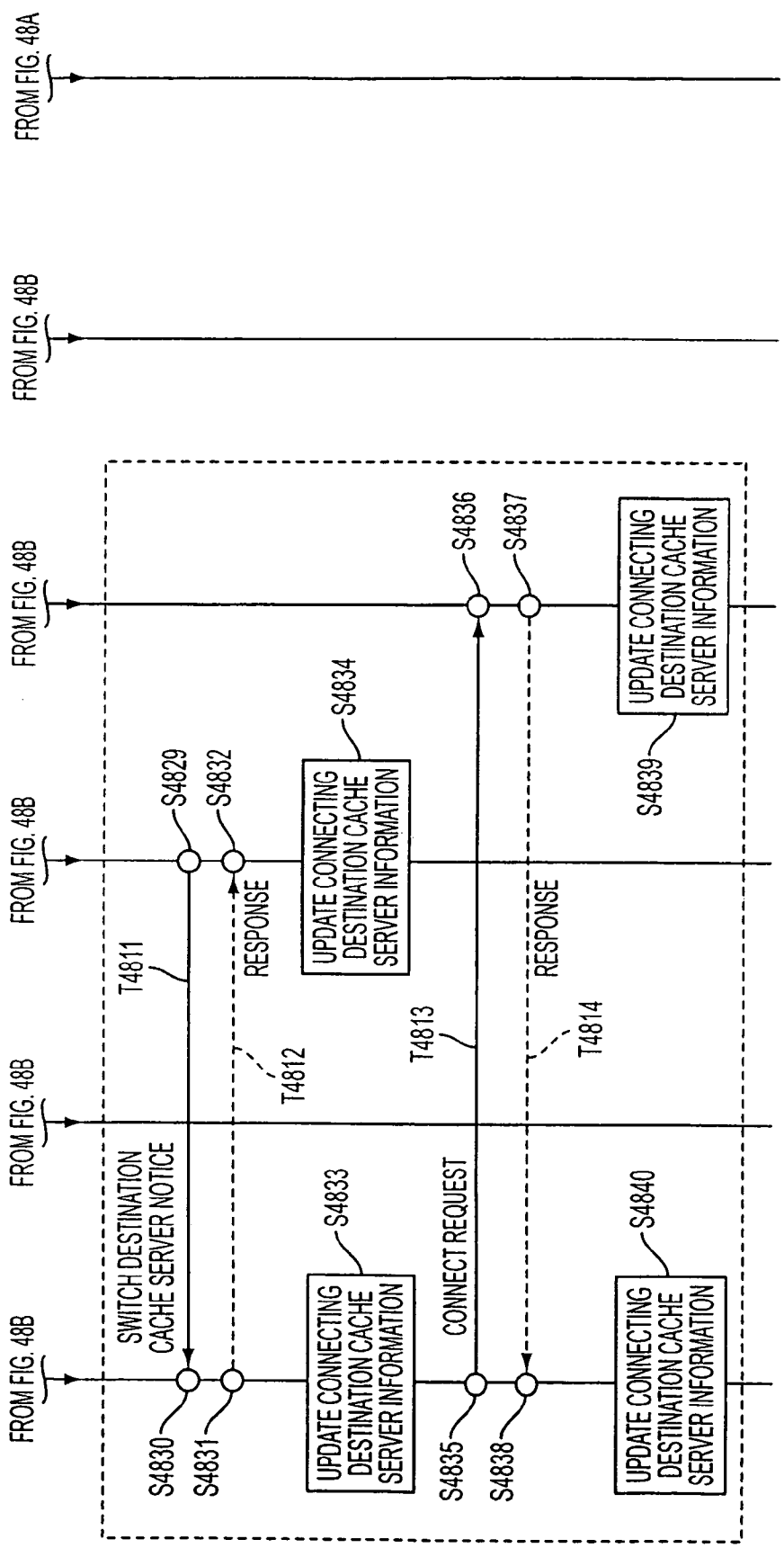

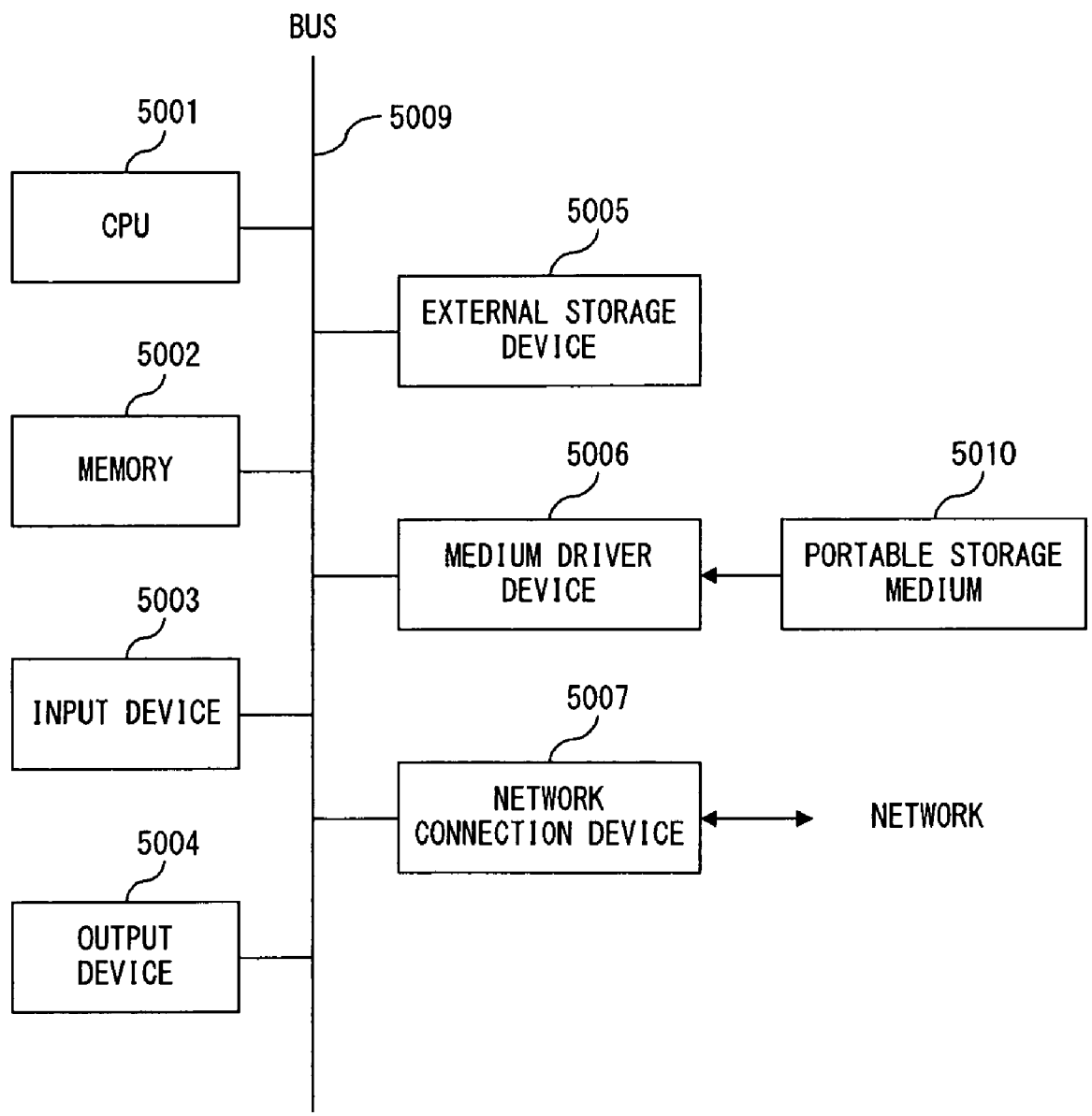
F I G. 5 0

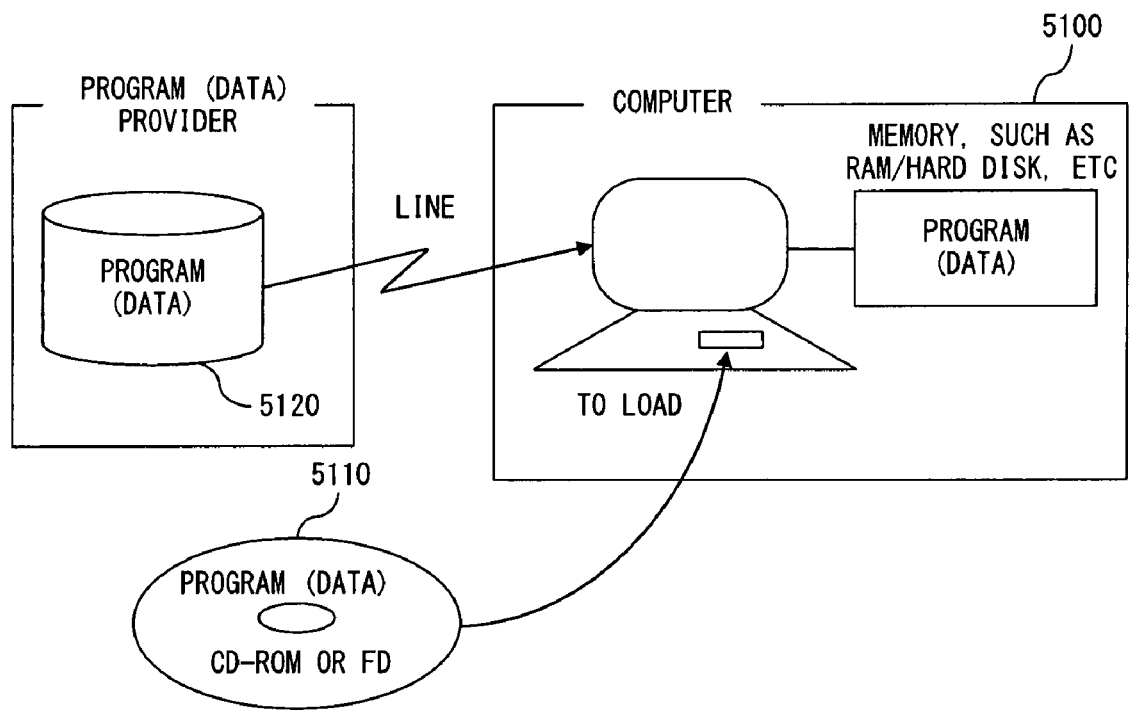
F I G. 5 1

SERVER AND CONNECTING DESTINATION SERVER SWITCH CONTROL METHOD

BACKGROUND OF THE INVENTION

1. Field of the Invention

The present invention relates to a technology for distributing the load of a network using a cache technique.

2. Description of the Related Art

Recently, a cache technique that is effective when the content on a content server is not modified and a mirroring technique that is suitable when a large amount of data is copied in a certain cycle, among others, have been known as technologies for distributing the load of a network. These techniques reduce the amount of communication of content flowing on a network by providing a cache server on a network, copying information possessed by a content server to a cache server on a network close to a reference requester terminal (client) (for example, if it is a content distribution network), and enabling the client to refer to the copy on the cache server.

However, cases that cannot be addressed by simply caching content, such as a web server that dynamically generates content when a client accesses it, have increased when using the cache technique. As its solution, a technology for increasing the ratio of content that can be cached by elaborately dividing even content that is dynamically generated as a whole into a dynamic part and a static part and caching the parts other than dynamic one has been developed. There is also a technology for improving the hit rate of cache by caching dynamic content and also automatically modifying the cache when the content is modified.

However, since the load of a cache server increases according to the number of requests, a load-distributing technology is indispensable. Although there are methods using a load-distributing controller, using a wide-band load distribution and the like, they do not take into consideration a state where a cache server is managed by different managers and a state where files are consecutively copied to a cache and the load causes a problem.

In a peer-to-peer content delivery network (P2P-CDN) composed of a plurality of content servers, a cache server for receiving the distribution of content from the content servers and relaying the content and a client, and a technology for modifying the type of the content distributed by the content servers according to the change of the process load of the cache server (which is measured on the basis of the request of a client) is proposed.

However, since in the load distribution of content distribution in P2P-CDN and the like, the logical network configuration of a cache server and a client receiving content is generally fixed, the network configuration cannot be modified even when its load is unbalanced.

Patent Document 1 proposes a congestion control device for enabling the effective use of services comprising a plurality of client terminals capable of requesting information and displaying information obtained in response to it, a plurality of content servers for transmitting information in response to a request to a client terminal, and a congestion controller provided between them.

Patent document 2 proposes a system comprising a load measurement unit for measuring the load of a cache server, an overload determination unit for determining whether the load is overloaded by comparing the measured load with a predetermined value, a connecting destination retrieve request transmitting unit for transmitting connecting destination retrieve request information requesting a content server to search for the connecting destination of a load source cache server when the load is overloaded, a connecting destination information receiving unit for receiving the connecting destination information indicating the searched connecting destination from the transmitting source content server that has transmitted the connecting destination retrieve request information, and a switch request transmitting unit for transmitting switch request information requesting the load source cache server to switch the connection to the connection g destination indicated by the connecting destination information on the basis of the received connecting destination information wherein the amount of communications flowing through a network is reduced as a whole by distributing the load of each cache.

FIGS. 1A and 1B explain the problem of the prior art.

FIG. 1A explains a negotiation for equalizing the load of a network. CDN1 comprises a plurality of content servers 2, a plurality of cache servers 3, and a plurality of clients 4. The plurality of cache servers 3 is subordinated to each of the plurality of content servers 2 and the plurality of clients 4 is subordinated to each of the plurality of cache servers 2. In FIG. 1A, n (n=integer) content servers are provided. One cache server 3(A,B) to which content A and B are copied and (m−2) (m=integer) cache servers 3 to which content B is copied are connected to content server 2*b*(B) having content B. One cache server, cache server 3*a*(A), to which content A is copied, is connected to a content server 2*a*(A) having content A. Another cache server, cache server 3*b*, to which content A is copied, is subordinated to cache server 3*a*.

For example, when the load of cache server 3*a* is heavy because cache server 3*b* is subordinated to cache server 3*a*, cache server 3*a* transfers switch request T1 to request the higher-order content server 2*a* to switch the connection of cache server 3*b* as its load source. Upon receipt of switch request T1, content server 2*a* transfers switch request T2 to each cache server 3 to search for the connection destination of cache server 3*b*. Then, when content server 2*a* has received response T3 from a cache server 3 which can be switched, content server 2*a* transfers response T4 to the cache server 3*a* to notify cache server 3*a* of the switchable cache server 3. Upon receipt of response T4, the switchable cache server 3 transfers switch request T5 to cache server 3*b* and re-establishes the logic link as shown in FIG. 1B.

Specifically, in FIG. 1B the total number of cache servers 3(A,B) to which content A and B are copied and cache servers 3(B) to which content B is copied becomes m−1 and a logic link for connecting cache server 3*b* to cache server 3(A,B) is established.

However, the method for negotiating whether a logic link can be established with a plurality of content servers having different content and re-establishing a logic link between it and the switchable cache server 3 can equalize its load, but the total load of the entire network remains unchanged, which is a problem.

Patent Document 1: Japan Patent Application No. 2003-186776

Patent Document 1: Japan Patent Application No. 2007-257357

SUMMARY OF THE INVENTION

This technology is laid open in view of the above-described situation, and it is an object of the present invention to provide a server capable of distributing the load of a cache server to each of the other cache servers, dynamically modifying a logical network configuration according to the load of each cache server in order to realize a larger-scaled network system and a server switch control method for switching the connecting destination of the server.

A cache server for caching the content of a content server according to a request from a client and distributing it to the client, which is one aspect of the present invention, comprises a cache control unit.

The cache control unit measures the load of a cache server, which is caused by a lower-order load source cache server connected to the cache server caching content cached in the cache server.

Then, the cache control unit determines whether the load is overloaded by comparing the measured value with a predetermined overload setting value. If it is overloaded, the cache control unit requests that the content server or another cache server search for the connecting destination of the load source cache server and selects content to be switched and content to be switched by another cache server or content server in such a way that the total load after switching becomes equal to or less than the overload setting value.

The cache control unit generates connecting destination retrieve request information, including information about each of the selected pieces of content, and generates a request to connect the load source cache server to a connecting destination indicated by connecting destination information, indicating the connecting destination, that was retrieved by the content server or another cache server, on the basis of the connecting destination information, from the content server or another cache server that has received the connecting destination retrieve request information.

When it is determined that the connecting destination of the load source cache server, transmitted by the content server or another cache server that has received the connecting destination retrieve request information, is not available, the cache control unit transfers the connecting destination retrieve request information to another lower-order cache server connected by a communication management unit.

As described above, even when there is a plurality of content servers (when each cache server is controlled by a different manager), a larger-scaled network system capable of distributing its load to each cache server, reducing its total load, and dynamically modifying its logical network configuration according to the load of each cache server can be realized.

Each content server comprises a cache control unit for generating a notice for notifying a cache server to which the load source cache server, including information about a switch destination cache and server cache servers connected to the lower-order switch destination cache server on the basis of the connecting destination connectability determination result, and transmits the notice to the connecting destination cache server of the load source cache server by the communication management unit.

According to the laid-open technology, even when there is a plurality of content servers being content distribution sources, that is, even when each cache server is controlled by a difference manager, a larger-scaled network system capable of distributing its load to each cache server, reducing its total load, and dynamically modifying its logical network configuration according to the load of each cache server can be realized.

BRIEF DESCRIPTION OF THE DRAWINGS

FIG. 5 shows a functional configuration example of a cache server.
FIG. 8 shows an example of information included in a connecting destination switch request message.
FIG. 9 shows an example of information included in a connecting destination switch response message.
FIG. 10 shows an example of information included in a switch destination notifying message.
FIG. 11 shows an example of information included in a switch destination response message.
FIG. 12 shows an example of information included in a connect request message.
FIG. 13 shows an example of information included in a connect response message.
FIG. 15 shows an example of information included in a connecting destination retrieve request message.
FIG. 16 shows an example of information included in a connecting destination retrieve response message.
FIG. 17 shows an operation example of switching the connecting destination of a cache server subordinated below the second layer to another cache server subordinated below the second layer due to the load increase of a cache server in the top layer.

FIG. 37 shows an operation example of a content server in the case where a connecting destination is switched because of the load status of a content server.

FIG. 38 shows an operation example of a content server at the time of receiving a connecting destination retrieve request.

FIG. 41 shows an operation example of a content server at the time of receiving a connecting destination retrieve response.

FIG. 42 shows an operation example of a content server at the time of receiving a connecting destination switch response.

FIG. 44 shows the configuration of a cache server having a function to simultaneously switch a plurality of connecting destinations.

FIG. 45 shows information included in a connecting destination switch request.

FIG. 46 shows information included in a connecting destination retrieve request.

FIGS. 47A, 47B, and 47C show an operation example of switching the connecting destination of a cache server subordinated to the top layer cache server below the second layer.

FIGS. 48A, 48B, and 48C show an operation example of switching the connecting destination of a cache server subordinated below the second layer to another cache server subordinated below the second layer subordinated to another top layer cache server.

FIG. 50 shows the hardware configuration of the content server and cache server of the present invention.

FIG. 51 explains how to load the connecting destination server switch control program of the present invention onto a computer.

DESCRIPTION OF THE PREFERRED EMBODIMENTS

The detailed preferred embodiments of the present invention are described below with reference to the drawings.

Figure 1B:
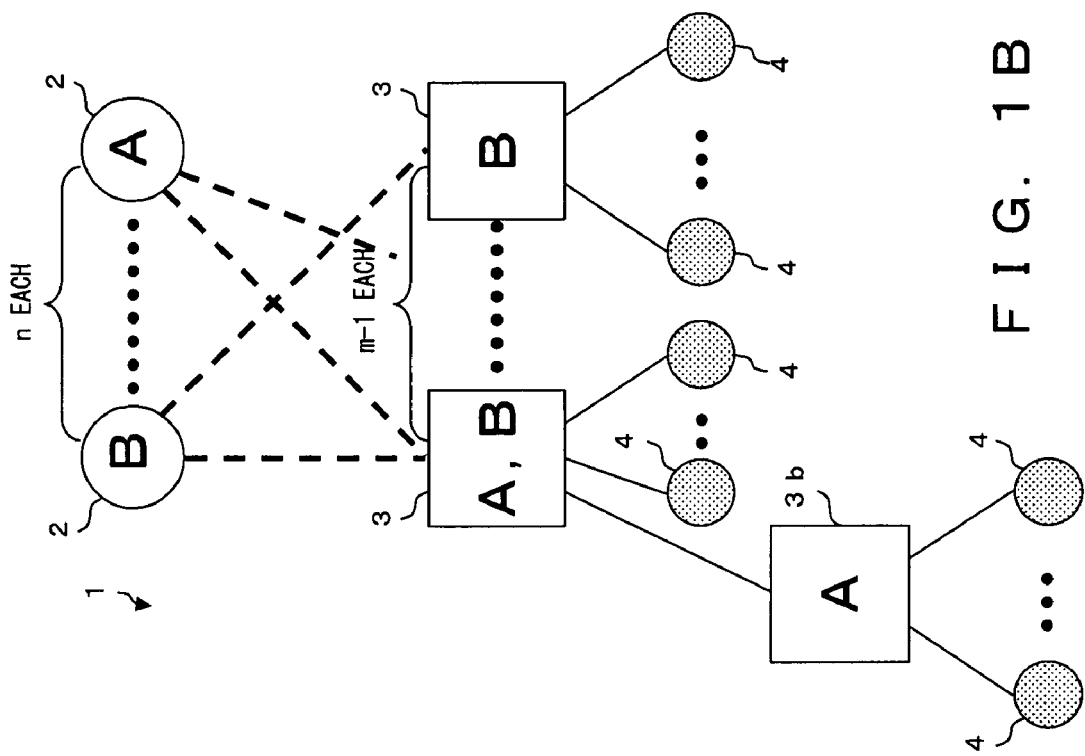
FIGS. 1A and 1B explain the problem of the prior art.
Figure 1A:
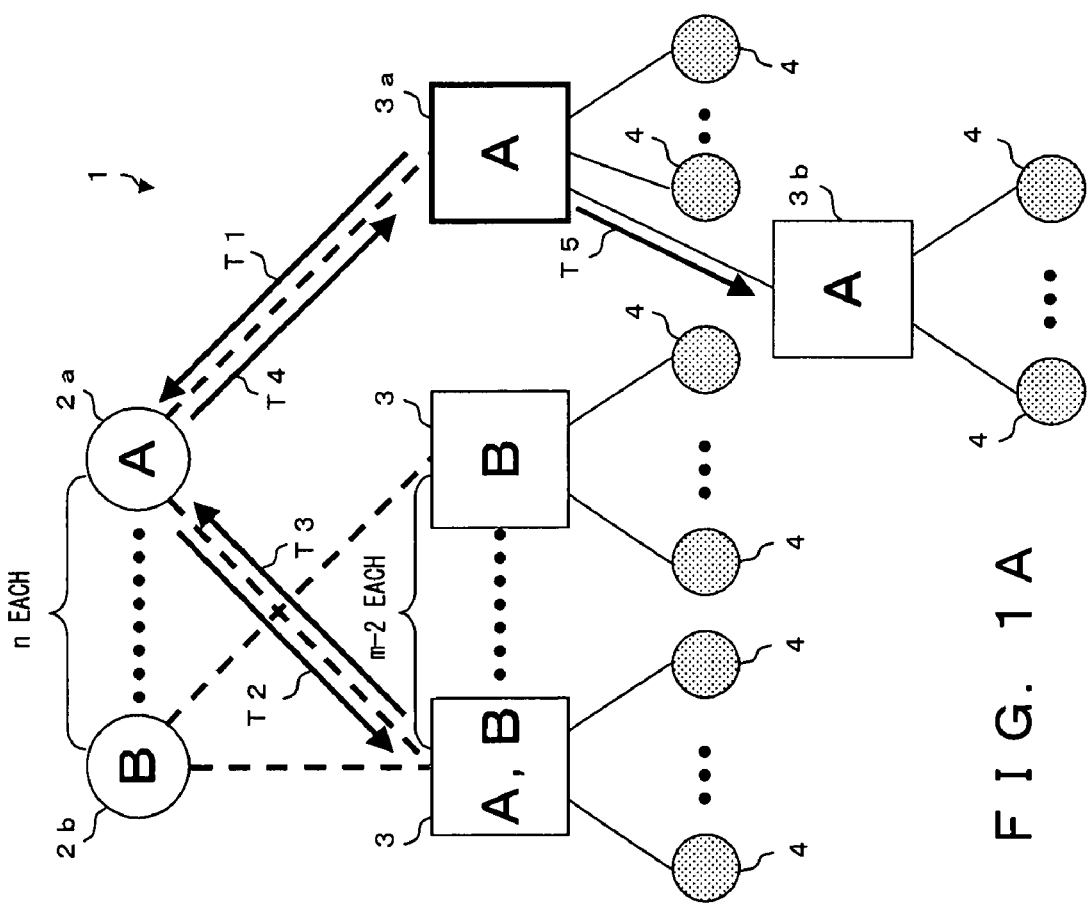
Figure 2B:
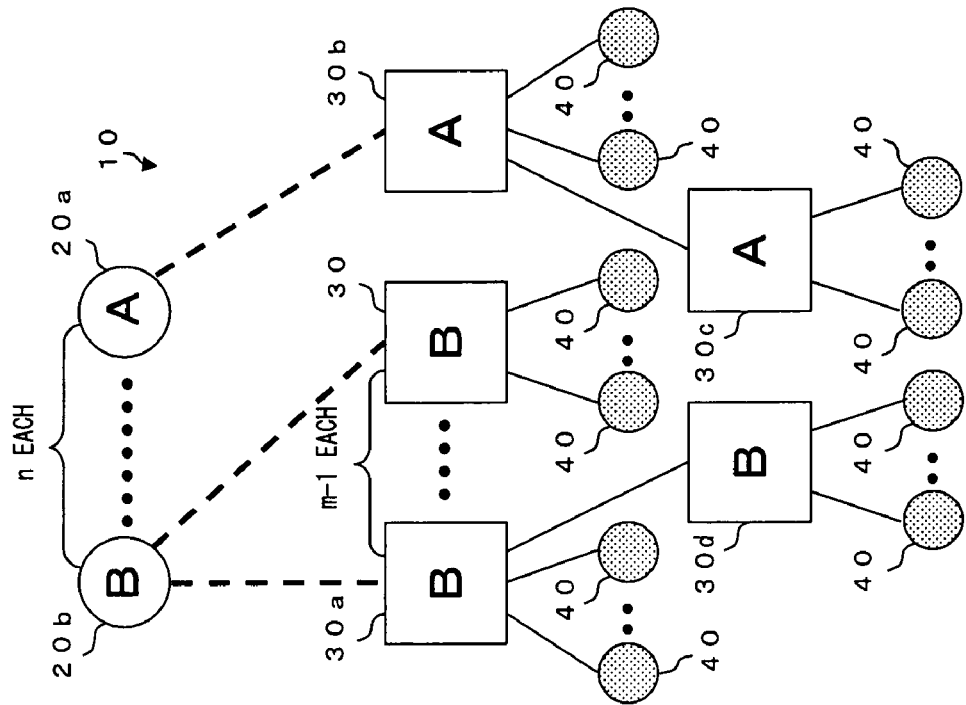
FIGS. 2A and 2B summarizes the present invention.
Figure 2A:
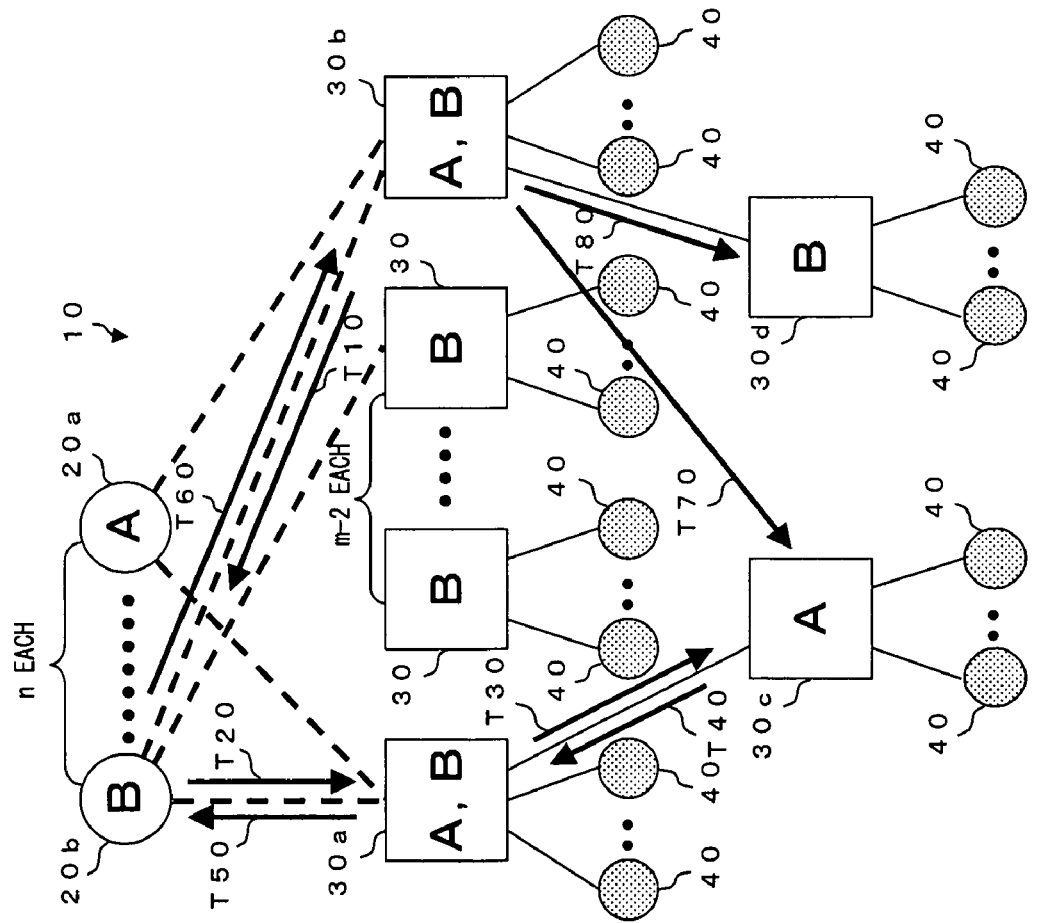

FIGS. 2A and 2B explain negotiation for changing regular access to specific content from the reference requester terminal (client) of a content distribution network, such as P2P-CDN or the like using an IP network, to another cache server to reduce access to the cache server or a content server. In this case, reducing access means reducing the amount of communication of content flowing through a network.

A network 10 comprises a plurality of content servers 20, a plurality of cache servers 30, and a plurality of clients 40. A plurality of cache servers 30 is subordinated to each content server 20 and a plurality of clients is subordinated to each cache server 30.

In FIG. 2A, n (n=integer) content servers 20 are provided. Two cache servers 30a and 30b (A,B) to which content A and B are copied and m−2 (m=integer) cache server 30 (B) to which content B is copied are connected to content server 20b having content B.

Two cache servers 30a and 30b (A,B) to which content A and B are copied are connected to content server 20a (A) having content A. Another cache, cache 30c (A), to which content A is copied is subordinated to the cache server 30a. Another cache, cache 30d (B), to which content B is copied is subordinated to the cache server 30b.

For example, since the cache server 30d is subordinated to the cache server 30b, as shown in FIG. 2B, the cache server 30b transfers a switch request T10 to request that the higher-order content server 20a switch the connection of the cache server 30d to it in order to reduce its load. Upon receipt of the switch request T10, the content server 20a transfers a switch request T20 to the cache server 30 to retrieve for the connecting destination of the cache server 30d.

In FIG. 2, the content server 20a receives a response T50 from the cache server 30a as a switchable connecting destination. In this case, a switch request T30 is also transferred to the cache server 30c from the cache server 30a and if the cache server 30c can be switched, the cache server 30c notifies the cache server 30a of a response T40. Upon receipt of the response T40, the cache server 30a transfers T50 to the content server 20a.

Upon receipt of the response T50, the content server 20a notifies the cache server 30b of a response T60. Upon receipt of the response T60, the cache server 30b transmits switch requests T70 and T80 to the cache servers 30c and 30d, respectively. Although a line connecting the cache servers 30b and 30c is not shown in FIG. 2C, a switch request 70 can actually be transferred since they are logically connected by the setting of an IP address as in an IP network.

FIG. 2B shows that the network shown in FIG. 2A is switched by a switch request. Although content A and B are copied in the cache server 30a, only content B remains in the cache server 30a and the number of cache servers to which content B is copied is modified from m−2 to m−1. Then, the cache server 30a is logically re-connected to cache server 30d to which content B instead of cache server 30c to which content A and which is subordinated to the cache server 30a. As for cache server 30b to which content A and B are copied, only content A remains. Then, cache server 30b is logically re-connected to cache server 30c to which content A is copied instead of cache server 30d to which content B is copied and which is subordinated to cache server 30b.

By the above-described negotiation, regular access to specific content from a client 40 is changed to another cache server and the amount of access to the cache server or a content server can be reduced.

Preferred Embodiment 1

Figure 3:
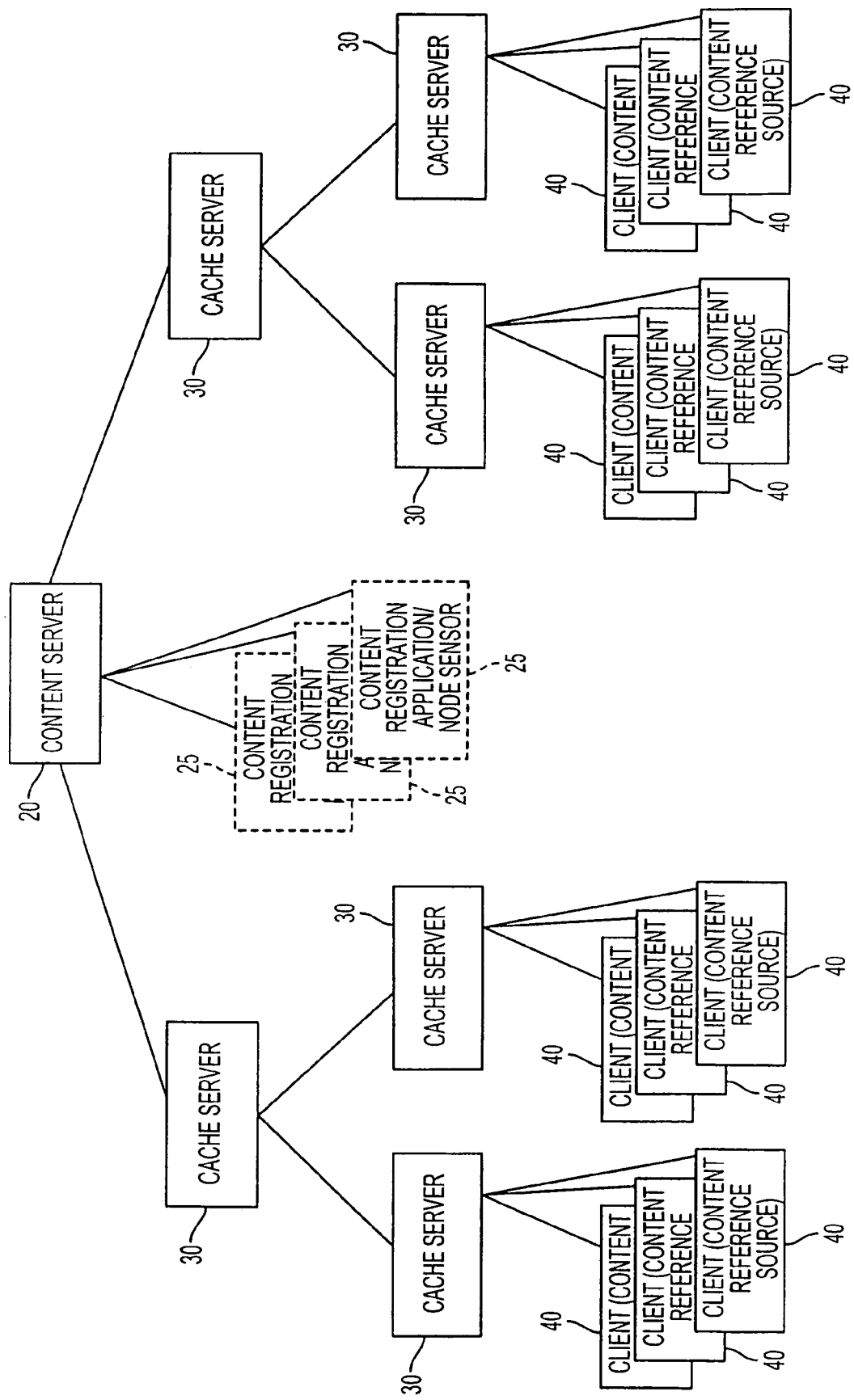
FIG. 3 shows an example of a network configuration to which the present invention is applied.

FIG. 3 shows an example of a network configuration.

In FIG. 3, a content distribution network (CDN) 10 comprises a content server 20 having content, a cache server 30 for caching at least part of the content of the content server 20 and a client (content reference source) 40 referring to the content provided for the content server 20 and a content registration application/node sensor 25 for registering content in the content server 20 and updating it. Since the client 40 has conventional general functions, the content registration application of the content registration application/node sensor 25 can also be mounted on the content server 20 itself. In that case, content is internally registered and updated. The node sensor is a measurement instrument connected to the content server 40 or the like. The content server 40 obtains the result measured by the node sensor and updates the measurement data of content.

Figure 4:
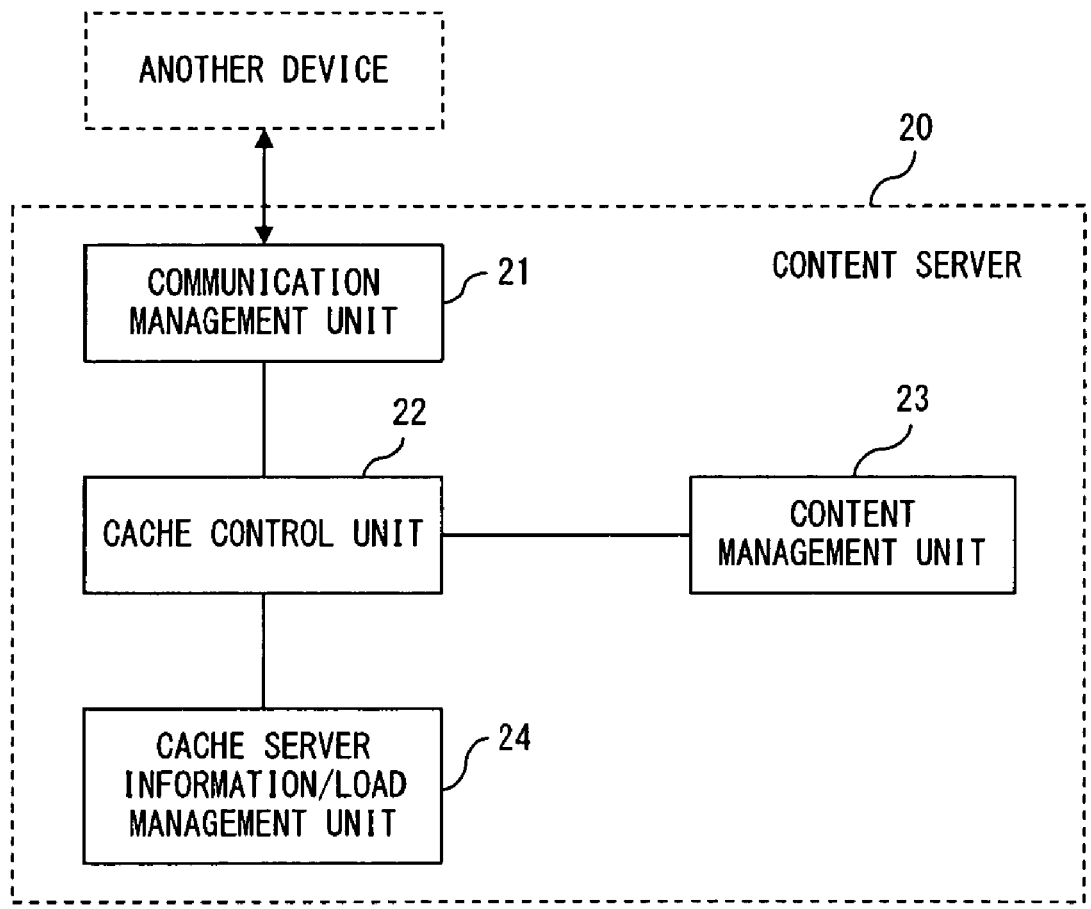
FIG. 4 shows a functional configuration example of a content server.

FIG. 4 shows a functional configuration example of a content server.

In FIG. 4, the content server 20 comprises a communication management unit 21, a cache management unit 22, a content management unit 23, and a cache server information/load management unit 24.

The communication management unit 21 receives communications addressed to the content server 20 from other devices, such as the cache server 30 and the like, and distributes requests to each unit according to its process content. For example, when receiving a cache-related message, the communication management unit 21 transfers the received content to the cache control unit 22. When receiving a request to modify a connecting destination from the cache server 30, the communication management unit 21 searches for another switchable cache server 30 and transmits the modify request of a connecting destination to the cache server 30. The communication management unit 21 also receives a request from each unit and transmits a message corresponding to the request to another device. For example, the communication management unit 21 transmits a message requesting the updating of a cache to the cache server 30.

The cache management unit 22 determines necessary processes in each case using a request from each unit as a trigger and distributes the processes to each unit.

The content management unit 23 stores and manages cached content.

The cache server information/load management unit 24 stores and manages the cache server information of the cache server 30 that caches content and manages a load due to file provision.

FIG. 5 shows a configuration example of a cache server which cannot switch a plurality of connecting destinations simultaneously.

In FIG. 5, the cache server 30 comprises a communication management unit 31, a cache control unit 32, a cache/connecting destination determination unit 33, a cache information/load management unit 34, and a content server/higher-order cache server information management unit 35.

The communication management unit 31 receives communications addressed to the cache server 30 from other devices, such as the content server 20, another cache server 30 and the like, and distributes requests to each unit according to its process content. For example, when receiving a cache-related message, the communication management unit 31 transfers the received content to the cache control unit 32. The communication management unit 31 also receives a request from each unit and transmits a message corresponding to the request to another device. For example, the communication management unit 31 transmits a message requesting the updating of a cache to the content server 20 or another cache server 30 and a message requesting that the content server 20 switch the connecting destination of a cache server 30 that has obtained its cache.

The cache control unit 32 determines necessary processes in each case using a request from each unit as a trigger and distributes the processes to each unit.

The cache/connecting destination determination unit 33 determines or modifies cached content, its connecting destination (acquisition source) and its attribute on the basis of a request from the client 40 or another cache server 30.

The cache information/load management unit 34 stores and manages the cache server information of cached content, the client 40 or another cache server 30 that requests it, and monitors its own load by managing a load due to file provision. If the load is heavy, the cache information/load management unit 34 instructs a portion of the other cache servers 30 that regularly obtain their own cache to obtain a cache from another cache server 30.

The content server/higher-order cache server information management unit 35 stores and manages the cache server information of cached content and a content server 20 having its original or a content acquisition source higher-order cache server 30. If the content acquisition source is a higher-order cache server 30, the content server/higher-order cache server information management unit 35 further stores and manages the cache server information of its connecting destination cache server 30 and manages a load due to the file acquisition.

Next, operation examples of the content distribution network are described with reference to FIGS. 6 through 26.

Figure 6:
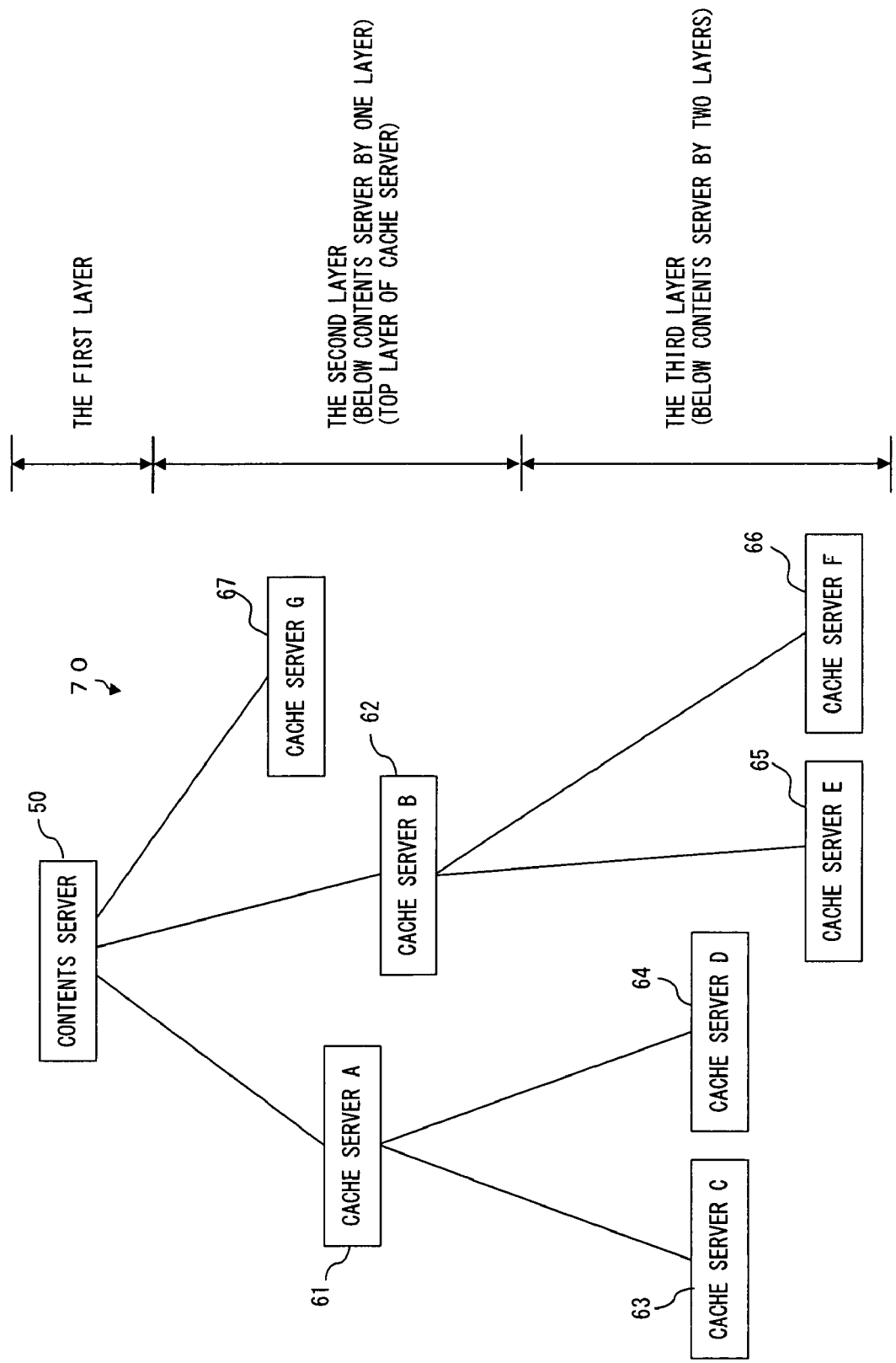
FIG. 6 shows a content distribution network used to explain an operation example to which the present invention is applied.

FIG. 6 shows a content distribution network used to explain an operation example to which the present invention is applied.

In FIG. 6, in a content distribution network (CDN) 70, a content server 50 is a root (the first layer). Then, cache servers A61, B62 and G67 are immediately subordinated to the content server 50, cache servers C63 and D64 are immediately subordinated to the cache server 61A, and cache servers E65 and F66 are immediately subordinated to the cache server B62 (subordinated to the content server 50 below the second layer). Usually several clients, which are not shown in FIG. 6, are connected to these cache servers A61 through G67.

These cache servers A61 through G67 cache the content in the content server 50 according to a request from a client and distribute it to the client. Each of the cache servers A61 through G67 comprises a load measurement unit, an overload determination unit, a connecting destination retrieve request information transmitting unit, a connecting destination information receiving unit, and a switch request transmitting unit.

The load measurement unit measures, for example, the load of the cache server A61 caused by the cache server C63 subordinated to the cache server A61 caching content cached in the cache server A61.

The overload determination unit determines whether the load measured by the load measurement unit is overloaded by comparing it with a predetermined value.

In this case, the load of the cache server A61 can be measured by using the size of the content to which access is requested by the cache server C63 as the load source. Alternatively, it can be measured on the basis of the number of clients requesting access to the cache server C63.

Alternatively, it can be measured on the basis of access frequency to the cache server C63. Another alternative is it can be measured on the basis of the degree of overlap between content cached by the cache server A61 and content cached by the cache server C63 and D64. The load measurement based on this degree of overlap is available, for example, only when only the cache server C63 is subordinated to the cache server A61. This is because when content cached by the cache server A61 and content cached by the cache server C63 are the same, in other words when content cached by the cache servers A61 and C63 which have a subordinate relation are overlapped, the existence of the cache server C63 has no meaning.

The connecting destination retrieve request information transmitting unit transmits connecting destination retrieve request information requesting the content server 50 or another cache server D64 to search for the connecting destination of the cache server C63 that is the source of the load when the overload determination unit determines that the load is overloaded. In this case, the transmission to the content server 50 or another cache server D64 is executed in a predetermined order. For example, the connecting destination retrieve request information is transmitted from the higher-order content server 50 of a hierarchically structured content distribution network 70 in descending order. When transmitting the connecting destination retrieve request information, information about the cache server C63 being the source of the load can also be transmitted together with it.

The connecting destination information receiving unit receives connecting destination information indicating a connecting destination retrieved by the content server 50, such as information indicating that it can be connected to the cache server B62 and the like, from the transmitting destination content server 50 to which the connecting destination retrieve request information transmitting unit has transmitted the connecting destination retrieve request information.

The switch request transmitting unit transmits switch request information requesting the cache server C63 to switch its connection to a connecting destination indicated by the connecting destination information (the cache server B62) on the basis of the connecting destination information received by the connecting destination information receiving unit.

Then, the cache server C63 switches its connecting destination to the cache server B62 from the cache server A61.

The content server 50 comprises a connecting destination retrieve request information receiving unit, a connecting destination retrieve request information transfer unit, a connecting destination connectability determination result receiving unit, a connecting destination determination unit, and a connecting destination connectability determination result transmitting unit.

The connecting destination retrieve request information receiving unit receives connecting destination retrieve request information requesting a search for the connecting destination of the cache server C63 that is the source of the load from the cache server A61. The connecting destination retrieve request transfer unit transfers the connecting destination retrieve request information received by the connecting destination retrieve request information receiving unit to another cache server B62 subordinated to the content server 50.

The connecting destination connectability determination result receiving unit receives a connecting destination connectability determination result indicating whether the cache server B62 can determine the connecting destination of the cache server C63 from the cache server B62 to which the connecting destination retrieve request information is transferred. The connecting destination determination unit determines whether the cache server B62 can be used as the connecting destination of the load source cache server C63 on the basis of the load of the cache server B62 when all the connecting destination connectability determination results received by the connecting destination connectability determination result receiving unit cannot determine the connecting destination of the cache server C63.

The connecting destination connectability determination result transmitting unit transmits, to the cache server B62, the connecting destination connectability determination result indicating whether the cache server B62 can be used as the connecting destination of the load source cache server C63.

Another cache server B62 requested to search for a connecting destination by the content server 50 comprises a connecting destination retrieve request information receiving unit, a connecting destination determination unit, a connecting destination retrieve request information transfer unit, and a connecting destination connectability determination result transmitting unit.

The connecting destination retrieve request information receiving unit receives connecting destination retrieve request information requesting for a search for the connecting destination of the cache server C63 that is the source of the load of the cache server A61 from the content server 50. The connecting destination determination unit determines whether the cache server B62 can be used as the connecting destination of the load source cache server C63 on the basis of the load of the cache server B62 itself after the connecting destination retrieve request information receiving unit receives the connecting destination retrieve request information. In this case, the load of the cache server B62 itself is basically measured using the same reference as when the load of the cache server A61 is measured and it is determined whether the cache server B62 can be used as the connecting destination by determining whether its load is overloaded if the cache server C63 is connected.

The connecting destination retrieve request information transfer unit transfers the connecting destination retrieve request information to another cache server E65 or F66 that is subordinated to the cache server B62 in a predetermined order when the connecting destination connectability determination result indicating whether the cache server B62 can determine the connecting destination of the cache server C63, which has been determined by the connecting destination determination unit, indicates that the cache server B62 cannot be used as the connecting destination of the cache server C63 (i.e., when the connecting destination determination unit has determined that its load is overloaded if the cache server C63 is connected).

The connecting destination connectability determination result transmitting unit transmits the connecting destination connectability determination result indicating whether the cache server B62 can determine the connecting destination of the cache server C63, which has been determined by the connecting destination determination unit, to the content server 50 that has transmitted the connecting destination retrieve request information.

Figure 7:
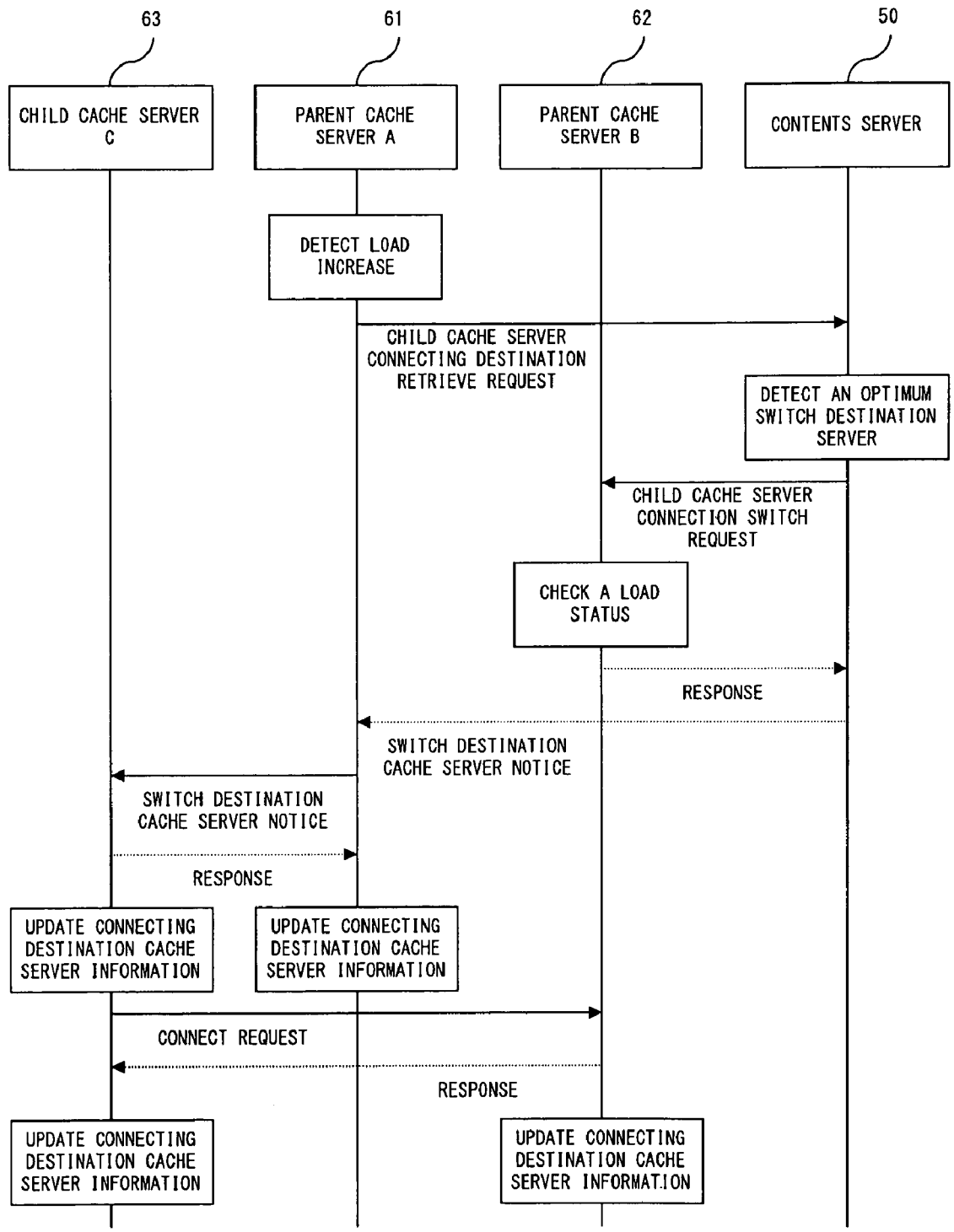
FIG. 7 shows an operation example of switching the connecting destination of a cache server subordinated below the second layer because of the load increase of a cache server in the top layer.

FIG. 7 shows an operation example of switching the connecting destination of a cache server subordinated below the second layer because of the load increase of a cache server in the top layer.

FIG. 8 shows an example of information included in a connecting destination switch response message. FIG. 9 shows an example of information included in a connecting destination switch request message. These messages are received when a cache server or content server that searches for a switch destination inquires as to whether a switch destination candidate can be connected.

FIG. 10 shows an example of information included in a switch destination notifying message. FIG. 11 shows an example of information included in a switch destination response message. These messages are transmitted/received when a content server or a cache server transmits such information to a cache server whose switch destination is determined.

FIG. 12 shows an example of information included in a connect request message. FIG. 13 shows an example of information included in a connect response message. These messages are transmitted/received when a cache server that has known its switch destination is connected to the switch destination.

The response statuses "OK/NG" in FIGS. 7 to 13 indicate the possibility/impossibility of connection, respectively.

Firstly, when the parent cache server A61 (the top layer cache server) detects the load increase of the cache server A61 itself, the cache server A61 transmits the connection destination retrieve request of a child cache server C63 that is the source of the load to the content server 50, immediately subordinating the cache server A61. In this case, if necessary, it is modified to a cache server-led content update.

Then, the content server 50 retrieves a switch destination cache server optimum for the child cache server C63 from cache servers connected to the content server 50 itself.

In this case, the cache server B62 is retrieved as its switch destination by the determination method described with reference to FIG. 6 and a child cache server connection switch request (see FIG. 8) is transmitted to the cache server B62.

For example, when searching for a cache server to which a retrieve request is transferred, the content server 50 can also refer to the cache information/load management unit 34 for managing cache servers that access it and select a cache server from them at random.

Then, the parent cache server B62 selected as its connecting destination (the highest-order cache server) checks its own load status and it returns its OK response to the content server 50 if it can be connected (see FIG. 9).

Then, the parent cache server A61 transmits information about the switch destination parent cache server B62 (see FIG. 10) to the child cache server C63.

Then, the child cache server C63 returns its response (see FIG. 11) to the parent cache server A61 and updates the connecting destination cache server information of the parent cache server C63.

In this example, since the switch destination is modified from A to B, the fact that they are being modified is reflected in the content server/higher-order cache server information management unit 35. A connect request (see FIG. 12) is transmitted to the parent cache server B62.

Then, upon receipt of a response (see FIG. 11), the parent cache server A63 updates its connecting destination cache server information. Then upon receipt of the connect request (see FIG. 12), the parent cache server B62 returns its response (see FIG. 13) and updates its own connecting destination cache server information.

Lastly, upon receipt of the response (see FIG. 13), the child cache server C63 updates the connecting destination cache server information of the cache server C63 itself.

Figure 14:
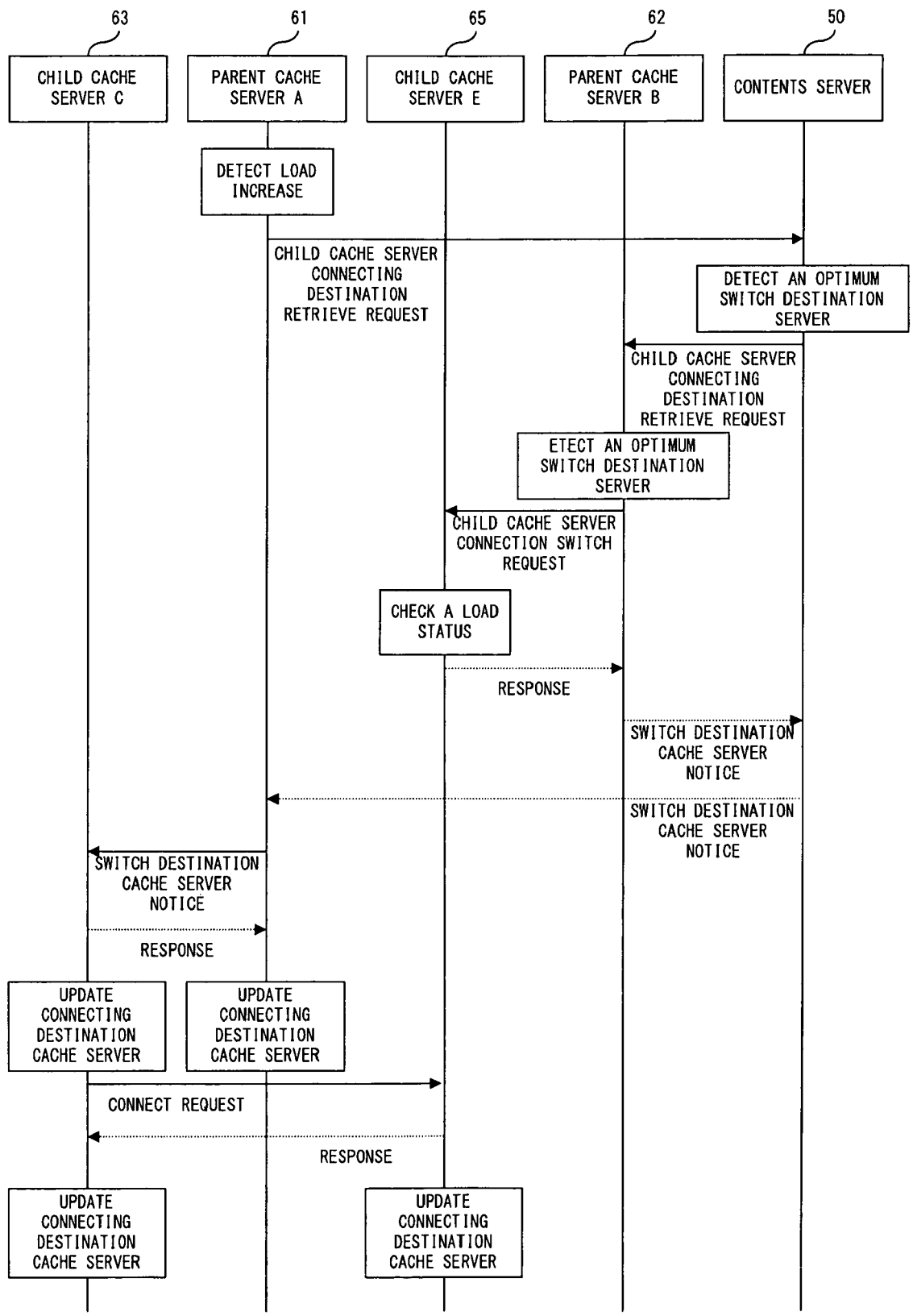
FIG. 14 shows an operation example of switching the connecting destination of a cache server subordinated below the second layer to another cache server subordinated below the second layer due to the load increase of a cache server in the top layer.

FIG. 14 shows an operation example of switching the connecting destination of a cache server subordinated below the second layer to another cache server subordinated below the second layer because of the load increase of a cache server in the top layer.

FIG. 15 shows an example of information included in a connecting destination retrieve request message. FIG. 16 shows an example of information included in a connecting destination retrieve response message. These messages are transmitted/received when a cache server or a content server that searches for its switch destination makes an inquiry to another server of its switch destination candidate.

Firstly, when detecting its own load increase, the parent cache server A61 (the top layer cache server) shown in FIG. 14 transmits a request to search for the connecting destination of a child cache server C63 that is the source of the load to a content server 50 immediately subordinating the cache server 61.

Then, the content server 50 retrieves a switch destination cache server optimum for the child cache server C63 from the cache servers connected to it. In this case, however, the optimum switch destination cache server cannot be retrieved by the determination method described with reference to FIG. 6.

Therefore, the content server 50 retrieves a switch destination cache server optimum for the child cache server C63 from cache servers connected to the cache server B62 that is in turn subordinated to the content server 50. In this case, the cache server E65 is retrieved as its switch destination by the determination method described with reference to FIG. 6 and transfers a child cache server connection switch request (see FIG. 15) to the cache server E65.

Then, upon receipt of the child cache server connection switch request, the child cache server E65 checks its own load status and returns its OK response to the parent cache server B62 if it can be connected (see FIG. 16).

Then, upon receipt of the response, the parent cache server B62 transmits a switch destination cache server notice (information about the child cache server E65) to the content server 50.

Then, the content server 50 transmits a switch destination cache server notice (information about the child cache server E65) to the parent cache server A61 (see FIG. 10).

Then, the parent cache server A61 transmits information about the child cache server E65 that is its switch destination (see FIG. 10) to the child cache server C63.

Then, the child cache server C63 returns its response (see FIG. 11) to the parent cache server A61 and updates its own connecting destination cache server information.

In this example, since a switch destination is modified from A to E, the fact that it is being modified is reflected in the content server/higher-order cache server information management unit 35.

A connect request (see FIG. 12) is also transmitted to the child cache server E65.

Then, upon receipt of the response (see FIG. 11), the parent cache server A63 updates its own connecting destination cache server information.

Then, upon receipt of the connect request (see FIG. 12), the child cache server E65 returns its response (see FIG. 13) and updates its own connecting destination cache server information.

Lastly, upon receipt of the response (see FIG. 13), the child cache server C63 updates its own connecting destination cache server information.

FIG. 17 shows an operation example of switching the connecting destination of a cache server subordinated below the second layer to another cache server subordinated below the second layer because of the load increase of a cache server in the top layer.

Firstly, when detecting its own load increase, the parent cache server A61 (the top layer cache server) retrieves a connecting destination optimum for a child cache server C63 from cache servers connected to it. In this case, the cache server D64 is retrieved and the cache server A61 transmits a child cache server connection switch request (see FIG. 8) to the cache server D64. At this moment, if necessary, it is modified to a cache server-led content update.

Then, the child cache server D64 selected as its connecting destination receives the child cache server connection switch request (see FIG. 8), checks its own load status and returns its OK response (see FIG. 9) to the parent cache server A61 if it can be connected.

Then, upon receipt of the response, the parent cache server A61 transmits a switch destination cache server notice (information about the child cache server D64) to the child cache server C63 that is the source of the load of the cache server A61 (see FIG. 10).

Then, the child cache server C63 returns its response to the parent cache server A61 (see FIG. 11) and updates its own connecting destination cache server information. It also transmits a connect request to the child cache server D64 (see FIG. 12).

Then, upon receipt of the response, the parent cache server A61 updates its own connecting destination cache server information.

Then, upon receipt of the connect request, the child cache server D64 returns its response (see FIG. 13) and updates its own connecting destination cache server information.

Lastly, upon receipt of the response (see FIG. 13), the child cache server C63 updates its own connecting destination cache server information.

Figure 18:
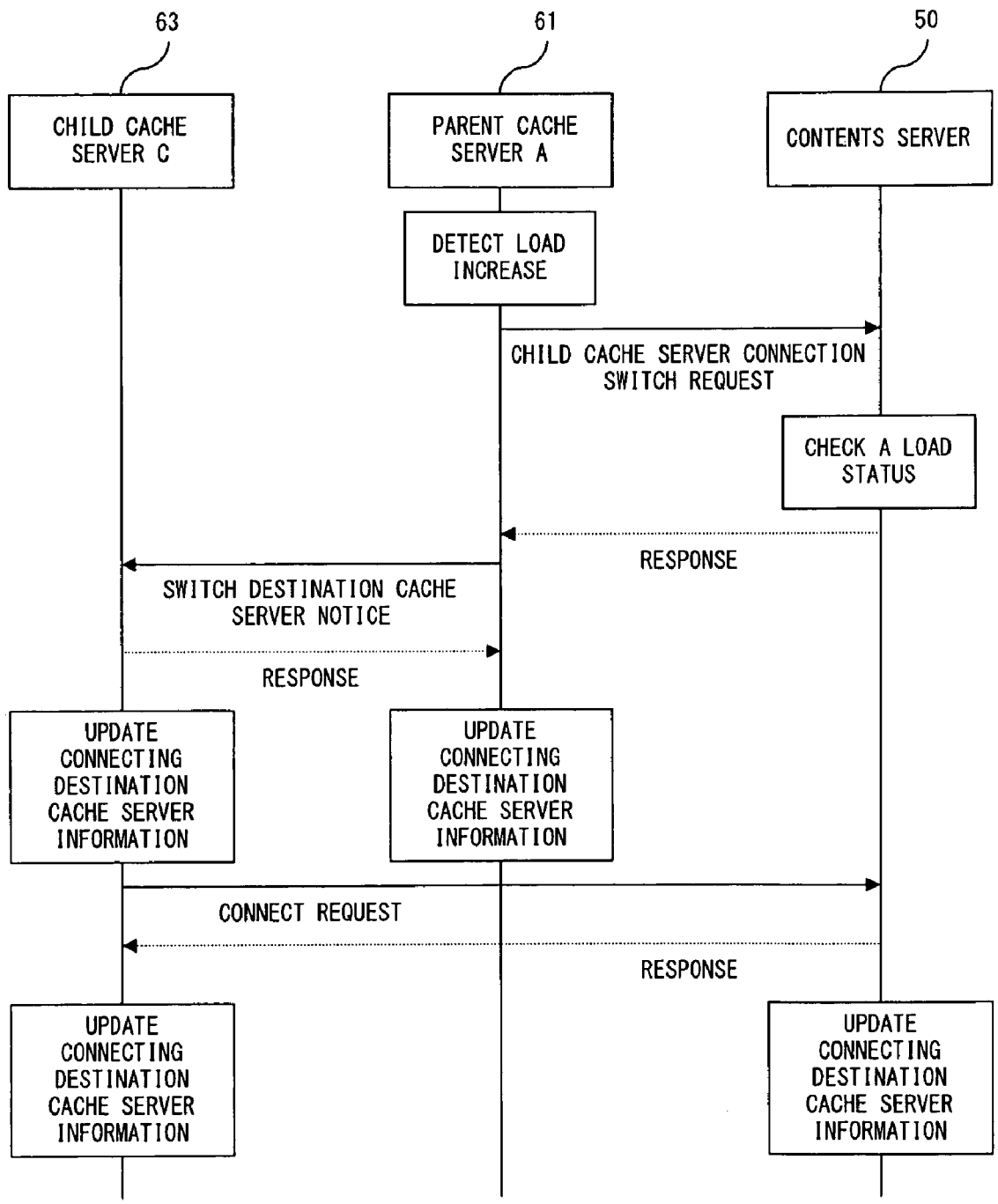
FIG. 18 shows an operation example of switching the connecting destination of a cache server subordinated below the second layer to a content server due to the load increase of a cache server in the top layer.

FIG. 18 shows an operation example of switching the connecting destination of a cache server subordinated below the second layer to a content server because of the load increase of a cache server in the top layer.

Firstly, when detecting its own load increase, the parent cache server A61 (the top layer cache server) transmits a child cache server connection switch request to the content server 50. At this moment, if necessary, it is modified to a cache server-led content update.

Then, the content server 50 refers to its own load and if it can be connected, it notifies the parent cache server A61 of this fact.

Then, the parent cache server A61 transmits switch destination cache server information (information about the content server 50) to the child cache server C63.

Then, the child cache server C63 returns its response to the parent cache server A61 and updates its own connecting destination cache server information. It also transmits a connect request to the content server 50.

Then, upon receipt of the response, the parent cache server A61 updates its own connecting destination cache server information.

Then, upon receipt of the connect request, the content server 50 returns its response and updates its own connecting destination cache server information.

Lastly, upon receipt of the response, the child cache server C63 updates its own connecting destination cache server information.

Figure 19:
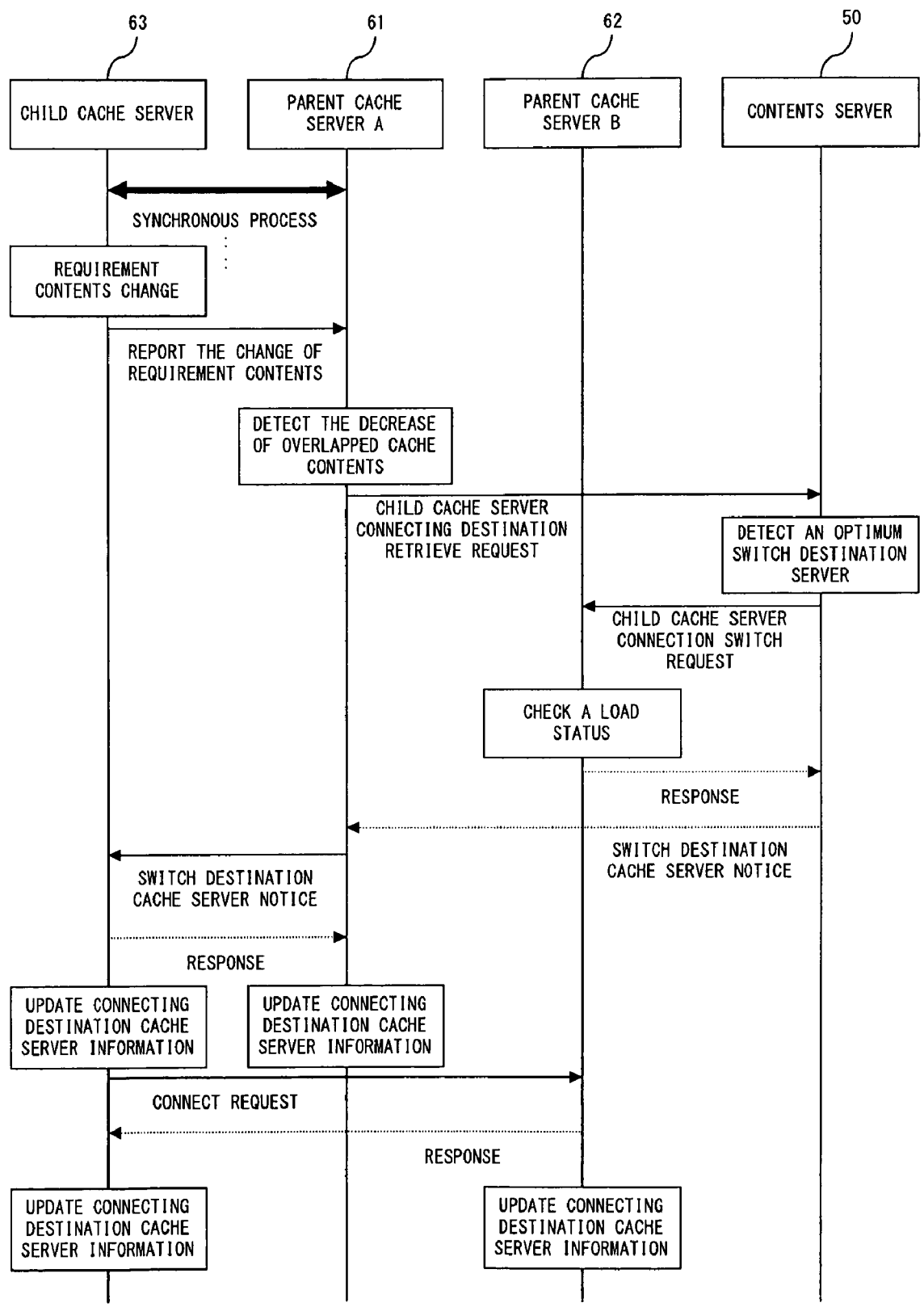
FIG. 19 shows an operation example in the case where the connection is switched because of the reduction of overlapped cache content between a parent cache server and a child cache server.

FIG. 19 shows an operation example in the case where the connection is switched because of the reduction of overlapped cache content between a parent cache server and a child cache server.

Firstly, the child cache server C63 and the parent cache server A61 regularly synchronize their cached content with each other.

Then, the child cache server C63 notifies the parent cache server A61 of the change of requested content. Although each cache server manages accesses from another cache server and a client by the cache information/load management unit 34, it recognizes the change of requested content on the basis of its modification.

Then, when detecting the reduction of content overlapped and cached with the child cache server C63, the parent cache server A61 transmits a child cache server connecting destination retrieve request to its connected content server 50.

In this example, it is determined that if the amount of access to specific content from the cache server C63 decreases, it becomes easy to switch to another server. The amount of access is determined on the basis of the change notice of requested content.

Then, the content server 50 retrieves a switch destination cache server optimum for the child cache server C63 from cache servers connected to it and transmits a child cache server connection switch request to the retrieved cache server B62.

Then, the parent cache server B62 selected as its switch destination checks its own load status and returns its OK response to the content server 50 if it can be connected. The load status is determined by whether the amount of a new access exceeds the threshold value of a current CPU utilization and by information managed by the cache information/load management unit 34 of each cache server.

Then, upon receipt of the response, the content server 50 transmits a switch destination cache server notice (information about the parent cache server B62) to the parent cache server A61.

Then, the parent cache server A61 transmits the switch destination cache server notice (information about the parent cache server B62) to the child cache server C63.

Then, the child cache server C63 returns its response to the parent cache server A61 and updates its own connecting destination cache server information. It also transmits a connect request to the parent cache server B62.

Then, upon receipt of the response, the parent cache server A61 updates its own connecting destination cache server information. In this example, since the cache server A61 is no more the connecting destination of the cache server C63, the information is reflected in the content server/higher cache server information management unit 35.

Then, upon receipt of the connect request, the parent cache server B62 returns its response to the child cache server C63 and updates its own connecting destination cache server information.

Lastly, upon receipt of the response, the child cache server C63 updates its own connecting destination cache server information.

Figure 20A:
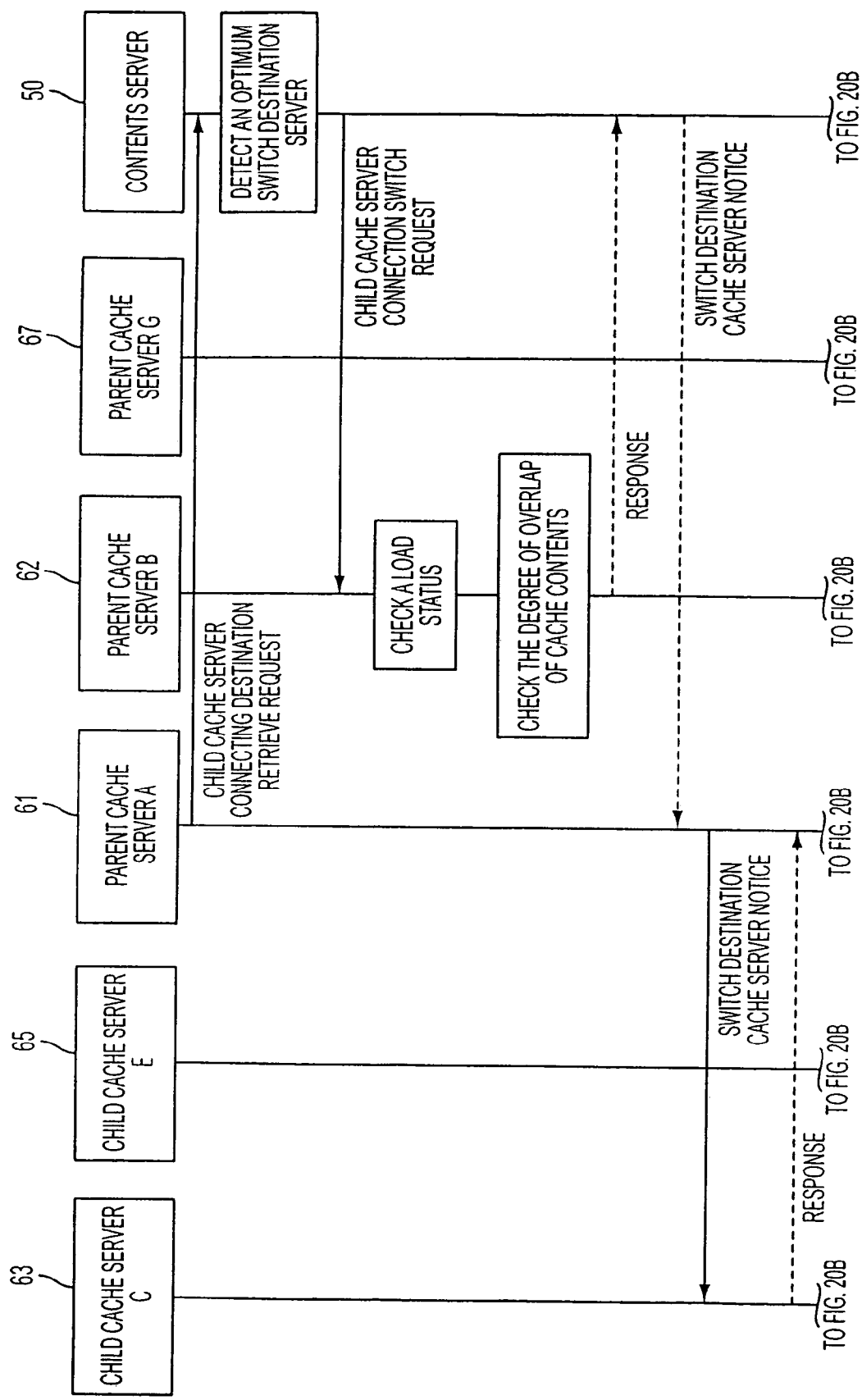
FIGS. 20A, 20B, and 20C show an operation example in the case where a request to switch a cache server whose cached content is greatly overlapped is received from a content server.
Figure 20B:
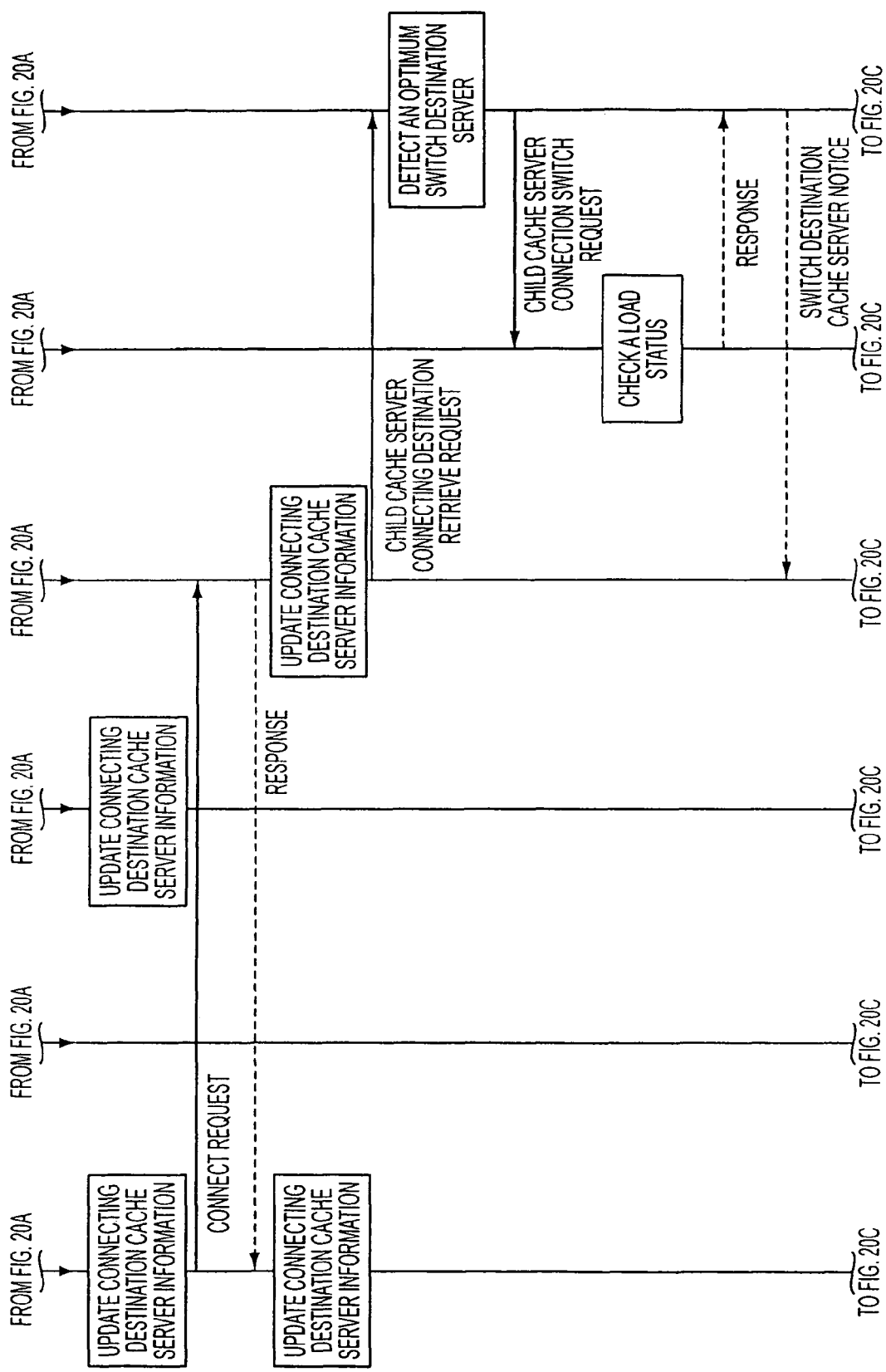
Figure 20C:
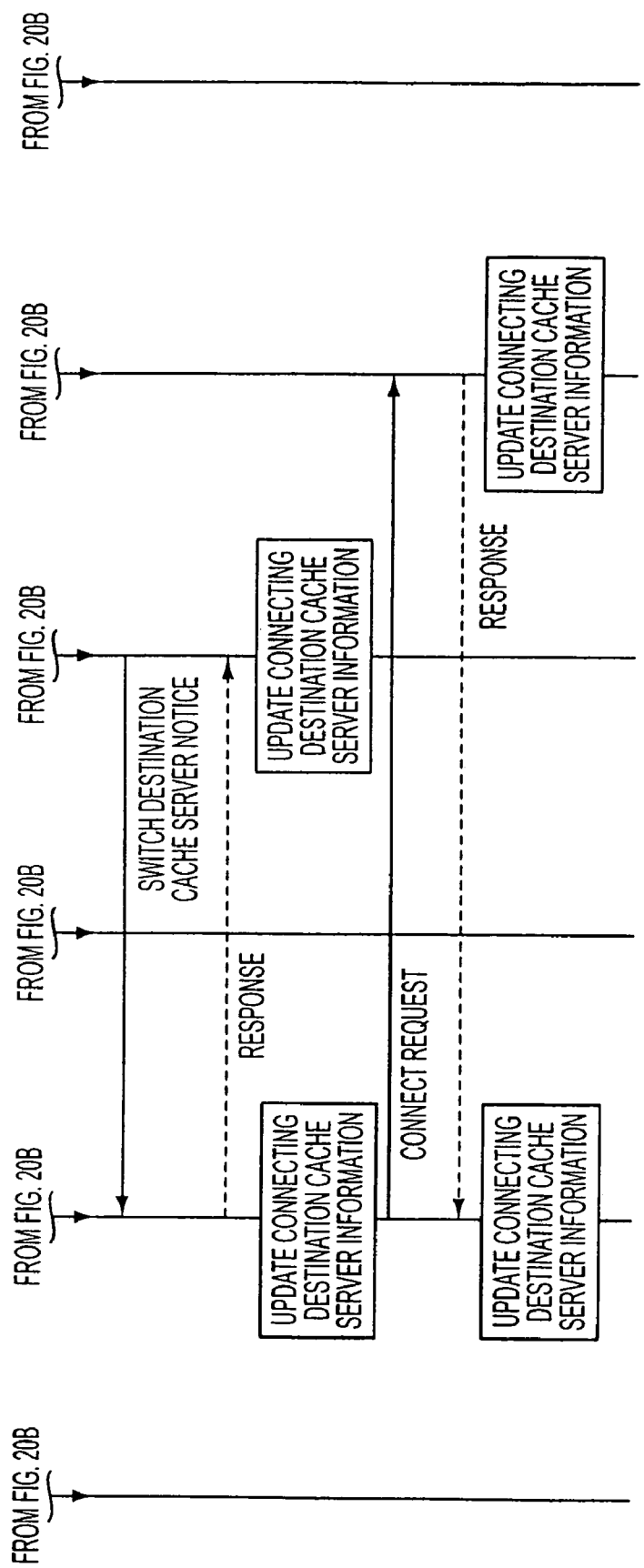

FIGS. 20A, 20B, and 20C show an operation example in the case where a request to switch a cache server whose cached content is greatly overlapped is received from a content server.

Firstly, the parent cache server A61 transmits a child cache server connecting destination retrieve request to the content server 50.

Then, the content server 50 retrieves a switch destination cache server optimum for the child cache server C63 from cache servers connected to it and transmits a child cache server connection switch request to the retrieved cache server B62.

Then, the parent cache server B62 selected as its switch destination checks its own load status. In this case, if content cached with the child cache server C63 that has received a connect request is greatly overlapped even when the load is heavy, the parent cache server B62 is connected to this child cache server C63 and is switched from the child cache server E65 whose cached content is only slightly overlapped with it. Therefore, it returns its response to the content server 50.

If the same content as that in another access is referenced when receiving a new access, an access to a higher-order cache server/content server can be shared. This is determined by referring to the content server/higher-order cache server information management unit 35.

Then, upon receipt of the response, the content server 50 transmits a switch destination cache server notice (information about the parent cache server B62) to the parent cache server A61.

Then, the parent cache server A61 transmits the switch destination cache server notice (information about the parent cache server B62) to the child cache server C63.

Then, the child cache server C63 returns its response to the parent cache server A61 and updates its own connecting destination cache server information. It also transmits a connect request to the parent cache server B62.

Then, upon receipt of the response, the parent cache server A61 updates its own connecting destination cache server information.

Then, upon receipt of the connect request, the parent cache server B62 returns its response and updates its own connecting destination cache server information.

Then, upon receipt of the response, the child cache server C63 updates its own connecting destination cache server information.

Then, since its load increases, the parent cache server B62 transmits a child cache server connecting destination retrieve request to the content server 50.

Then, the content server 50 retrieves a switch destination cache server optimum for the child cache server E65 from cache servers connected to it and transmits a child cache server connection switch request to the retrieved cache server G67.

Then, the parent cache server G67 selected as its switch destination checks its own load status and transmits its OK response to the content server 50 if it can be connected.

Then, upon receipt of the response, the content server 50 transmits a switch destination cache server notice (information about the parent cache server G) to the parent cache server B62.

Then, the parent cache server B62 transmits the switch destination cache server notice (information about the parent cache server G) to the child cache server E65.

Then, the child cache server E65 returns its response to the parent cache server B62 and updates its own connecting destination cache server information. It also transmits a connect request to the parent cache server G67.

Then, upon receipt of the response, the parent cache server B62 updates its own connecting destination cache server information.

Then, upon receipt of the connect request, the parent cache server G67 returns its response to the child cache server E65 and updates its own connecting destination cache server information.

Lastly, upon receipt of the response, the child cache server E65 updates its own connecting destination cache server information.

Figure 21:
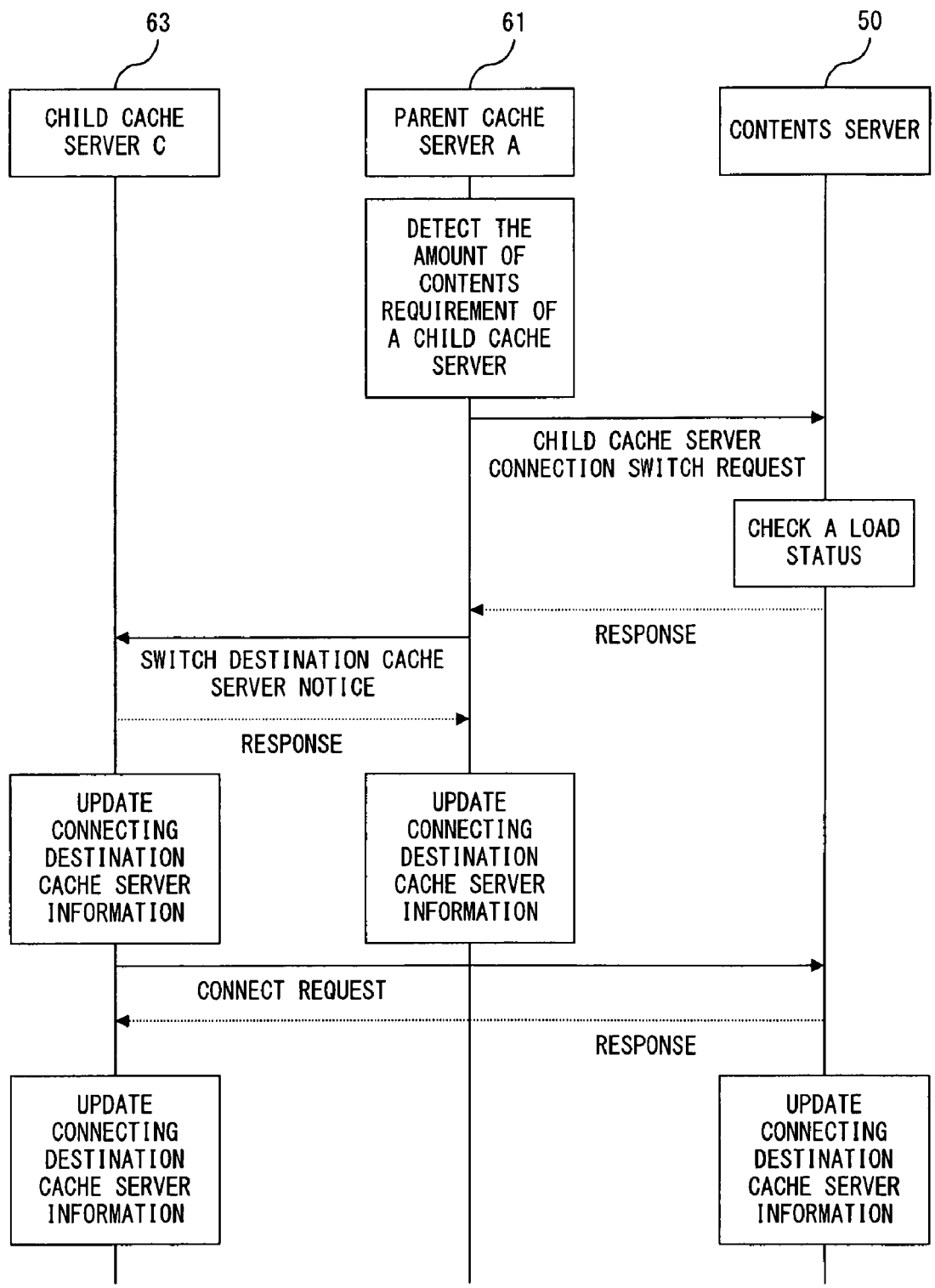
FIG. 21 shows a connecting destination switch operation example in the case where the amount of content requested by a child cache server relatively increases and the child cache server is directly connected to a content server.

FIG. 21 shows a connecting destination switch operation example in the case where the amount of content requested by a child cache server relatively increases and the child cache server is directly connected to a content server.

Firstly, when the amount of content requested by the child cache server C63 increases or the amount of content requested by the parent cache server A61 decreases, the parent cache server A61 detects the relative increase of the amount of content of the child cache server C63.

If a parent cache server caches according to an access request from a specific child cache server, it is efficient to directly connect the child cache server to a content server or a higher-order cache server. Such a situation can be determined by detecting from the cache information/load management unit 34 and the content server/higher-order cache server information management unit 35 that the amount of access from the specific child cache server and the amount of access to a higher-order cache server are equal to or less than a specific threshold value.

Then, the parent cache server A61 transmits a child cache server connect request to directly connect the child cache server C63 whose content increase has been detected to the content server 50.

Then, the content server 50 checks its own load status and returns its OK response to the parent cache server A61 if the child cache server C63 can be connected.

Then, the parent cache server A61 transmits a connecting destination server switch request to directly connect, to the child cache server C63, the child cache server C63 to the content server 50.

Then, the child cache server C63 returns its response to the parent cache server A61, simultaneously updates its own connecting destination cache server information, and further transmits a connect request to the content server 50.

Then, upon receipt of the connect request, the content server 50 returns its response to the child cache server C63 and simultaneously updates its own connecting destination cache server information.

Lastly, upon receipt of the response, the child cache server C63 updates its own connecting destination cache server information.

Figure 22:
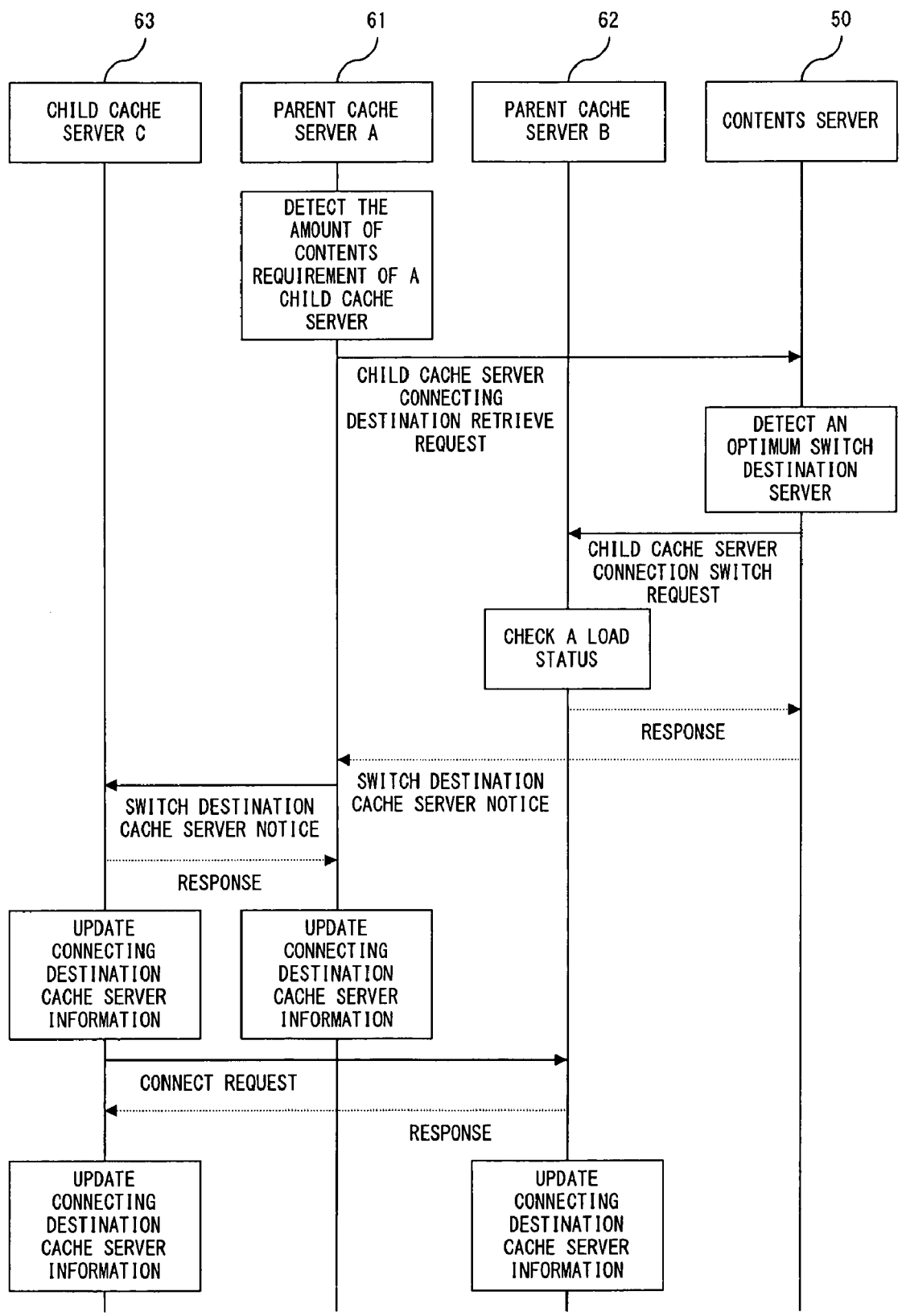
FIG. 22 shows a connecting destination switch operation example in the case where the amount of content requested by a child cache server relatively increases and the connection of the child cache server is switched to another cache server.

FIG. 22 shows a connecting destination switch operation example in the case where the amount of content requested by a child cache server relatively increases and the connection of the child cache server is switched to another cache server.

Firstly, when the amount of content requested by the child cache server C63 increases or the amount of content requested by the parent cache server A61 decreases, the parent cache server A61 detects the relative increase in the amount of content of the child cache server C63.

Then, the parent cache server A61 transmits a child cache server switch request to its connected content server 50.

Then, the content server 50 retrieves a switch destination cache server optimum for the child cache server C63 from cache servers connected to it and transmits a child cache server connect request to the retrieved cache server B62.

Then, the parent cache server B62 selected as its connecting destination checks its own load status and returns its OK response to the content server 50 if it can be connected.

Then, upon receipt of the response, the content server 50 transmits information about the parent cache server B62 to the parent cache server A61.

Then, the parent cache server A61 transmits the information about the parent cache server B62 to the child cache server C63.

Then, the child cache server C63 returns its response to the parent cache server A61 and updates its own connecting destination cache server information. It also transmits a connect request to the parent cache server B62.

Then, upon receipt of the response, the parent cache server A61 updates its own connecting destination cache server information.

Lastly, upon receipt of the response, the child cache server C63 updates its own connecting destination cache server information.

Figure 23:
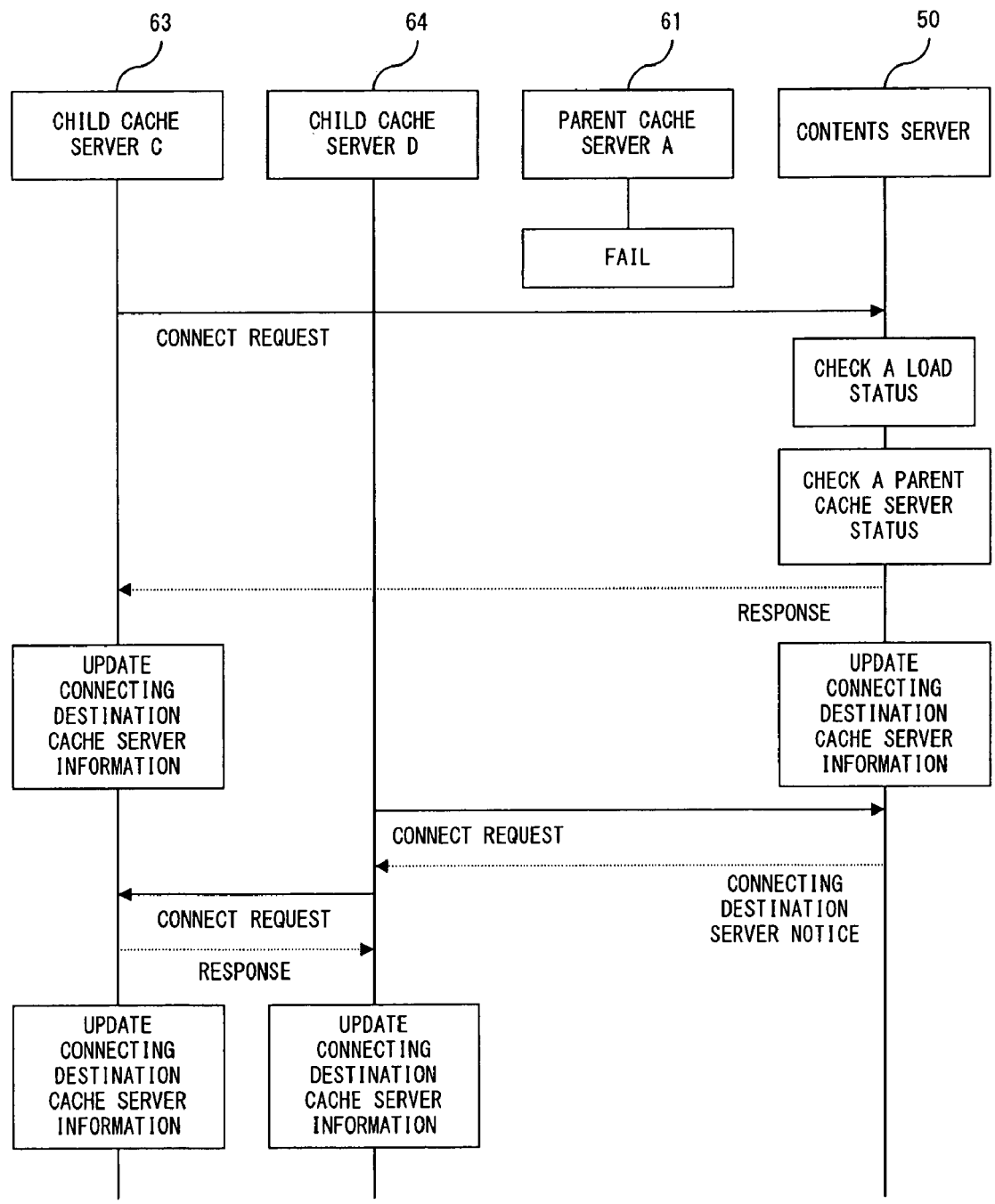
FIG. 23 shows an operation example in the case where a parent cache server fails and the connecting destination of the cache server is modified.

FIG. 23 shows an operation example in the case where a parent cache server fails and the connecting destination of the cache server is modified.

Firstly, the parent cache server A61 fails and stops.

Then, the child cache servers C62 and D63 connected to the stopped parent cache server A61 transmit connect requests to the content server 50.

Then, when receiving the first connect request (for example, a connect request from the cache server C), the content server 50 checks its own load status and further checks the status of the parent cache server A61. When the parent cache server A61 stops, the content server 50 returns its response to the child cache server C63 and updates its own connecting destination cache server information.

Then, the content server 50 reports information about the child cache server C63 connected first as a connecting destination server in response to a connect request received after that (a connect request from a cache server D64).

Then, upon receipt of the notice, the child cache server D64 transmits a connect request to the child cache server C63.

Then, upon receipt of the connect request, the child cache server C63 returns its response and updates its own connecting destination cache server information.

Lastly, upon receipt of the response, the child cache server D64 updates its own connecting destination cache server information.

When there are other child cache servers, the same process is applied to all the other child cache servers.

Figure 24:
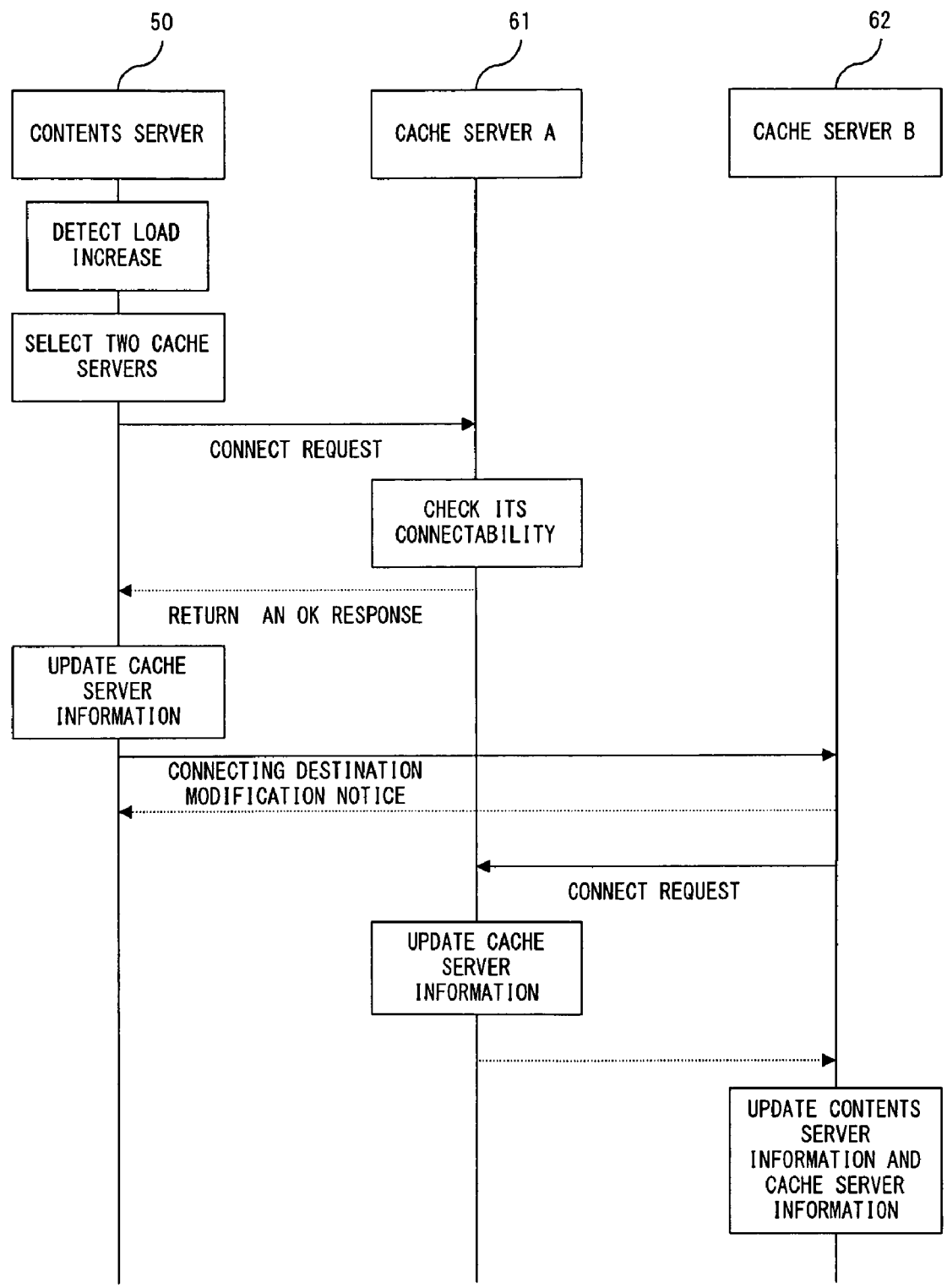
FIG. 24 shows an operation example of switching the connecting destination of the top layer cache server to another cache server.

FIG. 24 shows an operation example of switching the connecting destination of the top layer cache server to another cache server.

Firstly, the content server 50 detects its own load increase and retrieves the two cache servers A61 and B62 whose obtained content is most overlapped from its connected cache servers. For example, the two cache servers may be selected at random. The list of servers to select can be obtained from the cache information/load management unit 34.

Then, of the two cache servers A61 and B62, the one having greater content (in this example, the cache server A61) and the one having smaller content (in this example, the cache server B62) are specified as higher-order and lower-order ones, respectively. Then, the content server 50 transmits a request to connect the lower-order cache server B62 to the higher-order cache server A61.

Then, the cache server A61 receives the connect request and checks its own load status. If it can be connected, the cache server A61 notifies the content server 50 of this fact.

Then, the content server 50 its own connecting destination cache server information and notifies the cache server B62 of the connecting destination modification.

Then, upon receipt of the notice, the cache server B62 updates its content server information and cache server information and transmits a connect request to the cache server A61.

Lastly, upon receipt of the connect request, the cache server A61 updates its own cache server information and returns its response.

As for the content server information and the updating of the cache server information, since the cache server B62 has so far been directly connected to the content server 50, the content server information is also updated. Its operational content is reflected in the content server/higher-order cache server information management unit 35.

Figure 25:
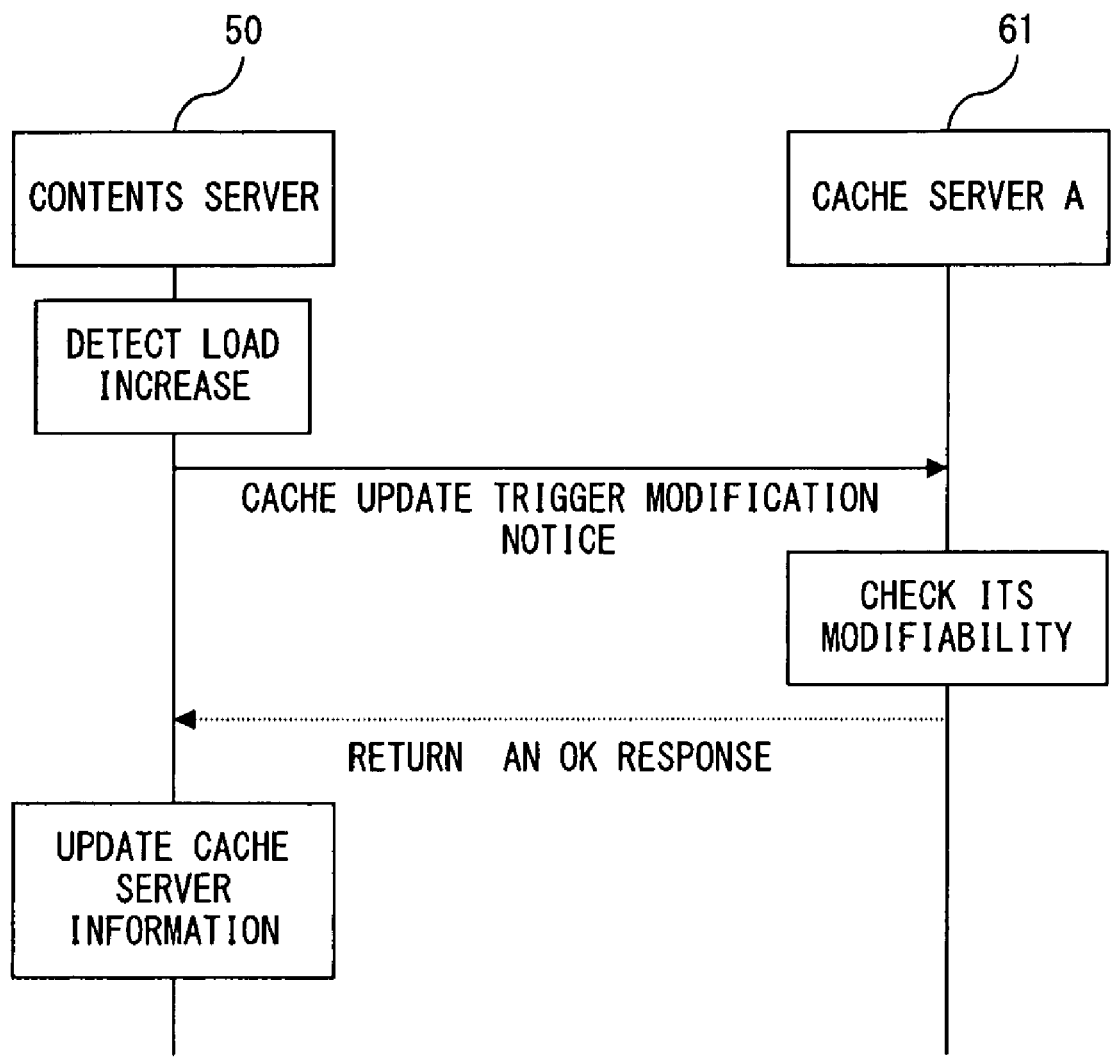
FIG. 25 shows an operation example of modifying a cache server-led cache update to a content server-led cache update.

FIG. 25 shows an operation example of modifying a cache server-led cache update to a content server-led cache update.

Firstly, the content server 50 detects a trigger for modifying a cache update operation, such as a load increase or the like. This is the case where when checking its load status, the load exceeds a specific threshold value.

Then, the content server 50 transmits a cache update trigger modification notice to a cache update modification target cache server (for example, the cache server A61).

Then, upon receipt of the cache update trigger modification notice, the cache server A61 transmits a modification-possible response if there are no problems with its own load status. If there are any problems with its own load status, the cache server A61 transmits a modification-impossible response or a modification-possible response after modifying the connecting destination of a subordinated cache server (the cache server C63 or D64).

Since there is a possibility that the modification will be impossible due to its cache server operational policy or the like, such information is obtained from its system setting information.

Lastly, after receiving one of the modification-possible responses, the content server 50 holds the modification of the cache update trigger.

Figure 26:
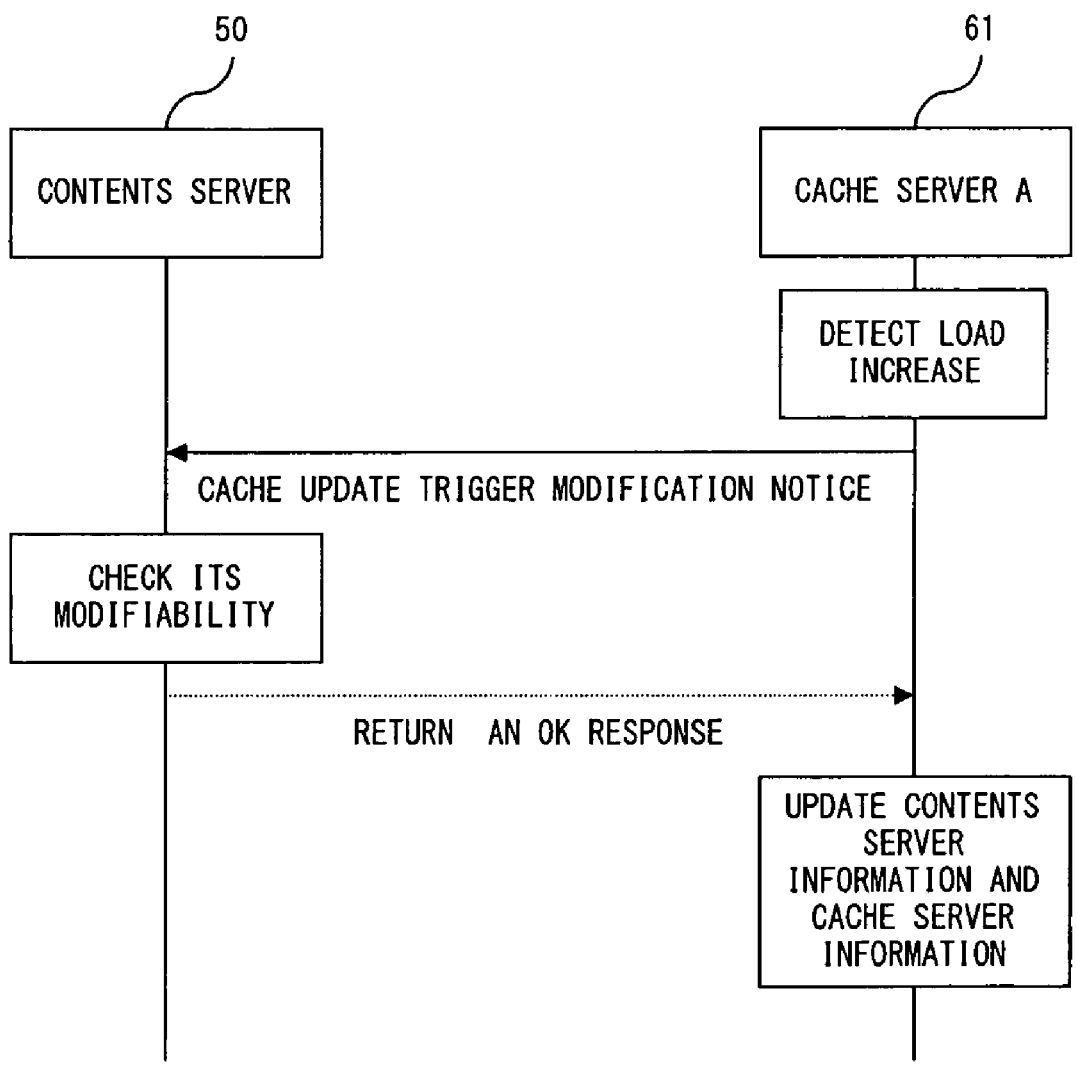
FIG. 26 shows an operation example of modifying a content server-led cache update to a cache server-led cache update.

FIG. 26 shows an operation example of modifying a content server-led cache update to a cache server-led cache update.

Firstly, the cache server A61 detects a trigger for modifying a cache update operation, such as a load increase or the like.

Then, the cache server A61 transmits a cache update trigger modification notice to the content server 50.

Then, upon receipt of the cache update trigger modification notice, the content server 50 transmits a modification-possible response to the cache server A61 if there are no problems with its own load status. If there are any problems with its own load status, the content server 50 transmits a modification-impossible response or a modification-possible response after modifying the connecting destination of a subordinated cache server (the cache server C63 or D64).

Lastly, after receiving one of the modification-possible responses, the content server 50 stores the modification of the cache update trigger.

So far operation examples of the content distribution network have been described with reference to FIGS. 6 through 27.

Next, operation examples of a cache server are described with reference to FIGS. 27 through 36.

Figure 27:
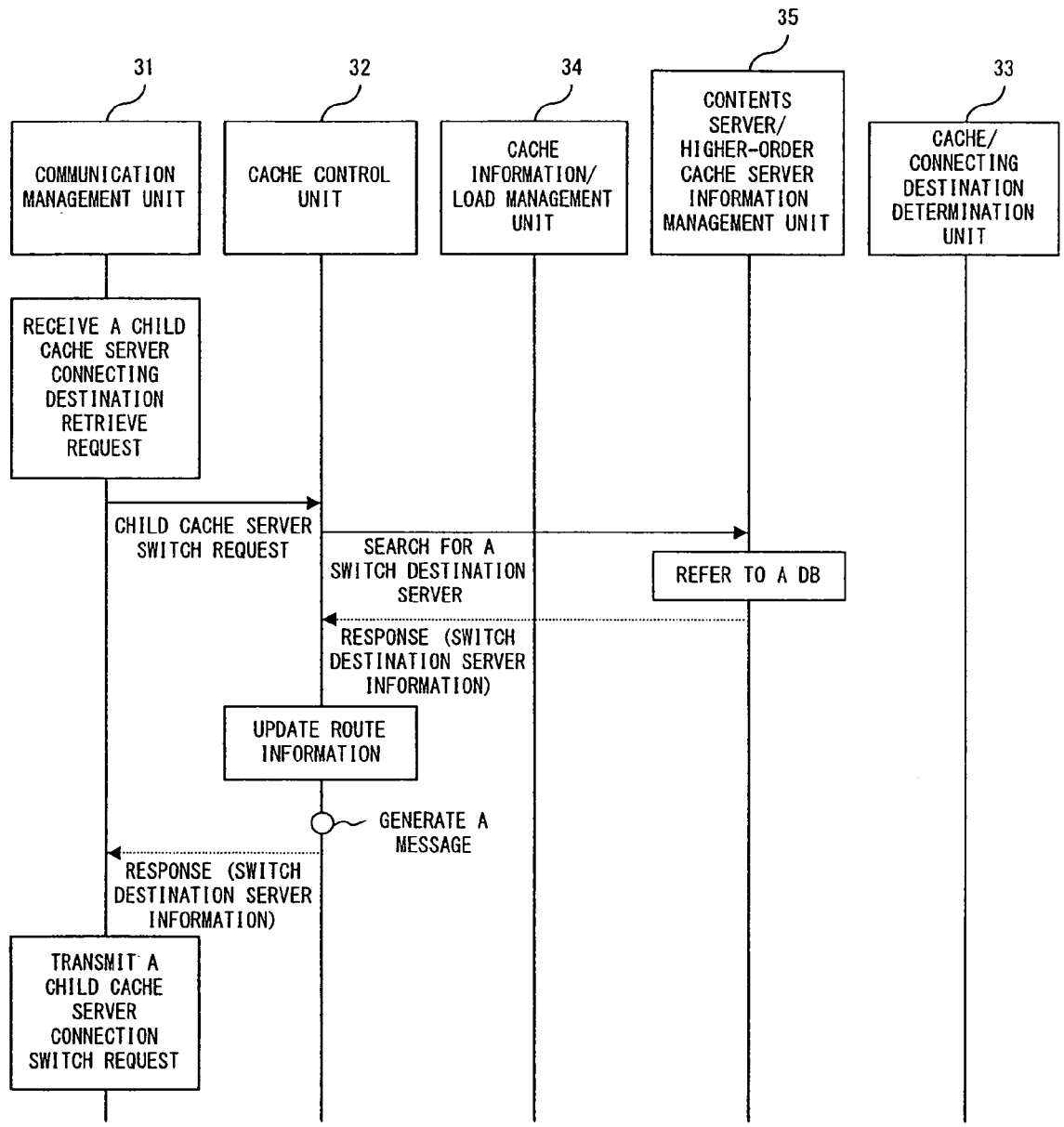
FIG. 27 shows an operation example of a cache server at the time of receiving a connecting destination retrieve request.

FIG. 27 shows an operation example of a cache server at the time of receiving a connecting destination retrieve request.

Firstly, receiving a connecting destination retrieve request, the communication management unit 31 transfers the connecting destination retrieve request to the cache control unit 32.

Then, the cache control unit 32 inquires of the content server/higher-order cache server information management unit 35. Then, the content server/higher-order cache server information management unit 35 searches for the optimum switch destination of a cache server 30 by referring to a database (DB). The cache control unit 32 receives information about the optimum switch destination of a cache server 30 from the content server/higher-order cache server information management unit 35 as its response.

Then, the cache control unit 32 updates its route information and transfers a response including information about the switch destination cache server to the communication management unit 31. The route information update is an operation of receiving the result of the DB reference and setting the address of a message to a subsequent transfer destination.

Lastly, the communication management unit 31 transmits a connection switch request to the switch destination cache server 30. Child cache server connection switch request transmission includes information about a switch destination server, and a connection switch request is transmitted.

Figure 28:
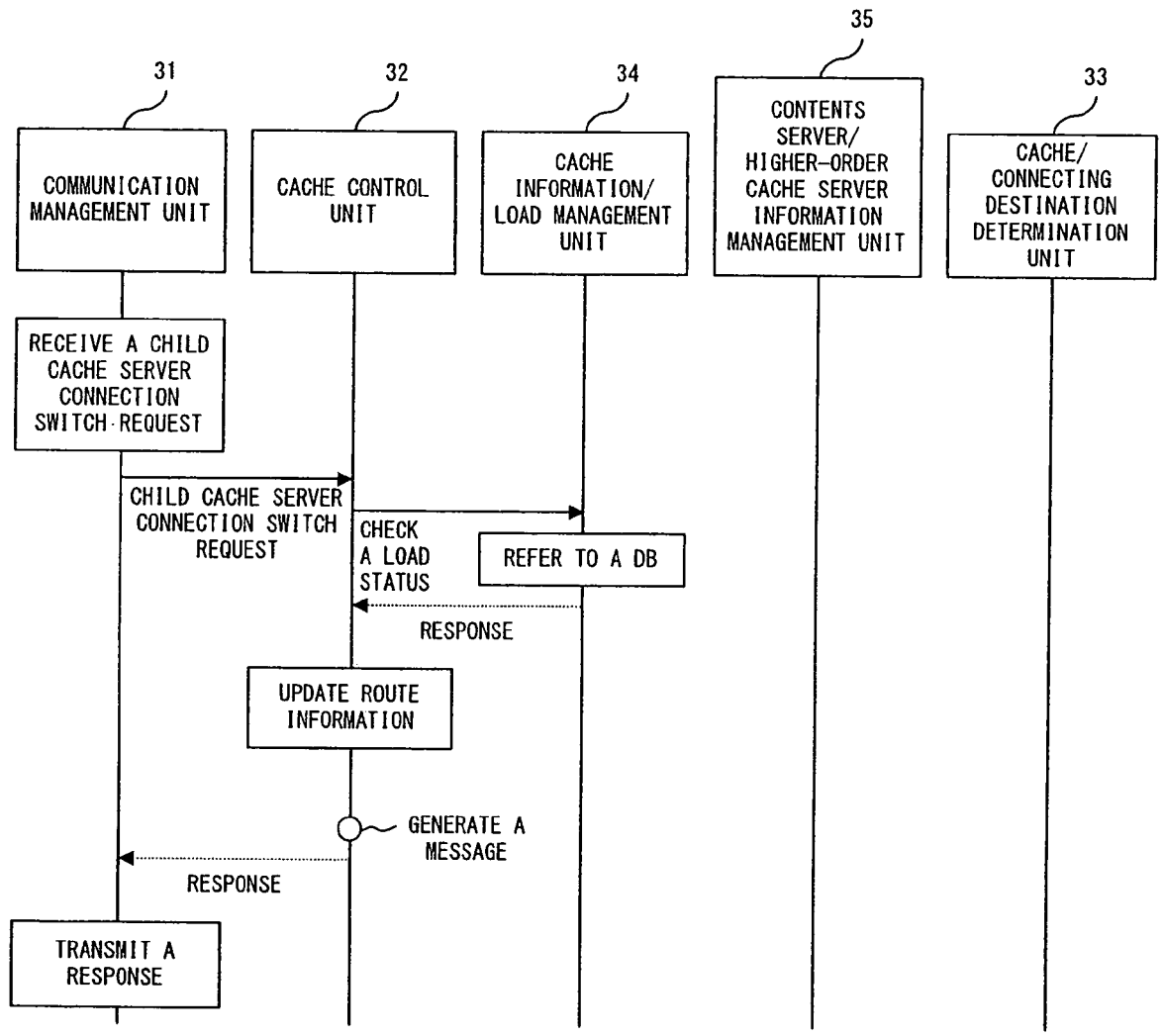
FIG. 28 shows an operation example of a cache server at the time of receiving a connection switch request.

FIG. 28 shows an operation example of a cache server at the time of receiving a connection switch request.

Firstly, when receiving a connection switch request, the communication management unit 31 transfers the connection switch request to the cache control unit 32.

Then, the cache control unit 32 inquires of the cache information/load management unit 34. Then, the cache information/load management unit 34 checks its load status by referring to a database (DB). The cache control unit 32 receives the load status from the cache information/load management unit 34. Then, the cache information/load management unit 34 as its response.

Then, the cache control unit 32 updates its route information and transfers its response to the communication management unit 31.

Lastly, the communication management unit 31 transmits the response to the cache server 30 that is the transmitting destination of the connection switch request.

Figure 29:
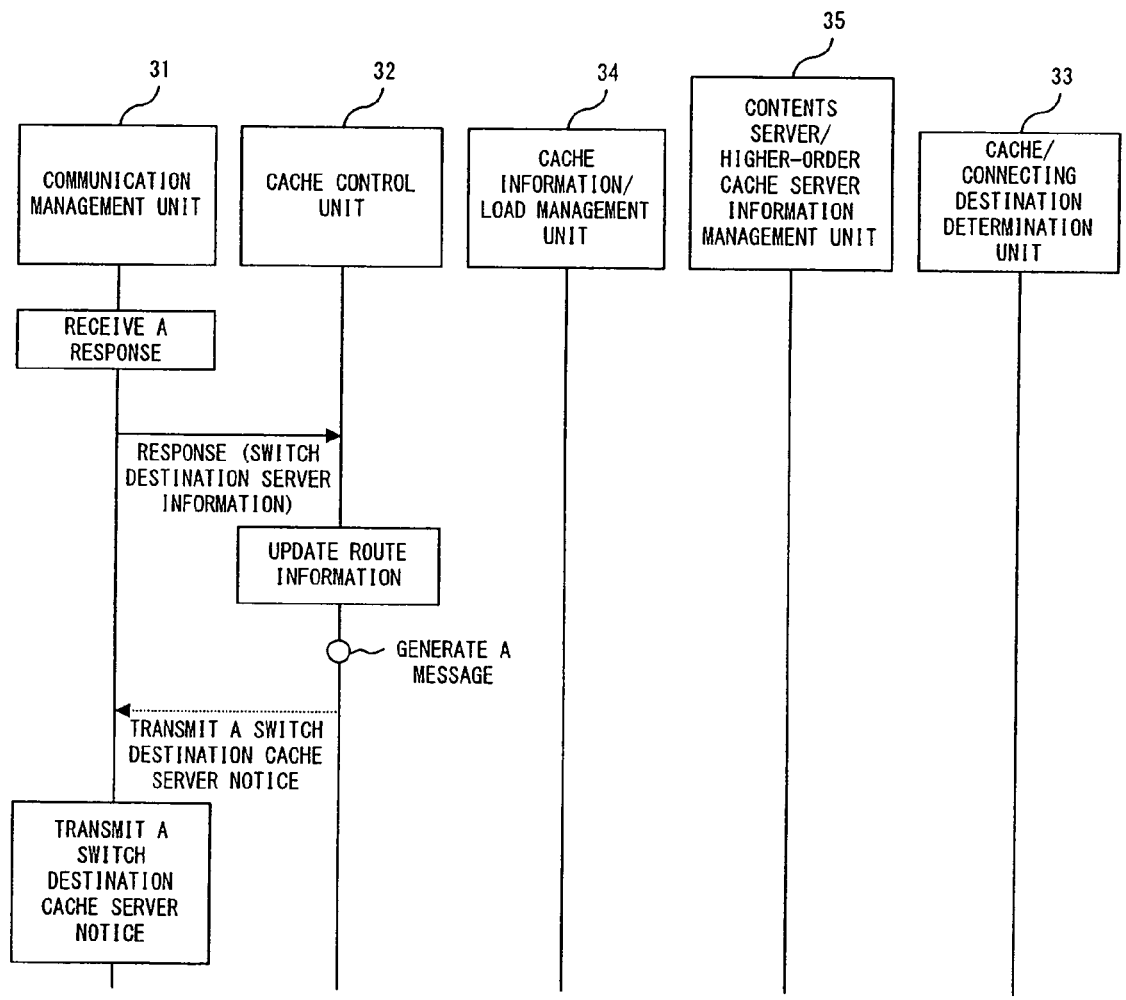
FIG. 29 shows an operation example of a cache server at the time of receiving a connection switch response.

FIG. 29 shows an operation example of a cache server at the time of receiving a connection switch response.

Firstly, when receiving a response, the communication management unit 31 transfers the response to the cache control unit 32.

Then, the cache control unit 32 updates its route information and transfers a switch destination cache server notice to the communication management unit 31.

Lastly, the communication management unit 31 transmits the switch destination cache server notice to a predetermined cache server 30. In this case, since its connecting destination is determined, the switch destination cache server notice is transmitted.

Figure 30:
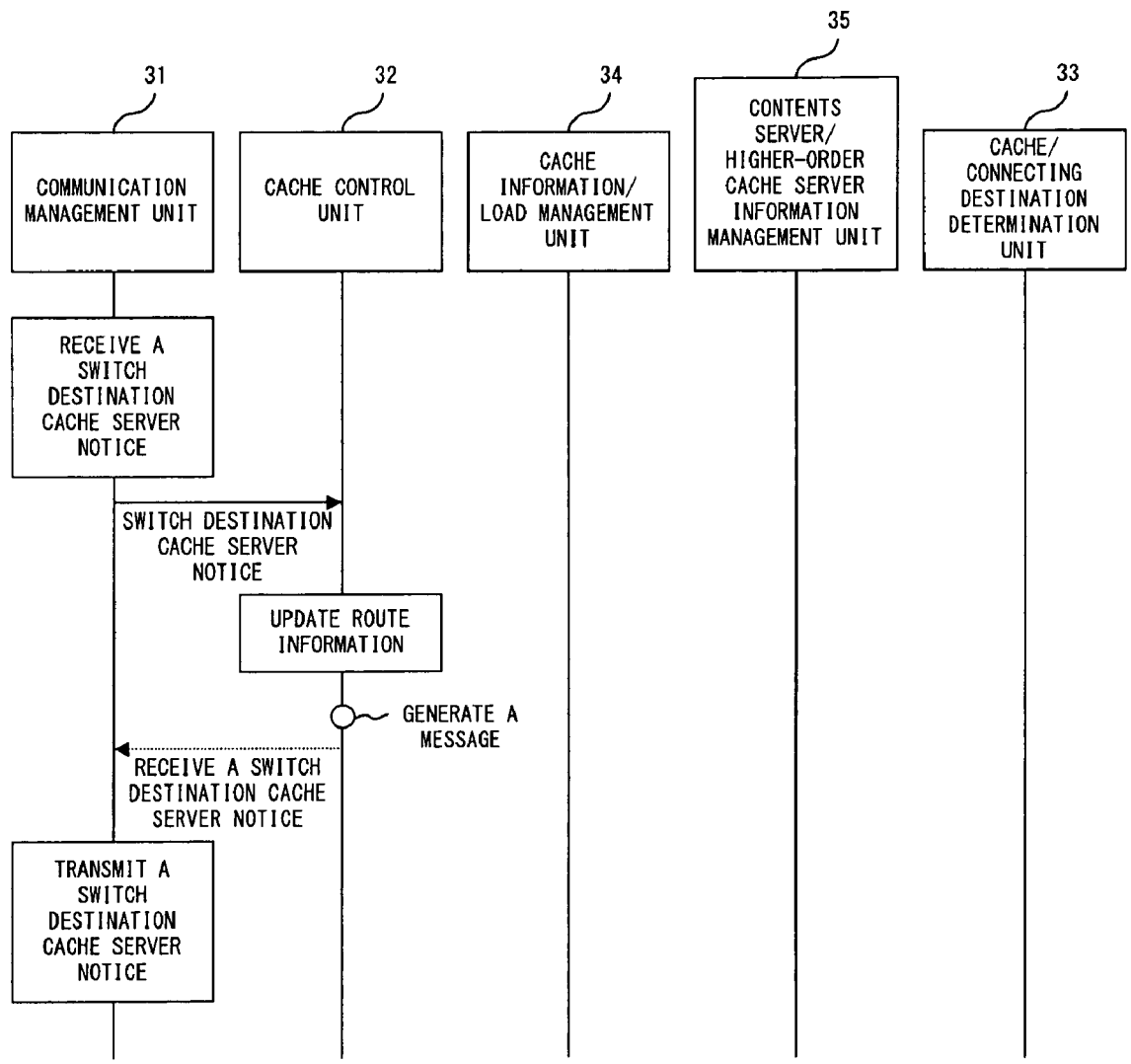
FIG. 30 shows an operation example of a parent cache server at the time of receiving a switch destination cache server notice.

FIG. 30 shows an operation example of a parent cache server at the time of receiving a switch destination cache server notice.

Firstly, when receiving a switch destination cache server notice, the communication management unit 31 transfers the switch destination cache server notice to the cache control unit 32.

Then, the cache control unit 32 updates its route information and transfers the switch destination cache server notice to the communication management unit 31.

Lastly, the communication management unit 31 transmits the switch destination cache server notice to a predetermined cache server 30. Since the parent cache server simply transfers a switch destination cache server notice, the switch destination cache server notice is transmitted without applying any process.

Figure 31:
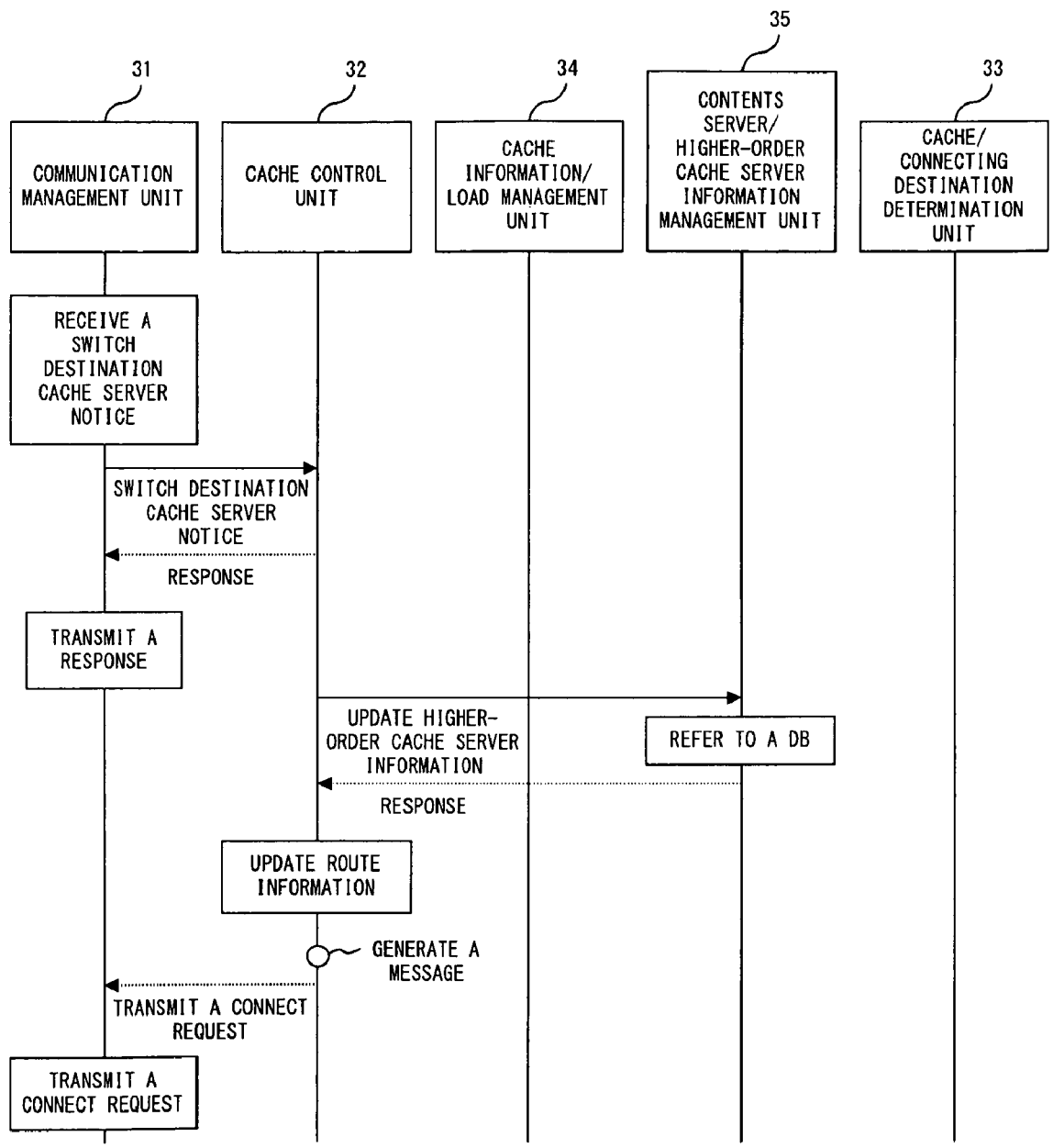
FIG. 31 shows an operation example of a child cache server at the time of receiving a switch destination cache server notice.

FIG. 31 shows an operation example of a child cache server at the time of receiving a switch destination cache server notice.

Firstly, when receiving a switch destination cache server notice, the communication management unit 31 transfers the switch destination cache server notice to the cache control unit 32.

Then, the cache control unit 32 transfers its response to the communication management unit 31.

Then, the communication management unit 31 transmits the response to the cache server 30 that is the transmitting destination of the switch destination cache server notice.

Then, the cache control unit 32 instructs the content server/higher-order cache server information management unit 35 to update its higher-order cache server information.

Then, the content server/higher-order cache server information management unit 35 updates the higher-order cache server information in the DB and responds to the cache control unit 32.

Then, the cache control unit 32 updates its route information, generates a connect request and transfers it to the communication management unit 31.

Lastly, the communication management unit 31 transmits the connect request to a predetermined cache server 30. Since this is the main connection switch operation of a cache server, the communication management unit 31 receives a switch destination cache server notice and transmits a connect request.

Figure 32:
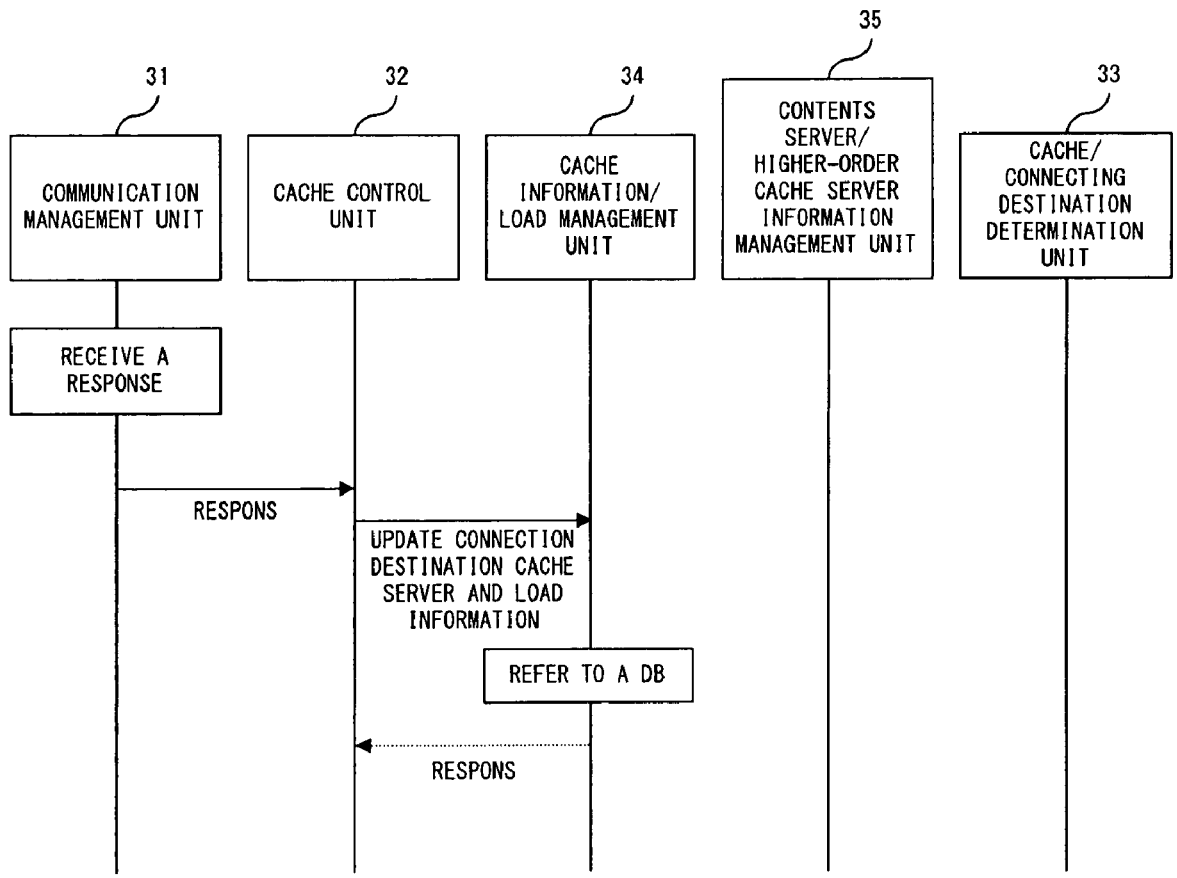
FIG. 32 shows an operation example of a cache server at the time of receiving a switch destination cache server notice response.

FIG. 32 shows an operation example of a cache server at the time of receiving a switch destination cache server notice response.

Firstly, when receiving a switch destination cache server notice response, the communication management unit 31 transfers the switch destination cache server notice response to the cache control unit 32.

Then, the cache control unit 32 instructs the cache information/load management unit 34 to update its load information.

Lastly, the cache information/load management unit 34 updates its connecting destination cache server information and load information and responds to the cache control unit 32.

Figure 33:
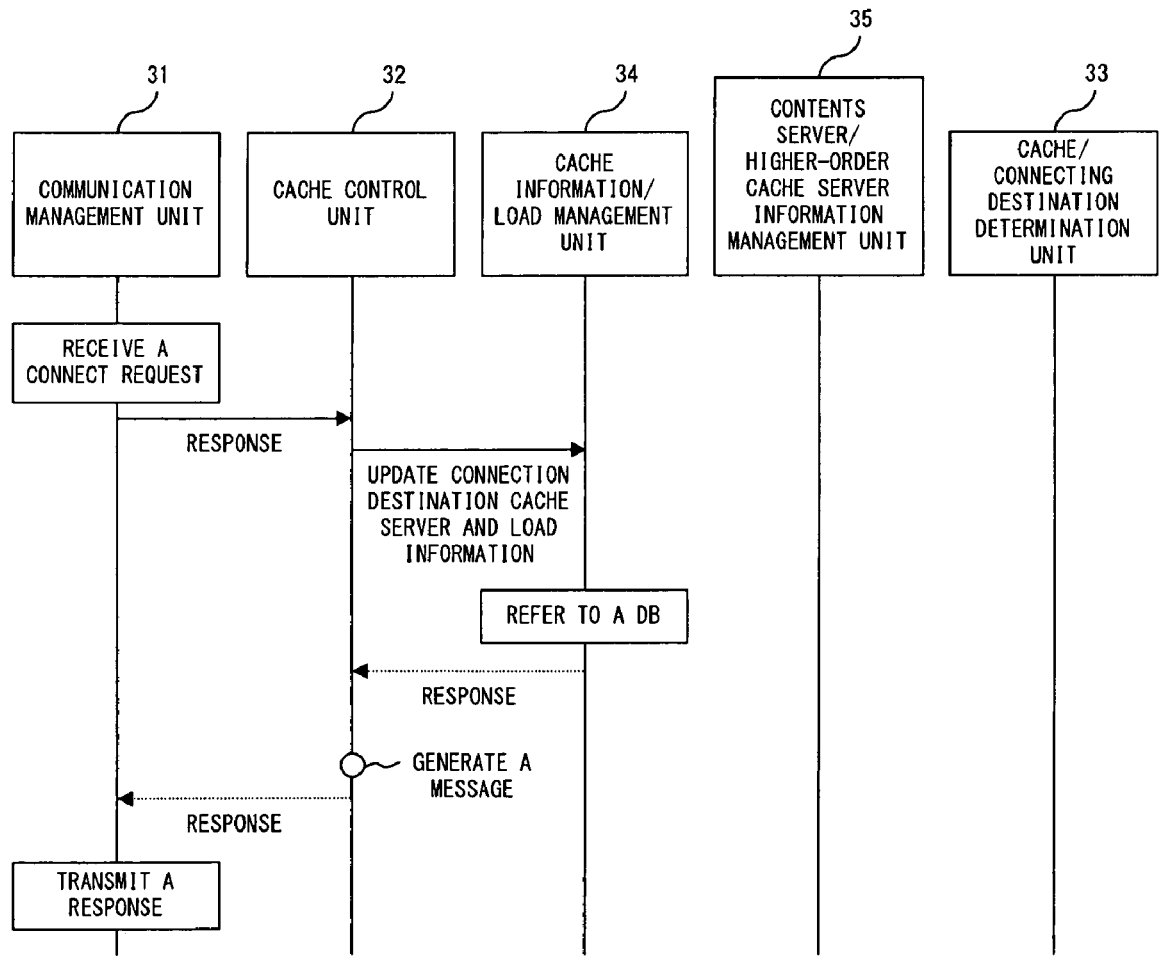
FIG. 33 shows an operation example of a cache server at the time of receiving a connect request.

FIG. 33 shows an operation example of a cache server at the time of receiving a connect request.

Firstly, when receiving a connect request, the communication management unit 31 transfers the connect request to the cache control unit 32.

Then, the cache control unit 32 instructs the cache information/load management unit 34 to update its connecting destination cache server information and load information.

Then, the cache information/load management unit 34 updates the connecting destination cache server information and load information in the DB and responds to the cache control unit 32.

Then, the control unit 32 generates its response and transfers it to the communication management unit 31.

Lastly, the communication management unit 31 transmits the response to the request source cache server 30.

Figure 34:
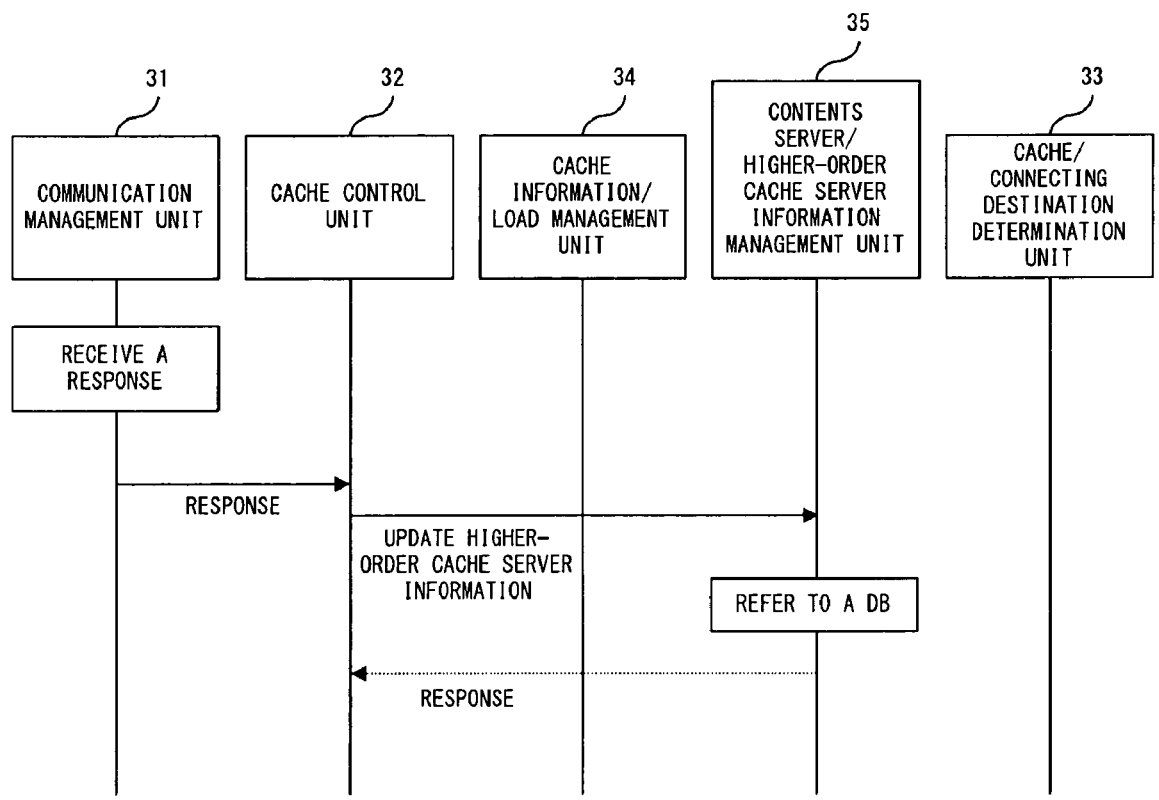
FIG. 34 shows an operation example of a cache server at the time of receiving a connect response.

FIG. 34 shows an operation example of a cache server at the time of receiving a connect response.

Firstly, when receiving a connect response, the communication management unit 31 transfers the connect response to the cache control unit 32.

Then, the cache control unit 32 instructs the content server/higher-order cache server information management unit 35 to update its higher-order cache server information.

Lastly, the content server/higher-order cache server information management unit 35 updates the higher-order cache server information in the DB and responds to the cache control unit 32.

Figure 35:
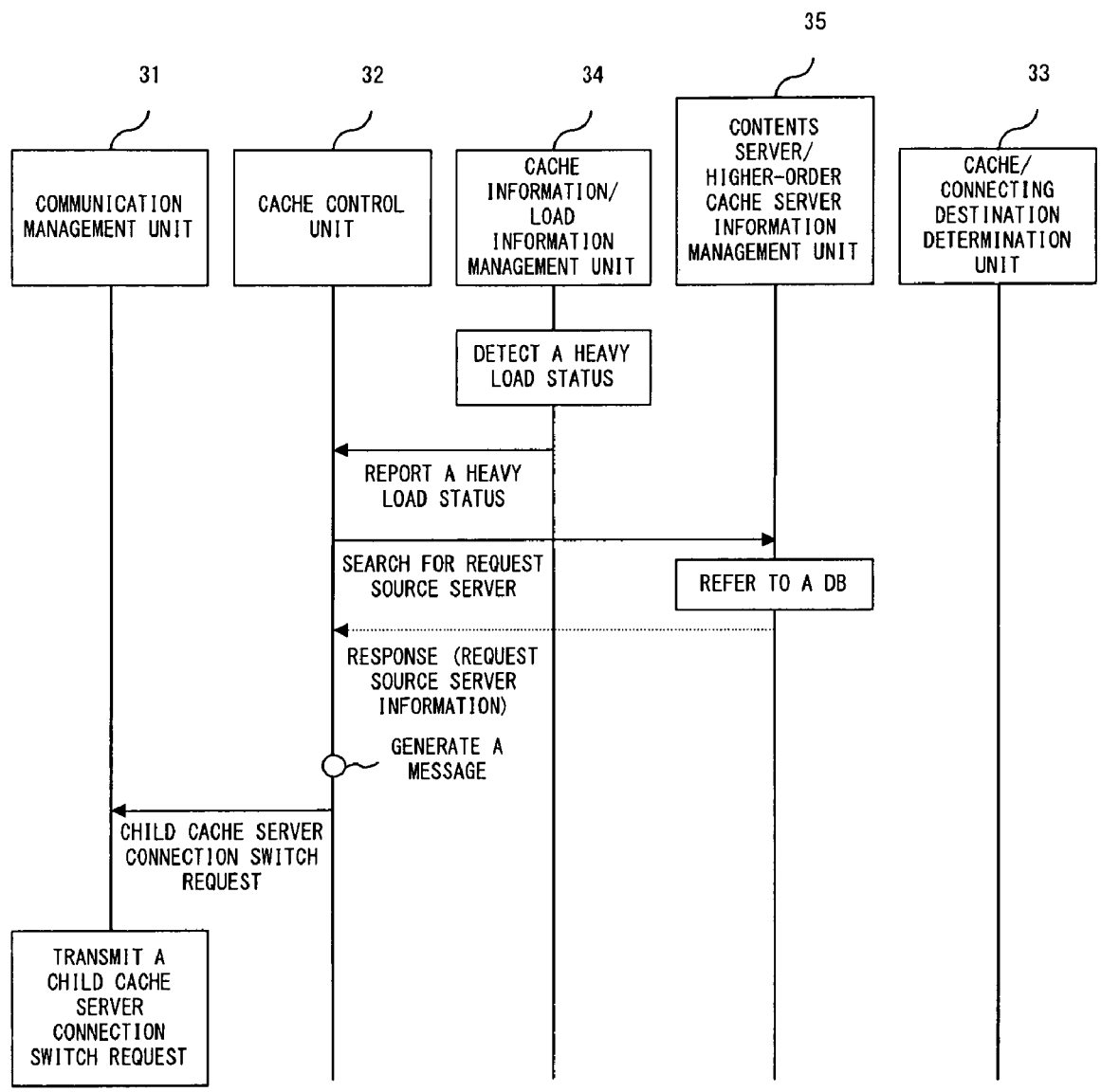
FIG. 35 shows an operation example of a cache server in the case where a child cache server connection switch request is transmitted to a higher-order server when there is a heavy load.

FIG. 35 shows an operation example of a cache server in the case where a child cache server connection switch request is transmitted to a higher-order server when there is a heavy load.

Firstly, when a heavy load (overload) status is detected, the cache information/load management unit 34 notifies the cache control unit 32 of its heavy load status.

Then, the cache control unit 32 inquires of the content server/higher-order cache server information management unit 35. Then, the content server/higher-order cache server information management unit 35 searches for a request source cache server 30 by referring to the DB and responds to the cache control unit 32.

Then, the cache control unit 32 receives request source cache server information as its response, generates a connecting destination retrieve request, and transfers it to the communication management unit 31 together with the request source cache server information.

Lastly, the communication management unit 31 transmits the connecting destination retrieve request to a switch request source cache server 30.

Figure 36:
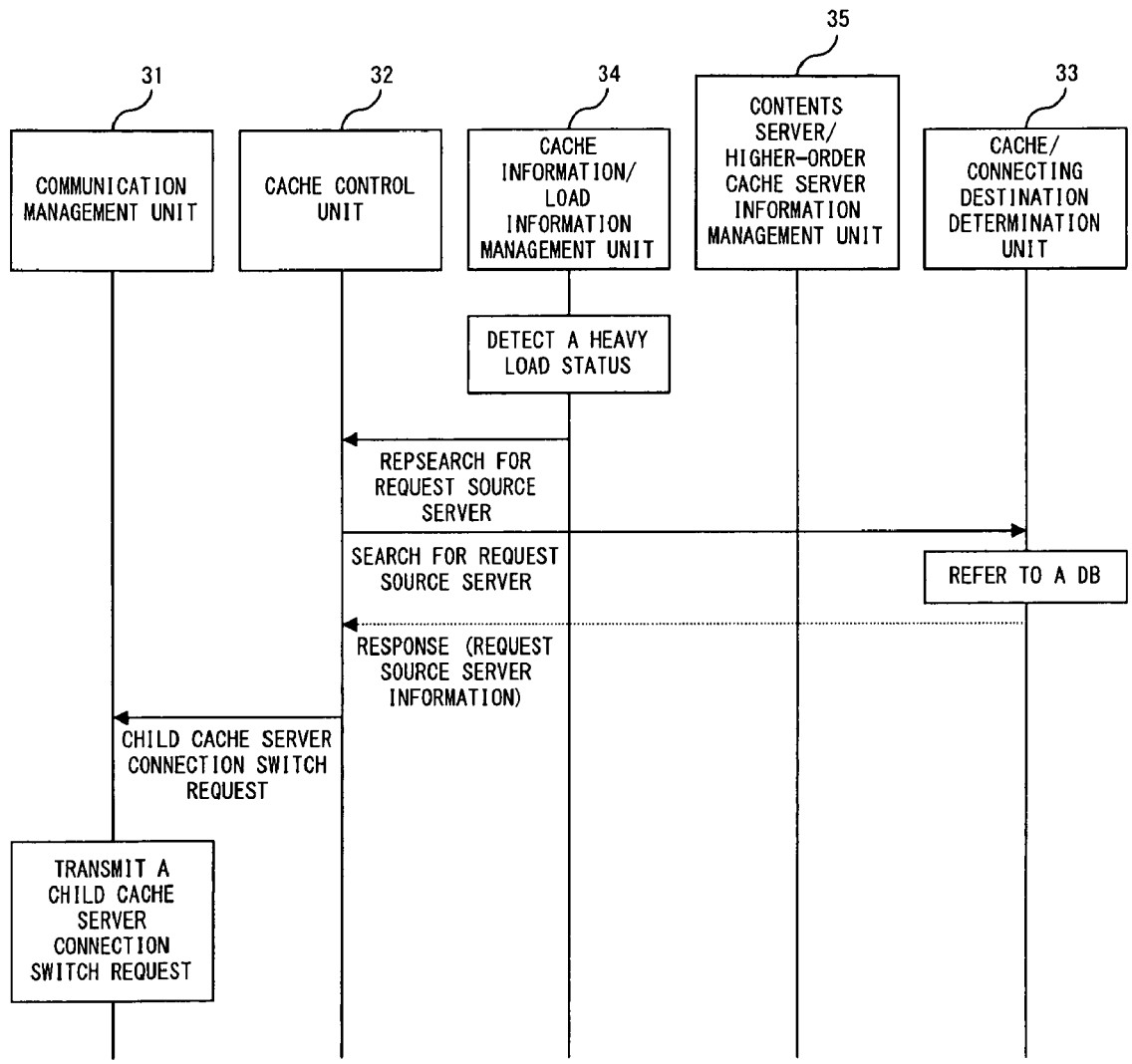
FIG. 36 shows an operation example of a cache server in the case where a connection switch request is transmitted to a child cache server when there is a heavy load.

FIG. 36 shows an operation example of a cache server in the case where a connection switch request is transmitted to a child cache server when there is a heavy load.

Firstly, when a heavy load (overload) status is detected, the cache information/load management unit 34 notifies the cache control unit 32 of the heavy load status.

Then, the cache control unit 32 receives request source cache server information as its response, generates a child cache connection switch request, and transfers it to the communication management unit 31 together with the request source cache server information.

Lastly, the communication management unit 31 transmits the child cache connection switch request to a request source cache server 30.

So far operation examples of a cache server have been described with reference to FIGS. 27 through 36.

Next, operation examples of a content server will be described with reference to FIGS. 37 through 42.

FIG. 37 shows an operation example of a content server in the case where a connecting destination is switched because of the load status of a content server.

Firstly, a cache server information/load management unit 24 selects a cache server 30 to which its connecting destination is switched and two switch destination cache servers from cache servers connected to a content server 20.

Then, the cache server information/load management unit 24 instructs a cache control unit 22 to transmit a connecting destination switch notice.

Then, the cache control unit 22 generates a connecting destination switch notice message and transfers it to a communication management unit 21.

Lastly, the communication management unit 21 transmits the connecting destination switch notice to the cache server 30 to which the connecting destination is switched.

FIG. 38 shows an operation example of a content server at the time of receiving a connecting destination retrieve request.

Firstly, the communication management unit 21 receives a connecting destination retrieve request and transfers the received connecting destination retrieve request to the cache control unit 22.

Then, the cache control unit 22 inquires of the cache server information/load management unit 24. Then, the cache server information/load management unit 24 determines a connecting destination switch request transmitting source cache source 30 by retrieving data from the DB and responds to the cache server unit 22.

Lastly, the cache control unit 22 generates a connecting destination switch request message and transmits the connecting destination switch request to an address-predetermined cache server 30 via the communication management unit 21.

Figure 39:
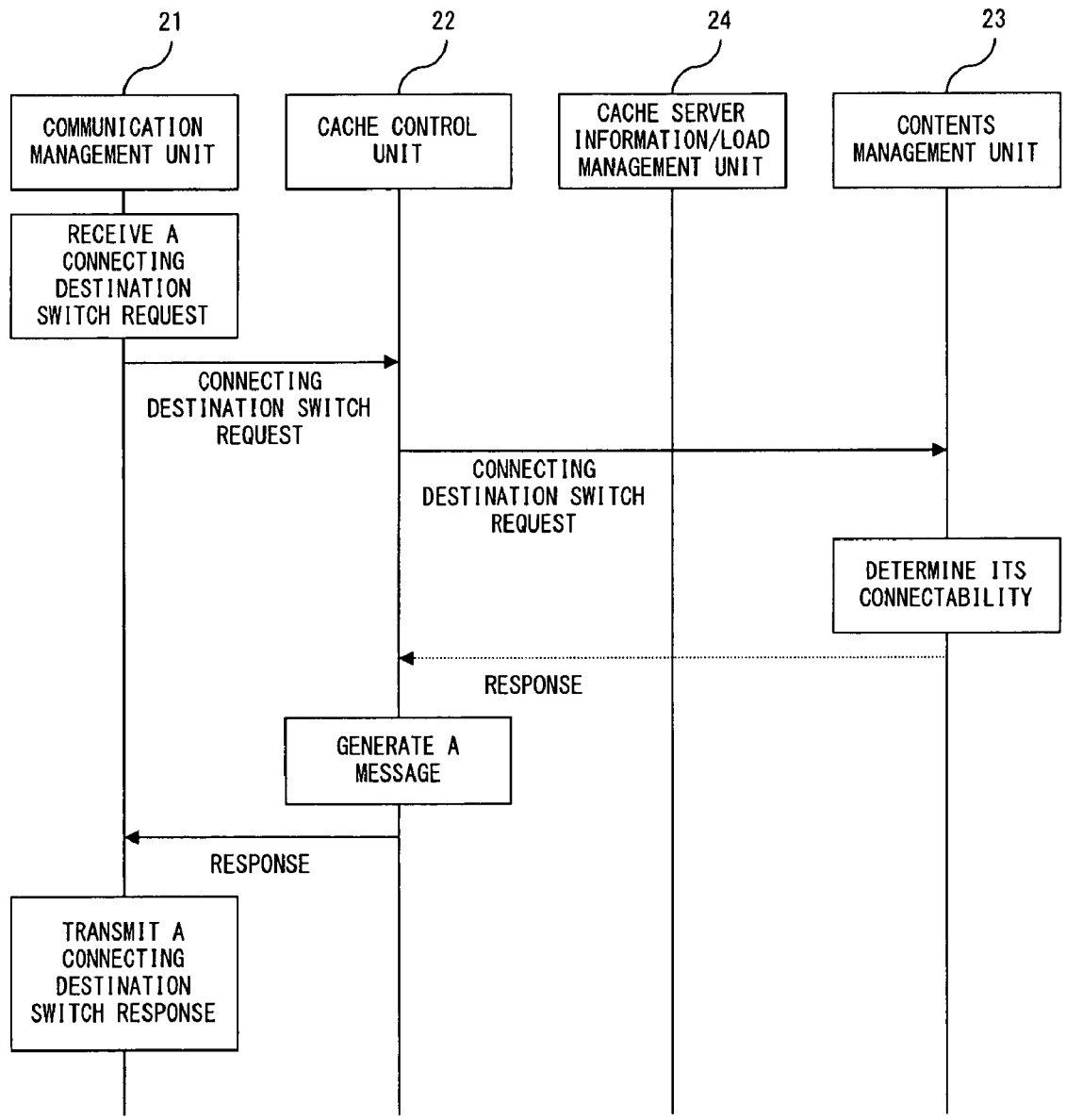
FIG. 39 shows an operation example of a content server at the time of receiving a connecting destination switch request.

FIG. 39 shows an operation example of a content server at the time of receiving a connecting destination switch request.

Firstly, the communication management unit 21 receives a connecting destination switch request and transfers the received connecting destination switch request to the cache control unit 22.

Then, the cache control unit 22 inquires of a content management unit 23. Then, content management unit 23 determines the possibility/impossibility of its connection and responds to the cache server unit 22.

Lastly, the cache control unit 22 generates a connecting destination switch response message and transmits the connecting destination switch response to the address-predetermined cache server 30 via the communication management unit 21.

Figure 40:
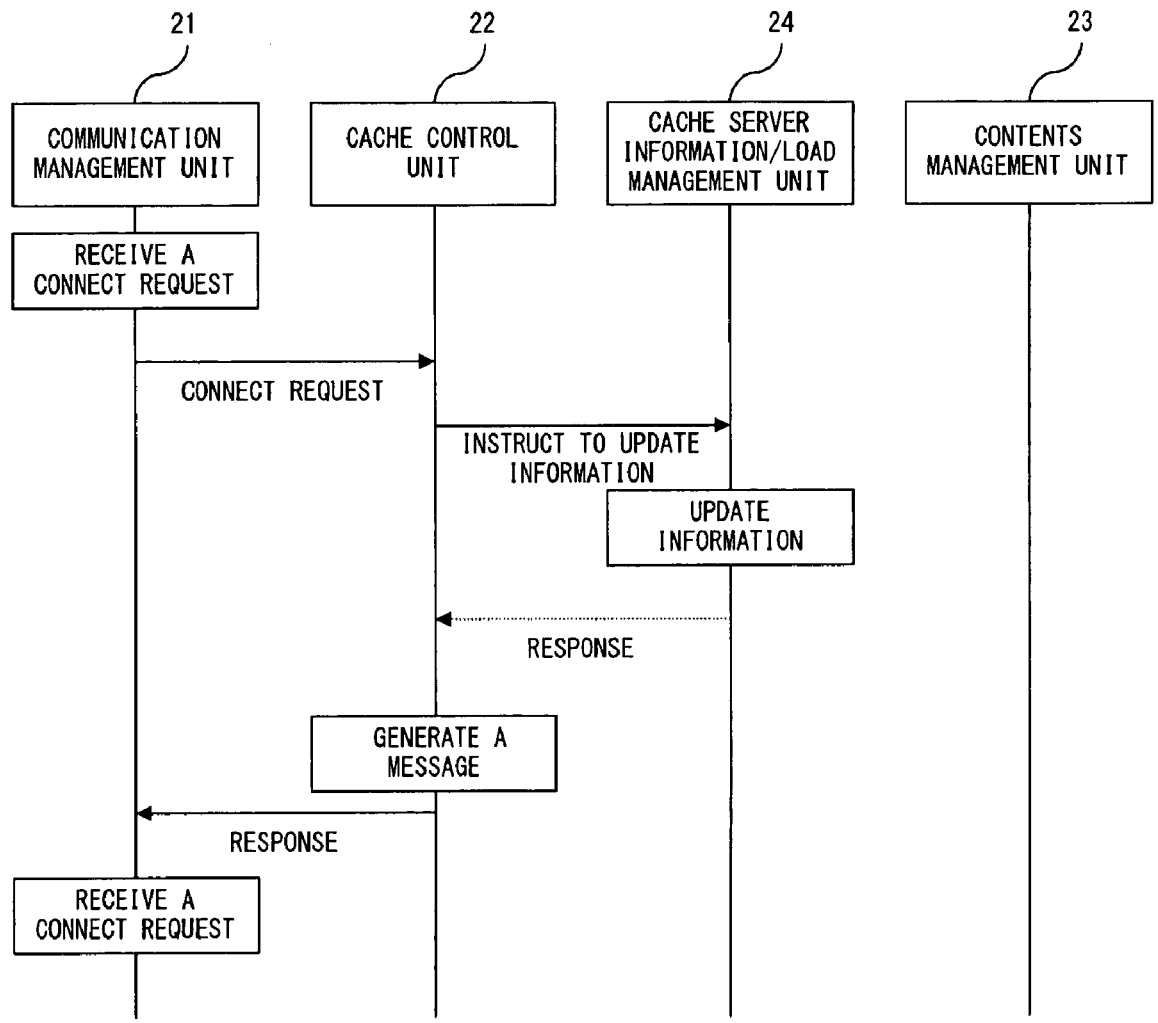
FIG. 40 shows an operation example of a content server at the time of receiving a connect request.

FIG. 40 shows an operation example of a content server at the time of receiving a connect request.

Firstly, the communication management unit 21 receives a connect request and transfers the received connect request to the cache control unit 22.

Then, the cache control unit 22 instructs the cache server information/load management unit 24 to update its information.

Then, the cache server information/load management unit 24 updates its information and responds to the cache control unit 22.

Lastly, the cache control unit 22 generates a connect response message and transmits the connect response to an address-predetermined cache server 30 via the communication management unit 21.

FIG. 41 shows an operation example of a content server at the time of receiving a connecting destination retrieve response.

Firstly, the communication management unit 21 receives a connecting destination retrieve response and transfers the received connecting destination retrieve response to the cache control unit 22.

Then, the cache control unit 22 instructs the cache server information/load management unit 24 to update its information, if necessary.

Then, the cache server information/load management unit 24 updates its information and responds to the cache control unit 22.

Lastly, the cache control unit 22 extracts the transfer destination of its response from a transfer route included in the received connecting destination retrieve response, generates a connecting destination retrieve response message, and transmits the connecting destination retrieve response to an address-predetermined cache server 30.

FIG. 42 shows an operation example of a content server at the time of receiving a connecting destination switch response.

Firstly, the communication management unit 21 receives a connecting destination switch response and transfers the received connecting destination switch response to the cache control unit 22.

Then, the cache control unit 22 instructs the cache server information/load management unit 24 to update its information, if necessary.

Then, the cache server information/load management unit 24 updates its information and responds to the cache control unit 22.

Lastly, the cache control unit 22 extracts the transfer destination from the received connecting destination switch response, generates a connecting destination switch response message, and transmits the connecting destination switch response to an address-predetermined cache server 30. If the response destination is a cache server or content server that has transmitted the connecting destination retrieve request, it generates a connecting destination retrieve response message. If the response destination is a cache server or content server that has transmitted the connecting destination switch request, it generates a connecting destination switch response message.

So far operation examples of a content server have been described with reference to FIGS. 37 through 42.

Preferred Embodiment 2

Configuration

Figure 43:
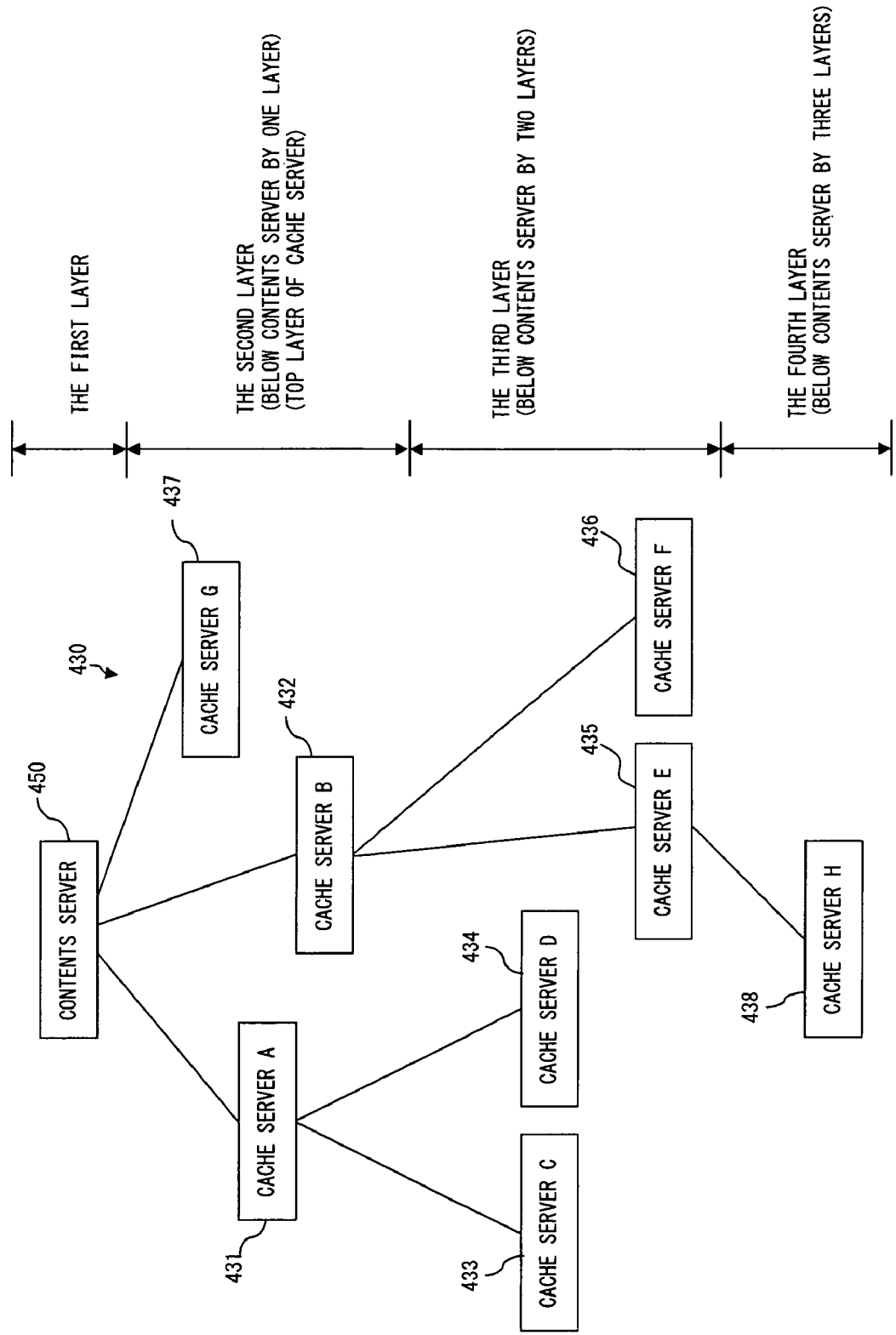
FIG. 43 shows an example of a network configuration to which the present invention is applied.

FIG. 43 shows a configuration example of a content distribution network.

In FIG. 43, in a content distribution network (CDN) 430, a content server 450 is specified as its route (the first layer) and cache servers A431, B432 and G437 are immediately subordinated to the content server 450 (below the content server 450 by one layer). Then, cache servers C433 and D434 are immediately subordinated to the cache server A431 (below the content server 450 below the second layer) and cache servers E435 and F436 are immediately subordinated to the cache server B432 (below the content server 450 by two layers). A cache server H 438 is immediately subordinated to the cache server E435 (below the content server 450 by three layers). Several clients, which are not shown in FIG. 43, are connected to each of these cache servers A431 through H438.

These cache servers A431 through H438 cache the content of the content server 450 and distribute it to the clients according to their requests.

Each of the above-described cache servers A431 through H438 has a function in which it can simultaneously switch a plurality of connecting destinations.

The configuration of a cache server provided with a function in which it can simultaneously switch a plurality of connecting destinations is described below with reference to FIG. 44.

In FIG. 44, a cache server 30B comprises a communication management 31, a cache control unit 32, a cache/connecting destination determination unit 33b, a cache information/load management unit 34, a content server/higher-order cache server information management unit 35, and a cache selection unit 36.

The cache/connecting destination determination unit 33b determines or modifies content to cache, its connecting destination (acquisition source), and its attribute according to a request from a client or another cache server. When receiving an inquiry about whether it can obtain new content to cache from another cache server, the cache/connecting destination determination unit 33b determines whether it can obtain new content on the basis of its new load that was obtained by adding a load, the load being added due to new content in order to obtain to its current load.

The cache selection unit 36 selects content to cache that can be distributed without increasing the obtained load of its higher-order cache server when switching the cache server that is the acquisition source of the cached content to another server since its load has exceeded its threshold value.

In each of the above-described cache servers A431 through H438, the cache control unit comprises a load measurement unit and an overload determination unit and the communication management unit 31 comprises a connecting destination retrieve request information transmitting unit, a connecting destination information receiving unit, and a switch request transmitting unit. However, there is not always a need to dispose each of the units in the communication management unit 31 or the cache control unit and they can also be separately provided.

The load measurement unit measures the load of a cache server itself. For example, the cache server C433 subordinated to the cache server A431 measures the load of the cache server C433 caused by caching content cached in the cache server A431.

The overload determination unit determines whether a load is overloaded by comparing the load measured by the load measurement unit with a predetermined overload setting value.

In this case, the load of the cache server A431 can also be measured on the basis of the size of content to which access is requested by the cache server C433 being its load source. It can also be measured on the basis of the number of clients that request to access the cache server C433. Alternatively, it can also be measured on the basis of the frequency of access to the cache server C433.

As another alternative, it can also be measured on the basis of the degree of overlap between content cached by the cache server A431 and content cached by the cache servers C433 and D434. This load measurement based on the degree of overlap is possible, for example, when only the cache server C433 is subordinated to the cache server A431. This is because when content cached by the cache server A431 and content cached by the cache server C433 are the same—in other words, when content cached by the cache servers A431 and C433 which have a subordinate relation are overlapped—the existence of the cache server C433 has no meaning.

The connecting destination retrieve request information transmitting unit transmits connecting destination retrieve request information (a child cache server connecting destination retrieve request) for making a request to content server 450 or another cache server D434 to search for the connecting destination of the cache server C433 that is the source of the load to the content server 450 or the cache server D434. In this case, the connecting destination retrieve request information is transmitted to the content server 450 or the cache server D434 in a predetermined order. For example, the connecting destination retrieve request information is transmitted to the content server 450 that is higher in the order of a hierarchical content distribution network 430 first and after that sequentially. In this case, information about the cache server C433 being the source of the load can also be transmitted together with the connecting destination retrieve request information.

The connecting destination information receiving unit receives, for example, connecting destination information (switch destination notice information=switch destination cache server notice) indicating the connecting destination cache server searched by the content server 450, from the transmitting destination content server 450 to which the connecting destination retrieve request information transmitting unit has transmitted the connecting destination retrieve request information. The connecting destination information is, for example, information indicating that it can be connected to cache server B432. Alternatively, switch destination response information, connect request information, or connect response information can be received.

The switch request transmitting unit transmits, for example, switch request information (switch destination notice information=switch destination cache server notice) requesting the cache servers C433 and E435 to switch the connection to a connecting destination indicated by connecting destination information on the basis of the connecting destination information received by the connecting destination information receiving unit to the cache servers C433 and E435. Alternatively, connecting destination retrieve response information can be transmitted to a cache server that has transmitted connecting destination switch request information. Alternatively, switch destination response information can be transmitted to a cache server that has transmitted switch destination notice information. As another alternative, connect request information or connect response information can be transmitted.

In each of the cache servers A431 through H438, in order to search for a connecting destination (for example, when a request is made to the cache server B432 to search for its connecting destination by the content server 450), the communication management unit 31 comprises a connecting destination retrieve request information receiving unit, a connecting destination retrieve request information transfer unit, and a connecting destination connectability determination transmitting unit, and the cache connecting destination determination unit 33b comprises a connecting destination determination unit. However, there is not always a need to dispose each of the units in the communication management unit 31 or the cache connecting destination determination unit 33b and they can also be separately provided.

The connecting destination retrieve request information receiving unit receives, for example, connecting destination retrieve request information requesting that a search be performed for the connecting destination of the cache server C433 that is the source of the load of the cache server A431 from the content server 450.

The connecting destination determination unit determines whether the cache server B432 can be used as the connecting destination of the cache server C433 on the basis of the load of the cache server B432 itself by receiving connecting destination retrieve request information via the connecting destination retrieve request information receiving unit. In this case, the load of the cache server B432 itself is measured by the same reference as the load of the cache server A431 and whether the cache server B432 can be used as the connecting destination of the cache server C433 is determined by determining whether the load of the cache server B432 is overloaded when the cache server C433 is connected.

The connecting destination retrieve request information transfer unit transfers connecting destination switch request information to another cache server E435 or F436 subordinated to the cache server B432 in a predetermined order—for example, when a connecting destination connectability determination result indicating whether a connecting destination determined by the connecting destination determination unit can be used indicates that it cannot be used as the connecting destination of the cache server C433 (i.e., when it is determined that the load is overloaded if the cache server C433 is connected).

The connecting destination connectability determination result transmitting unit transmits a connecting destination connectability determination result (connecting destination switch response) indicating whether a connecting destination determined by the connecting destination determination unit can be used, to a content server 450 that has transmitted connecting destination switch request information to it.

In the content server 450, the communication management unit 21 comprises a connecting destination retrieve request information receiving unit, a connecting destination retrieve request information transfer unit, and a connecting destination connectability determination transmitting unit, and the cache connecting destination determination unit 22 comprises a connecting destination determination unit. However, there is not always a need to dispose each of the units in the communication management unit 21 or the cache connecting destination determination unit 22 and they can also be separately provided.

The connecting destination retrieve request information receiving unit receives, for example, connecting destination retrieve request information requesting that a search be performed for the connecting destination of the cache server C433 that is the source of the load from the cache server A431.

The connecting destination retrieve request information transfer unit transfers, for example, connecting destination retrieve request information (a child cache server connection retrieve request) to another cache server B432 subordinated to the content server 450 by receiving the connecting destination retrieve request information via the connecting destination retrieve request information receiving unit. The connecting destination retrieve request information transfer unit also transfers information about the switch destination cache server by which the switch destination cache server is retrieved to another cache server B432 subordinated to the content server 450 as connection switch request information (a child cache server connection switch request).

The connecting destination retrieve request information receiving unit receives, for example, a connecting destination connectability determination result (connecting destination switch response) indicating whether it can determine the connecting destination of the cache server C433 from another cache server B432 to which the connecting destination retrieve request information is transferred.

The connecting destination determination unit determines, for example, whether the server can be connected as the connecting destination of the load source cache server on the basis of its load when all the connecting destination connectability determination results received by the connecting destination retrieve request information receiving unit indicate that it cannot be used as the cache server C433.

The connecting destination connectability determination result transmitting unit transmits, for example, information including the connecting destination connectability determination result (switch destination cache server notice) indicating whether the connecting destination determined by the connecting destination determination unit can be used, to the cache server A431.

Here, a method by which a cache server that has detected a load increase selects a child cache server and content to which the connection destination is switched is described below.

When it is emphasized that a retrieval destination can be easily found with a single switch, a case where an unavailable response repeatedly returns against a switch request and the retrieval destination cannot be found can be anticipated. Therefore, a switch destination is retrieved in units of light loads in such a way as to not exceed the overload setting value of another cache server. In this case, of cached content and its acquisition sources, a child cache server and content that has the lightest load is selected.

When the reduction amount of a load by single switch is emphasized, the reduction of a load is achieved if an available response returns against a switch request in such a way. In this case, of cached content and its acquisition sources, a child cache server and content that has the heaviest load is selected.

When the reduction efficiency of a load by single switch is emphasized, the sum of the loads essentially does not change with a single switch. However, if the acquisition of a load by a higher-order cache server is lost, the sum of the loads is reduced by the amount of that load. Therefore, of cached content and its acquisition sources, content that becomes unnecessary to cache due to the switch is selected. The selection of the size of such content depends on whether easy retrieval or the amount of reduction is emphasized.

When easy retrieval and the efficiency of a plurality of times of switching are emphasized, both a reduction and an increase in obtained content occur. Therefore, if the reduction and increase are by the same amount, it can be connected. Therefore, of content and its acquisition sources, both content that becomes unnecessary to cache due to switching and the acquisition source of the content are selected and are made a switching candidate for another cache server. Then, content having almost the same load for another server is made its own switching candidate.

(Message)

Information included in a message used when a content server and a cache server communicate with each other is described below. In this case, information is connecting destination switch request information (a child cache server connection switch request (FIG. 8)), connecting destination switch response information (a connecting destination switch response (FIG. 9)), switch destination notice information (a switch destination cache server notice (FIG. 10)), switch destination response information (a switch destination response (FIG. 11)), connect request information (a connect request (FIG. 12)), connect response information (a connect response (FIG. 13)), connecting destination retrieve request information (a child cache server connecting destination retrieve request (FIG. 15)), and connecting destination retrieve response information (a connecting destination retrieve response (FIG. 16)).

The connecting destination switch request information (FIG. 8) and the connecting destination switch response information (FIG. 9) are included in a message transmitted/received when a cache server or content server that searches for a switch destination inquires of a switch destination candidate about its connectability.

The switch destination notice information (FIG. 10) and the switch destination response information (FIG. 11) are included in a message transmitted/received when a cache server or content server notifies a cache server whose switch destination is determined by such information.

The connect request information (FIG. 12) and the connect response information (FIG. 13) are included in a message transmitted/received when a cache server that has known its switch destination is connected to the switch destination.

The connecting destination retrieve request information (FIG. 15) and the connecting destination retrieve response information (FIG. 16) are included in a message transmitted/ received when a cache server or content server that searches for its switch destination inquires of another server about its switch destination candidate.

The connecting destination retrieve request information and the connecting destination retrieve request information of a cache server having a function to simultaneously switch a plurality of connecting destinations have a "message type", the "address of a connecting source cache server" and the "address of a connecting destination server", a "URI", the "requirements for content acquisition", and a "protocol" as information about content that is desired to be switched, and the "requirements for content acquisition", a "protocol", and a "transfer route" as information about content that can be switched from another server. FIGS. 45 and 46 show examples of the connecting destination retrieve request information and the connecting destination retrieve request information, respectively.

(Operation)

Next, operation examples of the content distribution network are described.

A switching operation of the content distribution network due to a load increase, led by a cache server having a function to simultaneously switch a plurality of connecting destinations, is described below.

Figure 47A:
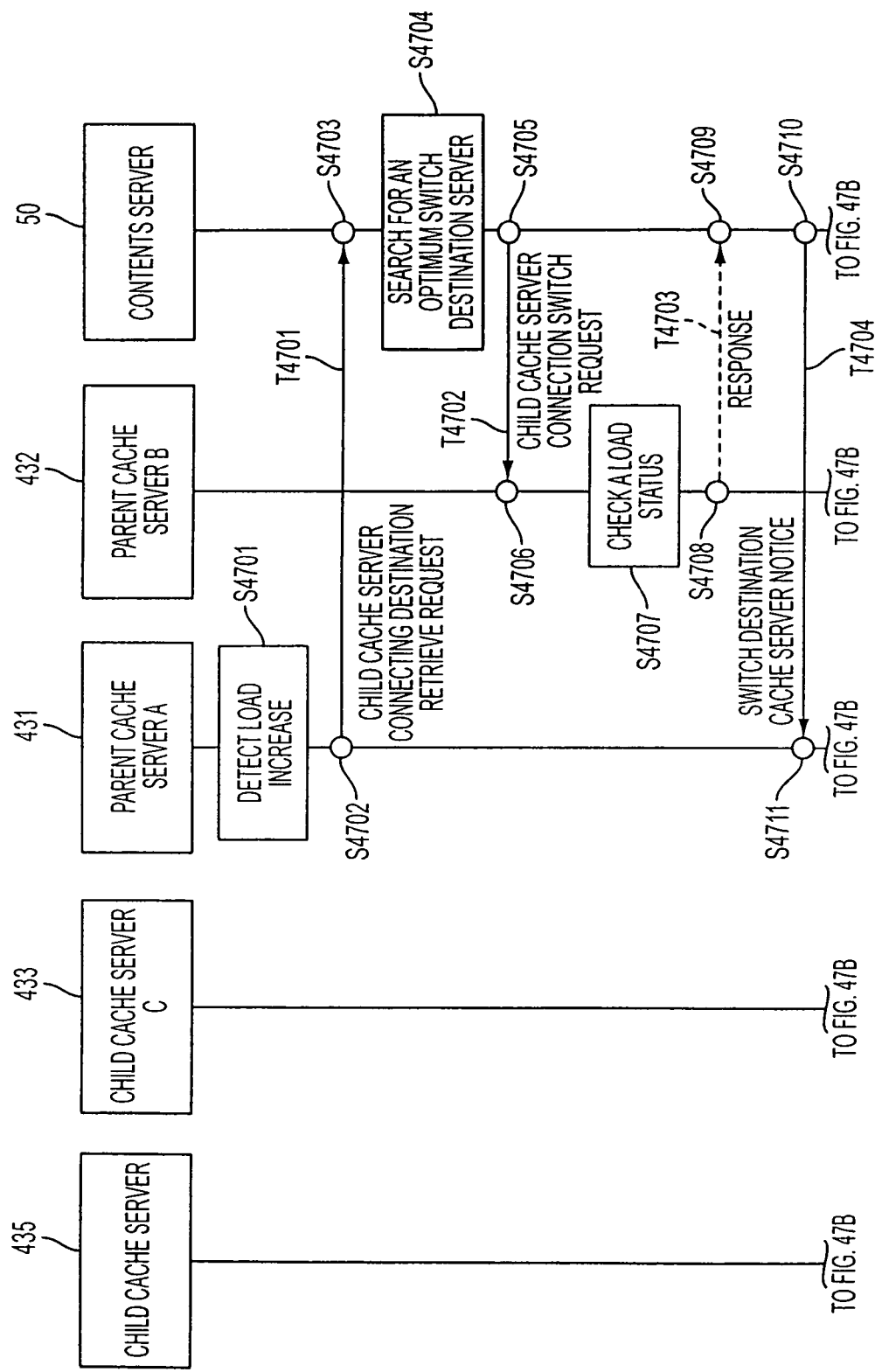
Figure 47B:
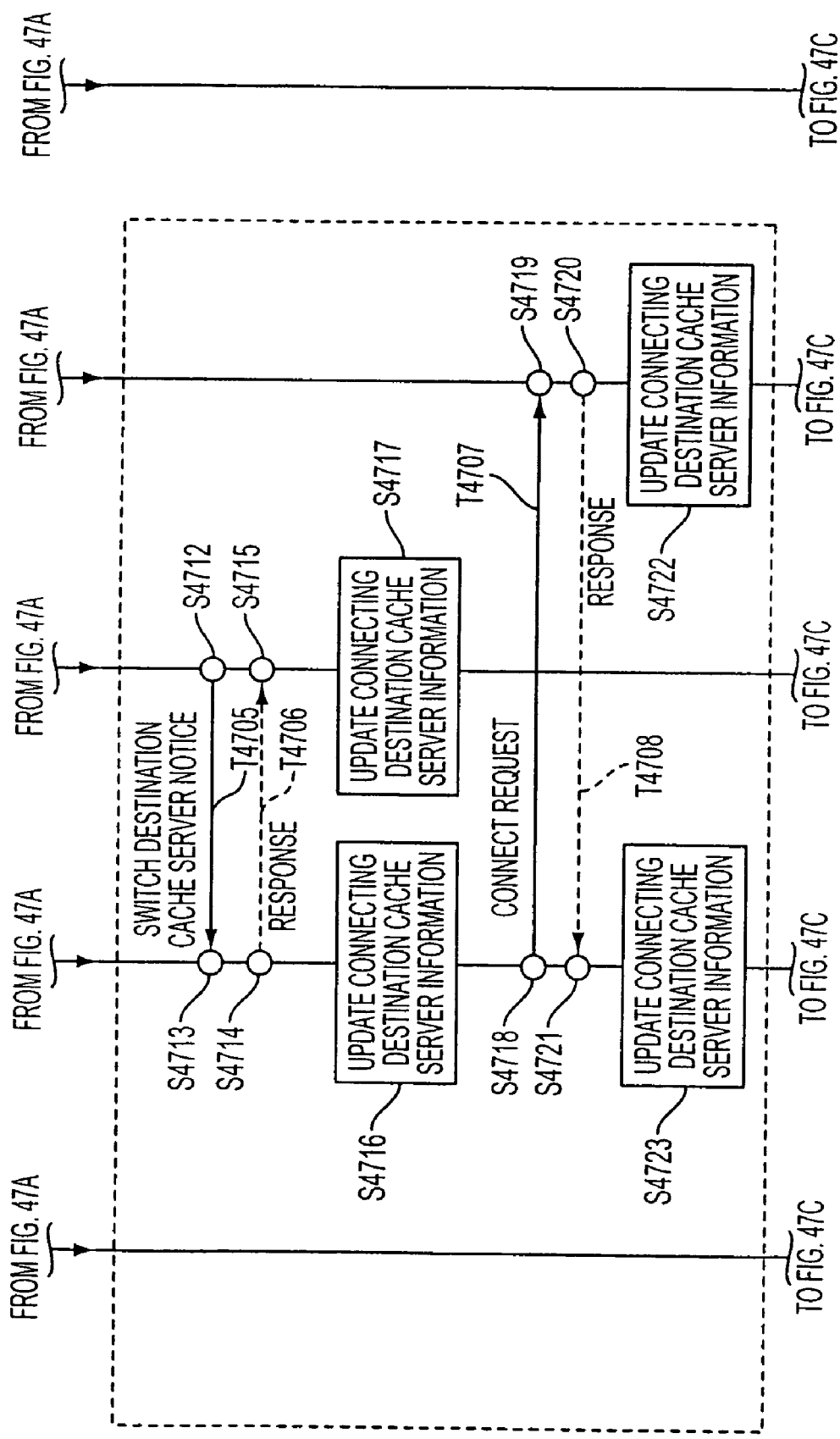

FIGS. 47A, 47B, and 47C show an operation example of switching the connecting destination of a cache server subordinated to the top layer cache server below two layers to another highest-order cache server when the load of the highest-order cache server increases.

In FIGS. 47A, 47B, and 47C, in the content distribution network (CDN) 430 shown in FIG. 43, since the load of the cache server A431 (the top layer cache server) increases, the cache server C433 (the second layer) that is the source of the load, subordinated to the cache server A431, is switched to the cache server B432 (the top layer cache server) and simultaneously the cache server E435 (the second layer) is subordinated to the cache server A431 (the top layer cache server).

In step S4701, the cache server A431 (the top layer cache server) shown in FIG. 43 detects that the load of the cache server A431 has exceeded a predetermined overload setting value due to its load measurement unit and overload determination unit.

Then, the cache server A431 selects new content obtained by another cache server and content whose acquisition source is switched to another child cache server such that its total load after switching becomes equal to or less than the setting value and generates a T4701 (a child cache server connecting destination retrieve request (see FIG. 46)) including this information.

In step S4702, the cache server A431 transmits the T4701 to the content server 450 using its connecting destination retrieve request information transmitting unit. In this case, if necessary, the cache server A431 updates the cache server-led content.

In step S4703, the content server 450 receives the T4701 via its connecting destination retrieve request information receiving unit.

In step S4704, the content server 450 retrieves a switch destination cache server optimum for the child cache server C433 from cache servers connected to it by its cache control unit 22. In this example, the cache server B432 is retrieved.

In step S4705, the content server 450 transmits a T4702 (a child cache server connection switch request (see FIG. 45)) to the cache server B432.

In step S4706, the cache server B432 receives the T4702 via its connecting destination retrieve request information receiving unit.

In step S4707, the cache server B432 (the top layer cache server) selecting its connecting destination checks its own load status. In this case, the cache server B432 determines that the connecting destination of the cache server E435 can be switched to the cache server A431 on the basis of the received message (connecting destination switch request information (see FIG. 45)). Then, the cache server B432 determines its connectability on the basis of a load increase that is due to the fact that the cache acquisition source of the cache server C433 is switched and on the basis of a load decrease that is due to the fact that the connecting destination of the cache server E435 is switched to the cache server A431.

In step S4708, the cache server B432 returns a T4703 (connecting destination switch response (see FIG. 9)) to the content server 450 using its connecting destination connectability determination transmitting unit. If it can be connected, in step S4709, the content server 450 receives the response T4703 via its connecting destination connectability determination result receiving unit.

In step S4710, the content server 450 transmits a switch destination cache server notice T4704 (information about the cache server B432 (see FIG. 10)) on the basis of the received T4703 using its connecting destination connectability determination result transmitting unit.

In step S4711, the cache server A431 receives the T4704 via its connecting destination information receiving unit. Then, the cache server A431 performs processes in steps S4712 and S4724.

In step S4712, the cache server A431 transmits a switch destination cache server notice T4705 (information about the parent cache server B432 (see FIG. 10)) to the child cache server C433 from its switch request transmitting unit.

In step S4724, the cache server A431 transmits a switch destination cache server notice T4709 (information about the parent cache server A431) to the child cache server E435 in the same way as in step S4712.

In step S4713, the cache server C433 receives the T4705 via its connecting destination information receiving unit.

In step S4714, the cache server C433 transmits switch destination response information T4706 (see FIG. 11) to the parent cache server A431. In this case, in step S4716, the cache server C433 updates its information about cache servers connected to it.

In step S4715, the cache server A431 receives the T4706 via its connecting destination information receiving unit. In this case, in step S4717, the cache server A431 updates its information about cache servers connected to it.

In step S4718, the cache server C433 transmits a connect request T4707 (see FIG. 12) to the parent cache server B432.

In step S4719, the parent cache server B432 receives the connect request T4707. In step S4720, the parent cache server B432 transmits a connect response T4708 (see FIG. 13) to the cache server C433. In this case, in step S4722, the cache server B432 updates information about cache servers connected to it.

In step S4721, the cache server C433 receives the T4708. In this case, in step S4723, the cache server C433 updates its information about cache servers connected to it.

In step S4724, the cache server A431 transmits a switch destination cache server notice T4709 (information about the parent cache server A431 (see FIG. 10)) to the child cache server E435 from its switch request transmitting unit.

In step S4725, the cache server E435 receives the T4709 via its connecting destination information receiving unit.

In step S4726, the cache server E435 transmits switch destination response information T4710 (see FIG. 11) to the parent cache server A431. In this case, in step S4728, the cache server E435 updates its information about cache servers connected to it.

In step S4727, the cache server A431 receives the T4710 via its connecting destination information receiving unit. In this case, in step S4729, the cache server A431 updates its information about cache servers connected to it.

In step S4730, the cache server E435 transmits a connect request T4711 (see FIG. 12) to the parent cache server B432.

In step S4731, the parent cache server B432 receives the T4711. In step S4732, the parent cache server B432 transmits a connect response T4712 (see FIG. 13) to the cache server E435. At this moment, in step S4734, the cache server B423 updates its information about cache servers connected to it.

In step S4733, the cache server E435 receives the T4712. At this moment, in step S4735, the cache server E435 updates information about cache servers connected to it.

Next, the operation of switching the connecting destination of a cache server below the second layer to a cache server below the second layer, subordinated to another top layer cache server, is described.

Figure 48A:
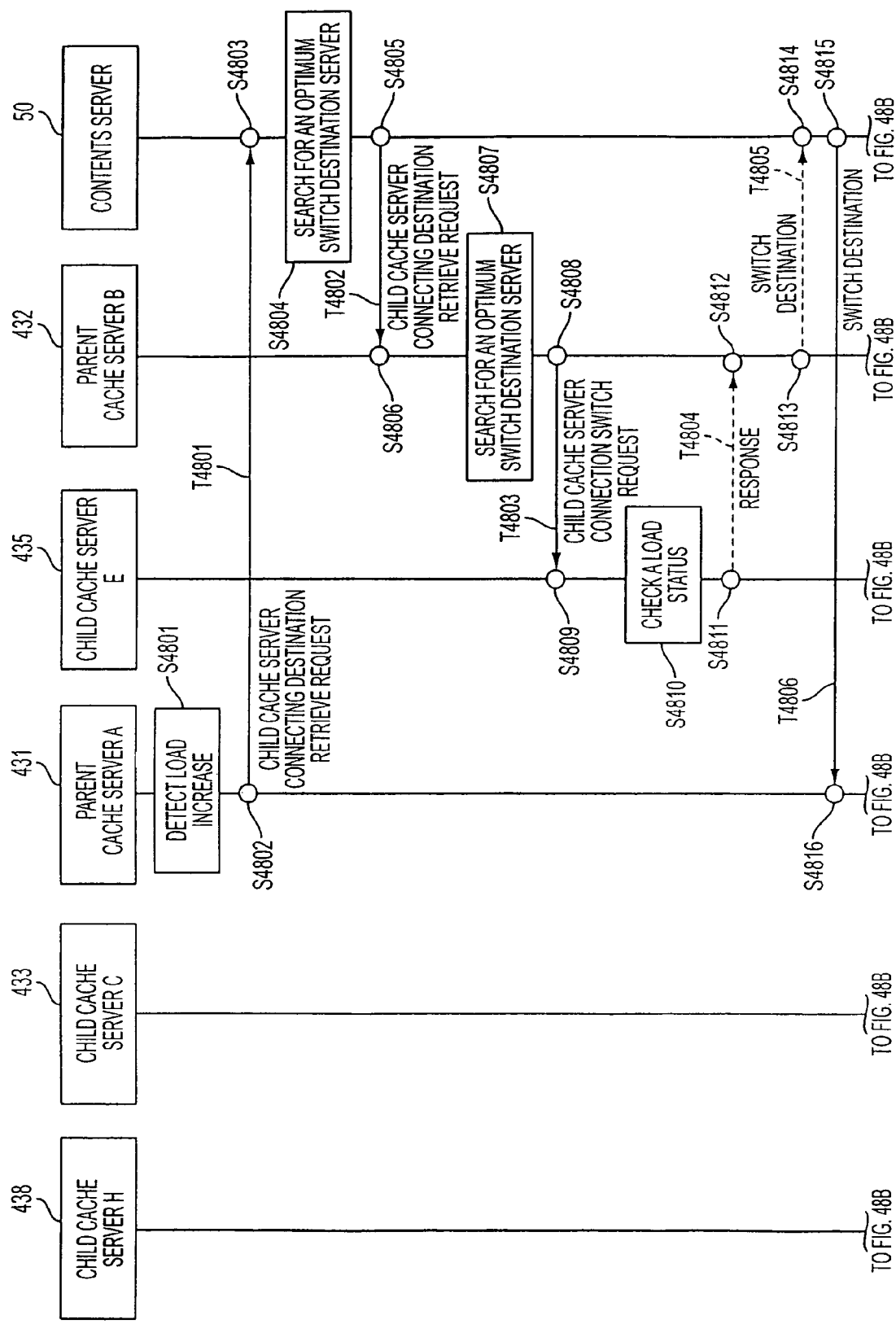
Figure 48B:
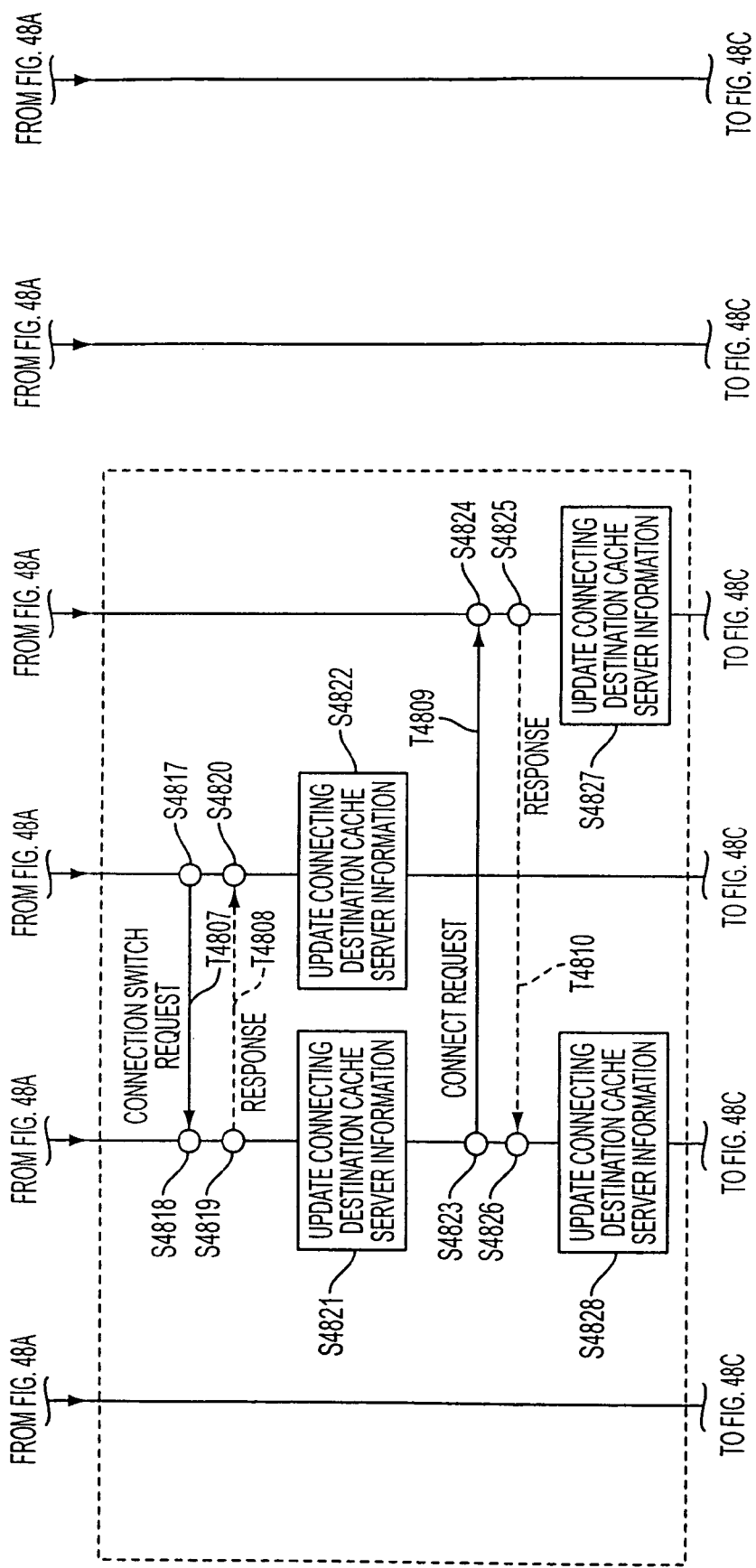

FIGS. 48A, 48B, and 48C show an operation example of switching the connecting destination of a cache server subordinated below the second layer to another cache server subordinated below the second layer and subordinated to another top layer cache server.

In step S4801, the cache server A431 (the top layer server) shown in FIG. 43 detects that the load of the cache server A431 has exceeded a predetermined overload setting value by the amount of its load measurement unit and overload determination unit. In this example, it is due to the load of the cache server C433.

In step S4802, the cache server A431 transmits a T4801 (a child cache server connecting destination retrieve request (see FIG. 46)) to the content server 450 using its connecting destination retrieve request information transmitting unit. In this case, if necessary, the cache server A431 updates the cache server-led content.

In step S4803, the content server 450 receives the T4801 via its connecting destination retrieve request information receiving unit.

In step S4804, the content server 450 retrieves a switch destination cache server optimum for the child cache server C433 from cache servers connected to it by its cache control unit 22. However, since the optimum switch destination cache server cannot be retrieved, the process moves to step S4805.

In step S4805, the content server 450 transmits a T4802 (child cache server connecting destination retrieve request (see FIG. 46)) making a request to the cache server B432 subordinated to the content server 450 to retrieve a switch destination cache server optimum for the child cache server C433 from cache servers connected to it to the cache server B432.

In step S4806, the cache server B432 receives the T4802 via its connecting destination retrieve request information receiving unit.

In step S4807, the cache server B432 retrieves a switch destination cache server optimum for the child cache server C433 from cache servers connected to it by its cache control unit. In this example, a cache server E435 is retrieved.

In step S4808, the cache server B432 transmits a T4803 (child cache server connection switch request (see FIG. 45)) to the cache server E435.

In step S4809, the cache server E435 receives the T4803 via its connecting destination retrieve request information receiving unit.

In step S4810, upon receipt of the child cache server connection switch request, the child cache server E435 checks its own load status and returns its response to the parent cache server B432 if it can be connected. At this moment, the child cache server E435 determines that the connecting destination of the cache server H438 can be switched to the cache server A431 on the basis of the received message and determines its connectability on the basis of a load increase that is due to the fact that the cache acquisition source of the cache server C433 is switched and on the basis of a load decrease that is due to the fact that the connecting destination of the cache server H438 is switched to the cache server A431.

In step S4811, if it can be connected, the child cache server E435 returns a T4804 (connecting destination switch response (see FIG. 16)) to the cache server B432 using its connecting destination connectability determination result transmitting unit.

In step S4812, the cache server B432 receives the T4804 via its connecting destination connectability determination result receiving unit.

In step S4813, upon receipt of the response T4804, the cache server B432 transmits a T4805 (information about the content server 450 and the cache server E435) to the content server 450.

In step S4814, the content server 450 receives the T4805.

In step S4815, the content server 450 transmits a switch destination cache server notice T4806 (information about the cache servers E435 and the child cache server H438 (see FIG. 10)) to the cache server A431 on the basis of the received T4805.

In step S4816, the cache server A431 receives the T4806. Then, the cache server A431 performs processes in steps S4817 and S4829.

In step S4817, the cache server A431 transmits a switch destination cache server notice T4807 (information about the child cache server E435 (see FIG. 10)) to the child cache server C433.

In step S4829, the cache server A431 transmits a switch destination cache server notice T4811 (information about the parent cache server A431) to the child cache server H438 in the same way as in step S4817.

In step S4818, the cache server C433 receives the T4807.

In step S4819, the cache server C433 transmits switch destination response information T4808 (see FIG. 11) to the parent cache server A431. At this moment, in step S4821, the cache server C433 updates its information about cache servers connected to it.

In step S4820, the cache server A431 receives the T4808. At this moment, in step S4822, the cache server A431 updates its information about cache servers connected to it.

In step S4823, the cache server C433 transmits a connect request T4809 (see FIG. 12) to the child cache server E435.

In step S4824, the child cache server E435 receives the connect request T4809. In step S4825, the child cache server E435 transmits a connect response T4810 (see FIG. 13) to the cache server C433. At this moment, in step S4827, the cache server E435 updates its information about cache servers connected to it.

In step S4826, the cache server C433 receives the T4810. At this moment, in step S4828, the cache server C433 updates its information about cache servers connected to it.

In step S4829, the cache server A431 transmits a switch destination cache server notice T4811 (information about the parent cache server A431 (see FIG. 10)) to the child cache server H438.

In step S4830, the cache server H438 receives the T4811.

In step S4831, the cache server H438 transmits switch destination response information T4812 (see FIG. 11) to the parent cache server A431. At this moment, in step S4833, the cache server H438 updates its information about cache servers connected to it.

In step S4832, the cache server A431 receives the T4812. At this moment, in step S4834, the cache server A431 updates its information about cache servers connected to it.

In step S4835, the cache server H438 transmits a connect request T4813 (see FIG. 12) to the cache server E435.

In step S4836, the cache server E435 receives the connect request T4813.

In step S4837, the cache server E435 transmits a connect response T4814 (see FIG. 13) to the cache server H438. At this moment, in step S4839, the cache server E435 updates its information about cache servers connected to it.

In step S4838, the cache server H438 receives the T4814. At this moment, in step S4840, the cache server H438 updates its information about cache servers connected to it.

The operation of switching the connecting destination of a cache server below the second layer to a cache server below the second layer, subordinated to the same top layer cache server, is the same as the operation of switching the connecting destination of a cache server below the second layer to another cache server below the second layer.

(Operation of a Cache Server)

Next, operation examples of a cache server having a function to simultaneously switch a plurality of connecting destinations are described.

Figure 49:
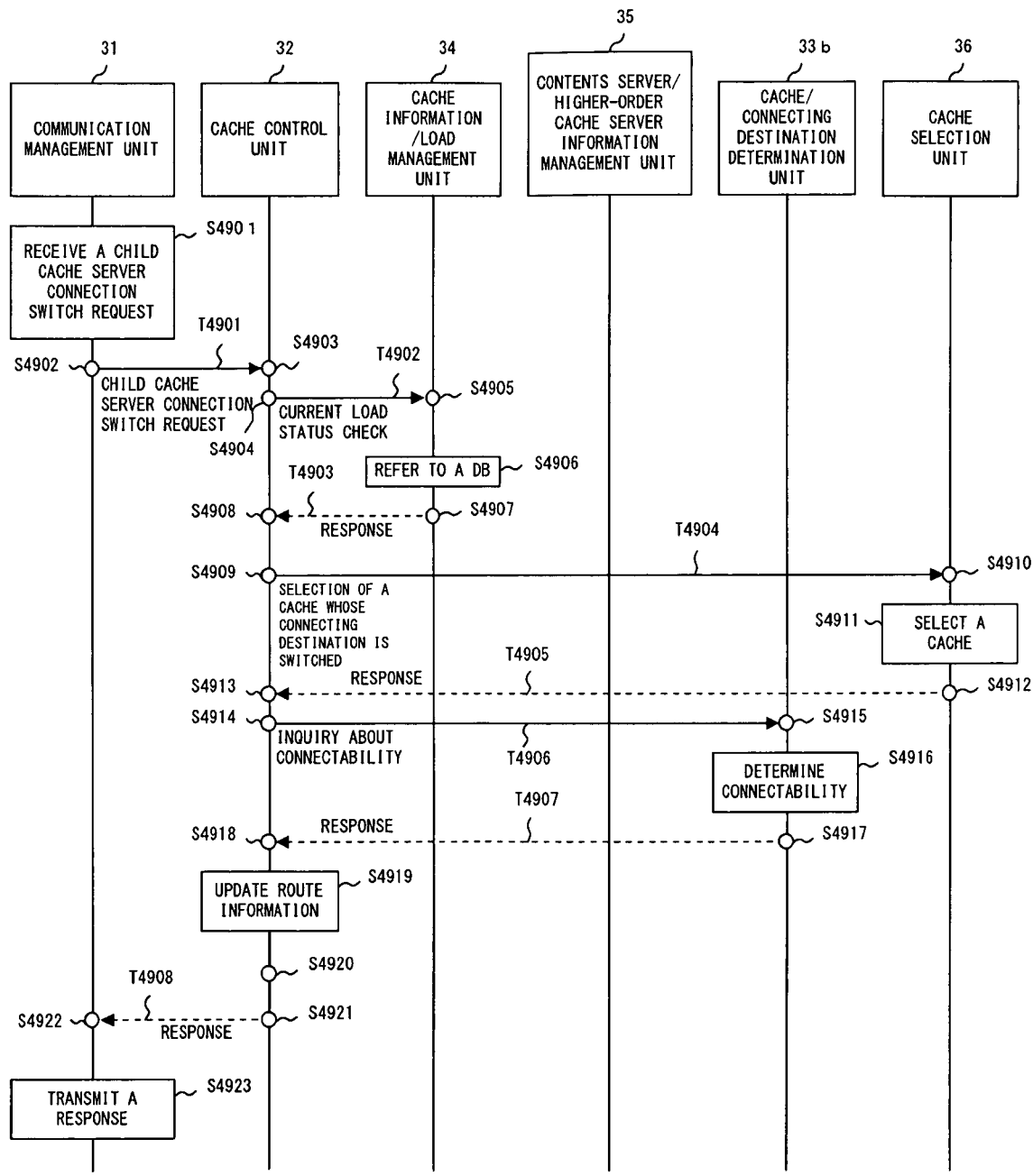
FIG. 49 shows an operation example of a cache server at the time of receiving a connection switch request.

The operation of a cache server at the time of receiving a connection switch request is described below on the basis of the operation, shown in FIG. 49, of a cache server at the time of receiving a connection switch request.

In step S4901, the communication management unit 31 receives a connection switch request.

In step S4902, the communication management unit 31 transfers a T4901 (child cache server connection switch request) to the cache control unit 32.

In step S4903, the cache control unit 32 receives the T4901.

In step S4904, the cache control unit 32 reports a T4902 to the cache information/load management unit 34 to check its load status.

In step S4905, the cache information/load management unit 34 receives the T4902 (check of a load status).

In step S4906, the cache information/load management unit 34 checks its load status by referring to its DB and obtains the load information.

In step S4907, the cache information/load management unit 34 transmits a T4903 (load information, etc.) to the cache control unit 32 as its response. In step S4908, the cache control unit 32 receives the T4903.

In step S4909, the control unit 32 transmits a T4904 to inquire with the cache selection unit 36 about a cache to select in order to switch the connecting destination to another cache server.

In step S4910, the cache selection unit 36 receives the T4904. In step S4911, the cache selection unit 36 selects a cache whose connecting destination should be switched to another cache server.

In step S4912, the cache selection unit 36 notifies the catch control unit 32 of a T4905 (the selected cache) as its response.

In step S4913, the cache control unit 32 receives the T4905. In step S4914, the cache control unit 32 notifies the cache/connecting destination determination unit 33b of a T4906 (inquiry about its connectability).

In step S4915, the cache/connecting destination determination unit 33b receives the T4906. In step S4916, the cache/connecting destination determination unit 33b determines the connectability. In this case, the cache/connecting destination determination unit 33b determines the connectability on the basis of its current load and the selected cache.

In step S4917, the cache/connecting destination determination unit 33b notifies the cache control unit 32 of a T4907 (the determination result of the connectability).

In step S4918, the cache control unit receives the T4907. In step S4919, the cache control unit 32 updates its route information.

In step S4920, the cache control unit 32 generates a message and in step S4921, the cache control unit 32 transmits its response T4908 to the communication management unit 31.

In step S4922, the communication management unit 31 receives the response T4908 and in step S4923 it transmits a message to the connect request transmitting source cache server.

The operation of a cache server having a function to simultaneously switch a plurality of connecting destinations at the time of receiving a connecting destination retrieve request is the same as the operation of a cache server without this function, shown in FIG. 27, at the time of receiving a connecting destination retrieve request.

The operation of a cache server at the time of receiving a connection switch response is the same as the operation of a cache server, shown in FIG. 29, at the time of receiving a connecting destination retrieve request.

The operation of a parent cache server at the time of receiving a switch destination cache server notice is the same as the operation of a parent cache server, shown in FIG. 30, at the time of receiving a switch destination cache server notice.

The operation of a child cache server at the time of receiving a switch destination cache server notice is the same as the operation of a child cache server, shown in FIG. 31, at the time of receiving a switch destination cache server notice.

The operation of a cache server at the time of receiving a switch destination cache server notice response is the same as the operation of a cache server, shown in FIG. 32, at the time of receiving a switch destination cache server notice response.

The operation of a cache server at the time of receiving a connect request is the same as the operation of a cache server, shown in FIG. 33, at the time of receiving a connect request.

The operation of a cache server at the time of receiving a connect response is the same as the operation of a cache server at the time of receiving a connect response shown in FIG. 34.

The operation of a cache server in the case where a child cache server connection switch request is transmitted to a higher-order server at the time of a heavy load can be made in the same manner as the operation shown in FIG. 35.

The operation of a cache server in the case where a child cache server connection switch request is transmitted to a child cache server at the time of a heavy load can be made in the same manner as the operation shown in FIG. 36.

The above-described preferred embodiments of the present invention can be realized by hardware as one function of a content server or as the firmware or software of a DSP board and a CPU board.

Although so far the preferred embodiments of the present invention have been described with reference to the drawings, a cache server or content server to which the present invention is applied is not limited to the above-described preferred embodiments as long as the function can be executed, and naturally it can be a single device, a system or integrated device composed of a plurality of devices, or a system in which the process is performed via a network, such as a LAN, WAN or the like.

As shown in FIG. 50, the preferred embodiments can also be realized by a system comprising a computer processing unit (CPU) 5001, memory 5002 such as ROM and RAM, an input device 5003, an output device 5004, an external storage device 5005, a medium driver device 5006, and a network connection device 5007, all of which are connected to a bus 5009. Specifically, they can also be realized by providing the memory 5002 such as ROM or RAM, the external storage device 5005, and a portable storage medium 5010 on which is recorded the program code of the software for realizing the systems of the above-described preferred embodiments for a cache server or content server and the computer of the cache server or content server reading and executing the program code.

In this case, the program code itself read from the portable storage medium 5010 or the like realizing the new function of the present invention and the portable storage medium 5010 or the like on which is recorded the program code constitute the present invention.

For the portable storage medium 5010 for providing the program code, a flexible disk, a hard disk, an optical disk, a magneto-optical disk, CD-ROM, CR-R, DVD-ROM, DVD-RAM, a magnetic tape, a non-volatile memory card, a ROM card, various storage media on which is recorded the program code via the network connection device 5007 (such as electronic mail, personal computer communications, etc.), or the like can be used.

As shown in FIG. 51, in addition to the fact that the functions of the above-described preferred embodiments can also be executed by a computer (data processing device) 5100 executing the program code read on memory 5101, an OS operated in the computer 5100 or the like performs part of or all of the actual process and these processes can also be realized by an OS operated in the computer 5100 or the like performing part of or all of the actual process.

The application of the present invention is not limited to the above-described preferred embodiments and its various improvements and modification is also possible as long as the subject matter of the invention is not deviated from.

What is claimed is:

1. A cache server for caching content of a content server according to a request from a client and distributing the content to the client, comprising:

a cache control unit configured to determine whether the load is overloaded by measuring a load of the cache server, the overload being caused by a load source cache server, and comparing a value of the load with a predetermined overload setting value, wherein the cache server and the load source cache server belong to a first layer and a second layer lower than the first layer, respectively, the load source cache server in the second layer is connected to the cache server in the first layer, and the load source cache server caches content of the cache server in the first layer, to select content to switch and content to be switched by another cache server or content server such that a total load after switching can become equal to or less than the overload setting value, to generate connecting destination retrieve request information including a request for retrieving a connecting destination of the load source cache server from the content server or the other cache server and information about each piece of selected content, and to generate a request requesting the load source cache server to switch its connection to a connecting destination indicated by connecting destination information on the basis of the connecting destination information indicating a connecting destination retrieved from the content server or the other cache server that has received the connecting destination retrieve request information via the content server or the other cache server; and a communication management unit configured to transfer information about a cache to the cache control unit.

2. The cache server according to claim 1, wherein
when a connecting destination connectability determination result indicating connectability of a connecting destination of the load source cache server cannot be useful, the result having been transmitted from the content server or the other cache server that has received the connecting destination retrieve request information, the cache control unit transfers the connecting destination retrieve request information to another cache server in the second layer via the communication management unit.

3. The cache server according to claim 2, wherein when a connecting destination is selected according to connecting destination switch request information that is connecting destination information indicating a connecting destination retrieved from the content server or the other cache server by the content server or the other cache server, the cache control unit determines whether it can be used as the load source cache server on the basis of its load status, and, if it can be connected, returns its response to the content server or the other cache server that is a transmitting source of the connecting destination switch request information.

4. The content server according to claim 1, comprising:
a communication management unit for receiving a connecting destination connectability determination result that is a response including whether it can be used as a connecting destination of the load source cache server from the cache server according to one of claims 1 through 3 that is a destination to which the connecting destination retrieve request information is transferred; and
a cache control unit for generating information including the connecting destination connectability determination result of a switching destination cache server and a cache server in a layer lower than the switching destination cache server on the basis of the connecting destination connectability determination result, and transmitting it to a cache server to which the load source cache server is connected, wherein
the information is transmitted to a connecting destination cache server of the load source cache server by the communication management unit.

5. A connecting destination server switch control method implemented in a content distribution network for content of a content server according to a request from a client, wherein
a cache server and a load source cache server belong to a first layer and a second layer lower than the first layer, respectively, the load source cache server in the second layer is connected to the cache server in the first layer, the cache server in the first layer caches content of the content server, and the load source cache server caches content of the cache server in the first layer;
the cache server in the first layer
measures a load of the cache server in the first layer, the load being caused by the load source cache server, and transmits, by comparing the measured load with a predetermined value, connecting destination retrieve request information for making a request to search for a connecting destination of the load source cache server that is a source of the load to the content server when it is determined that the load is overloaded;
the content server receives the connecting destination retrieve request information transmitted from the cache server in the first layer and
transfers the received connecting destination retrieve request information to another cache server in a layer lower than the content server;
the other cache server
determines whether it can be used as a connecting destination of the load source cache server on the basis of its load by receiving the connecting destination retrieve request information transferred from the content server and
transmits, to the content server that has transmitted the connecting destination retrieve request information to it, a connecting destination connectability determination result indicating whether the determined connecting destination can be used;
the content server
transmits a notice including information about a switching destination cache server and a cache server in a layer lower than the switching destination cache server to a cache server to which the load source cache server is connected on the basis of the connecting destination connectability determination result; and
the cache server in the first layer
communicates in order to modify connecting destinations of the cache server in the first layer, the load source cache server, the switch destination cache server, and a cache server to be switched in the layer lower than the switch destination cache server.

6. The cache server according to claim 3, wherein
the cache control unit determines its connectability on the basis of a load increase by switching the acquisition source of content cached by the load source cache server and on the basis of a load decrease by switching the load source cache server connected to the other cache server in the layer lower than the content server to a cache server to be switched.

7. The connecting destination server switch control method according to claim 5, wherein
a request to switch its connection to a connecting destination indicated by connect request information retrieved from the content server or retrieved from the other cache server that has received the connecting destination retrieve request information via the content server or via the other cache server is generated on the basis of the connecting destination information and transmitted to a cache server to which the load source cache server is connected.

8. The connecting destination server switch control method according to claim 5, wherein
its connectability is determined on the basis of a load increase by switching the acquisition source of content cached by the load source cache server and on the basis of a load decrease by switching the load source cache server connected to the other cache server in the layer lower than the content server to a cache server to be switched.

* * * * *